June 3, 1930.   B. M. SHIPLEY   1,761,542
CASH REGISTER
Filed Jan. 2, 1923   23 Sheets-Sheet 1

Inventor
Bernis M. Shipley
By
His Attorneys

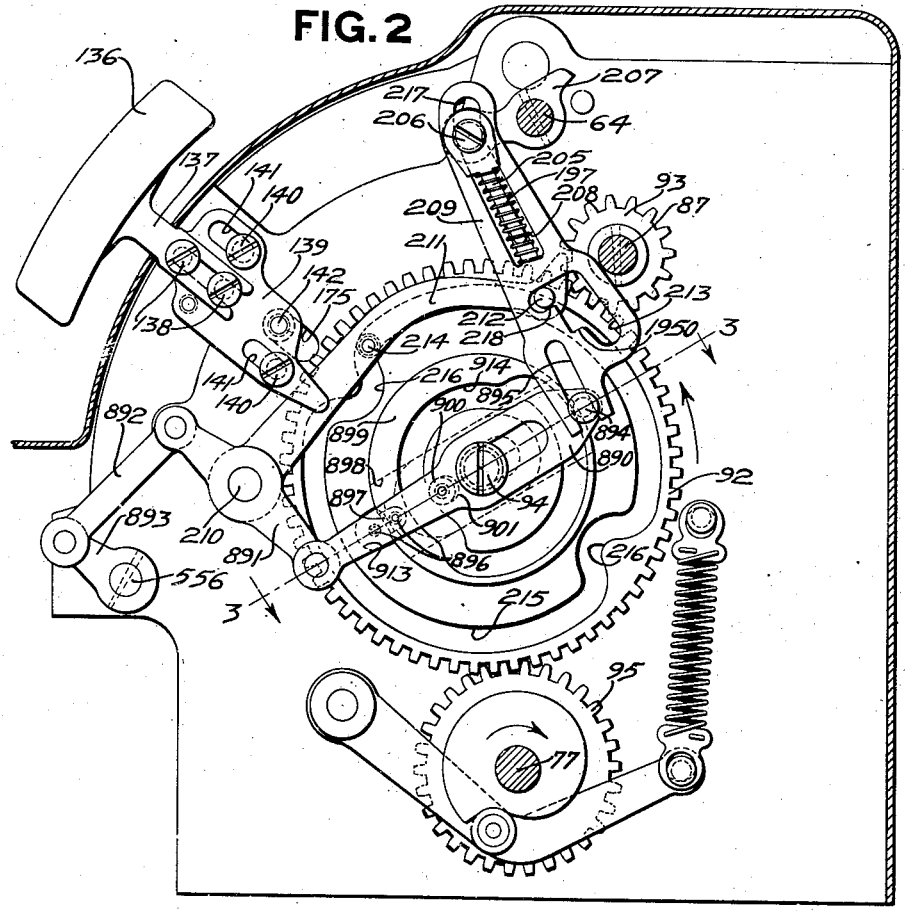

June 3, 1930.  B. M. SHIPLEY  1,761,542
CASH REGISTER
Filed Jan. 2, 1923    23 Sheets-Sheet 3

Inventor
Bernis M. Shipley
By Pearl Beust
Henry E. Stauffer
His Attorneys

June 3, 1930.  B. M. SHIPLEY  1,761,542
CASH REGISTER
Filed Jan. 2, 1923   23 Sheets-Sheet 4

Inventor
Bernis M. Shipley
By Carl Benst
Henry E. Stauffer
His Attorneys

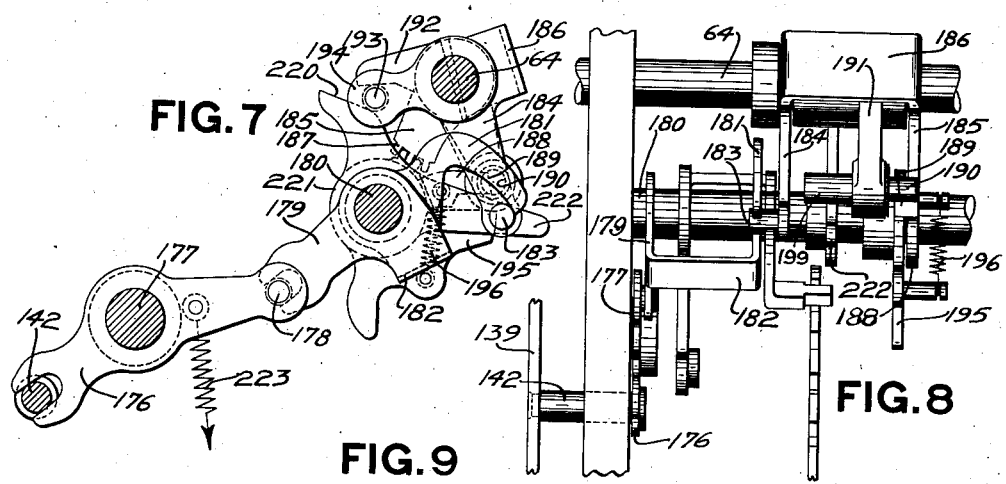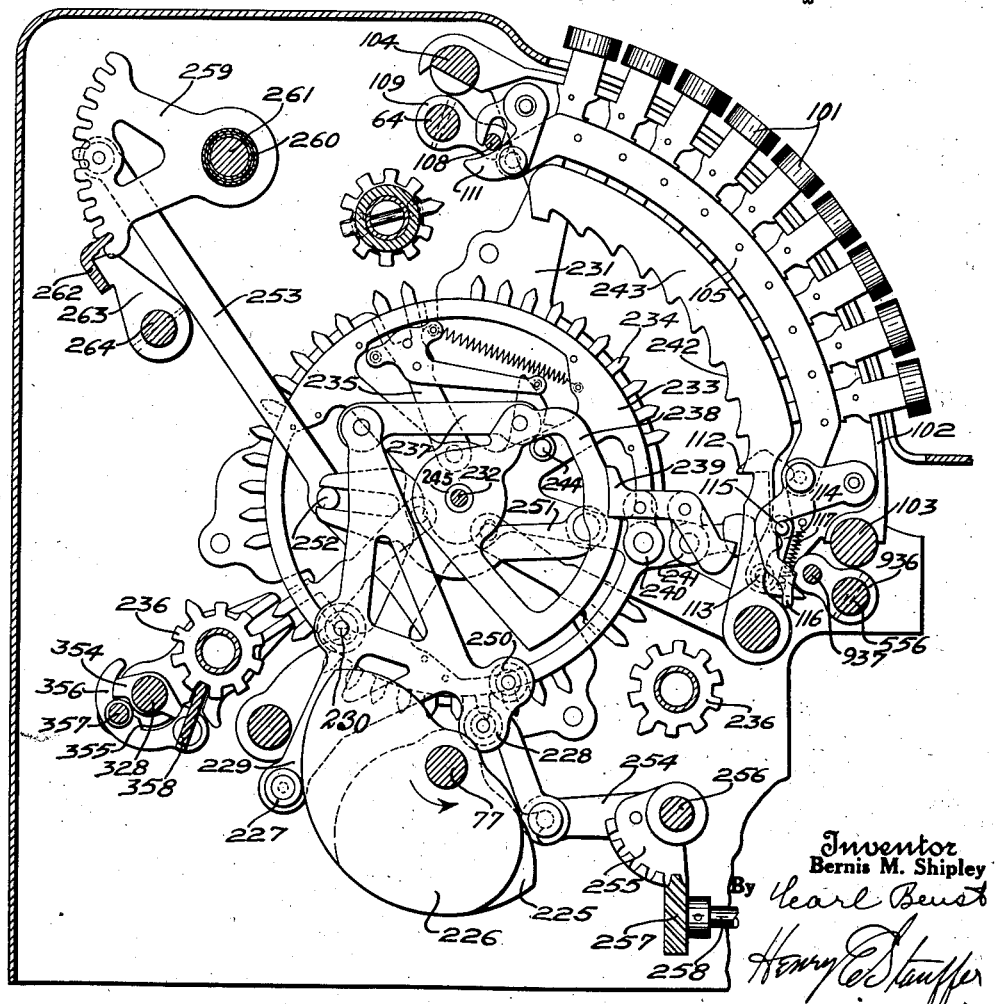

June 3, 1930.  B. M. SHIPLEY  1,761,542
CASH REGISTER
Filed Jan. 2, 1923   23 Sheets-Sheet 6

Inventor
Bernis M. Shipley
By Earl Beust
Henry E Stauffer
His Attorneys

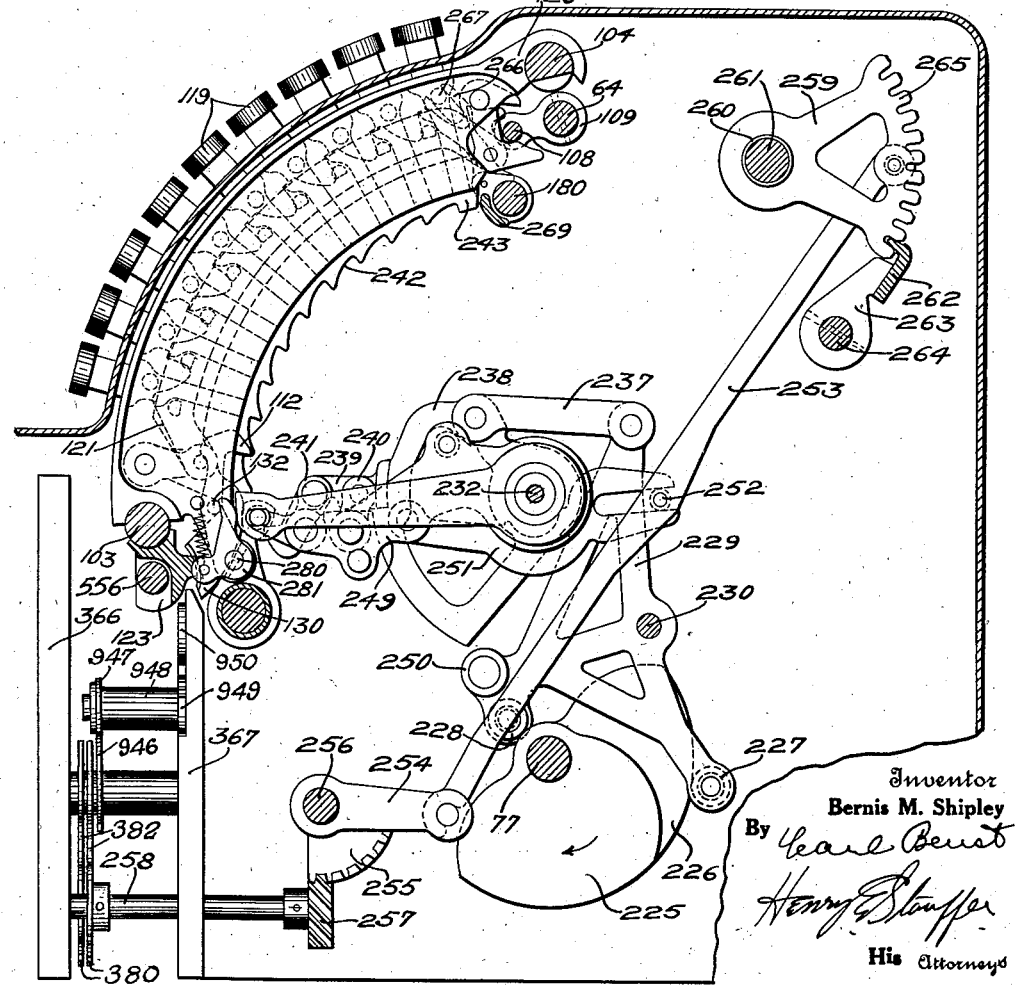

June 3, 1930.  B. M. SHIPLEY  1,761,542
CASH REGISTER
Filed Jan. 2, 1923  23 Sheets-Sheet 8

Inventor
Bernis M. Shipley
By
His Attorneys

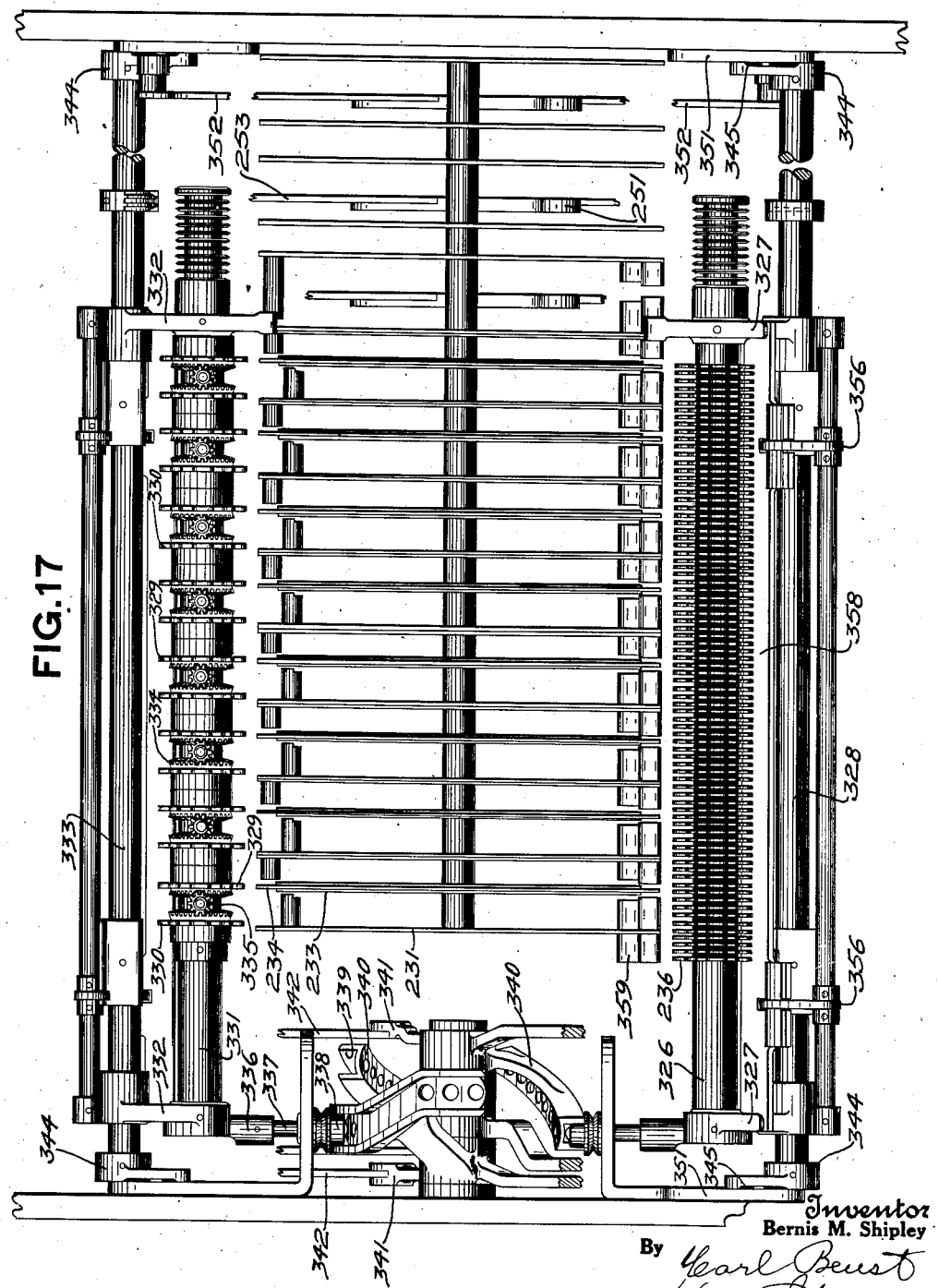

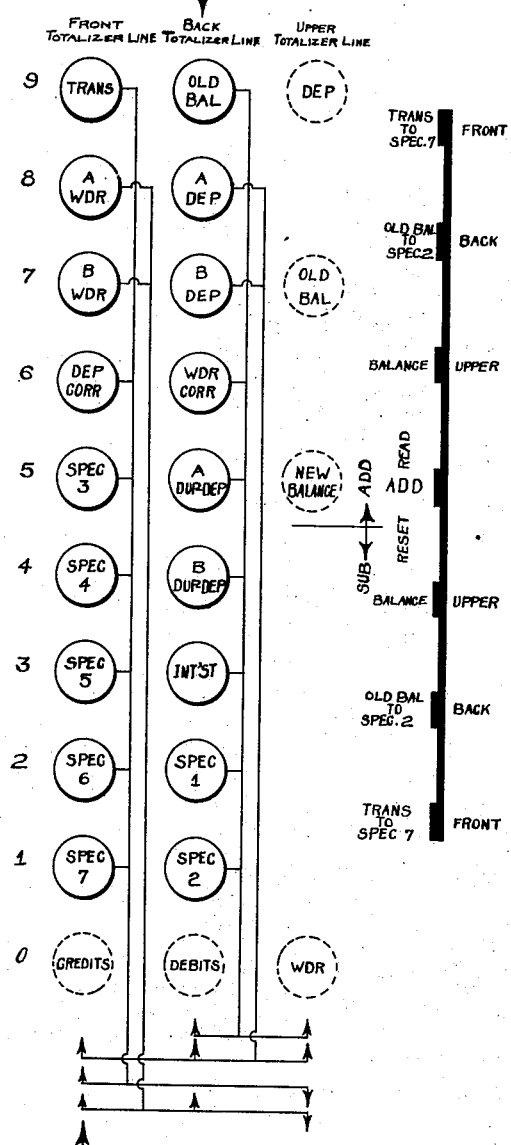
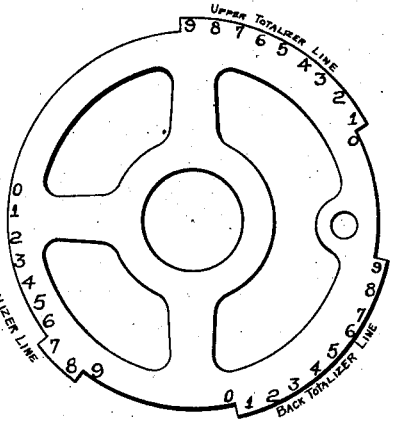
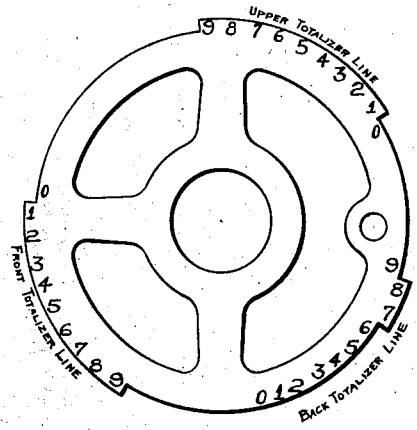

June 3, 1930.  B. M. SHIPLEY  1,761,542
CASH REGISTER
Filed Jan. 2, 1923  23 Sheets-Sheet 11
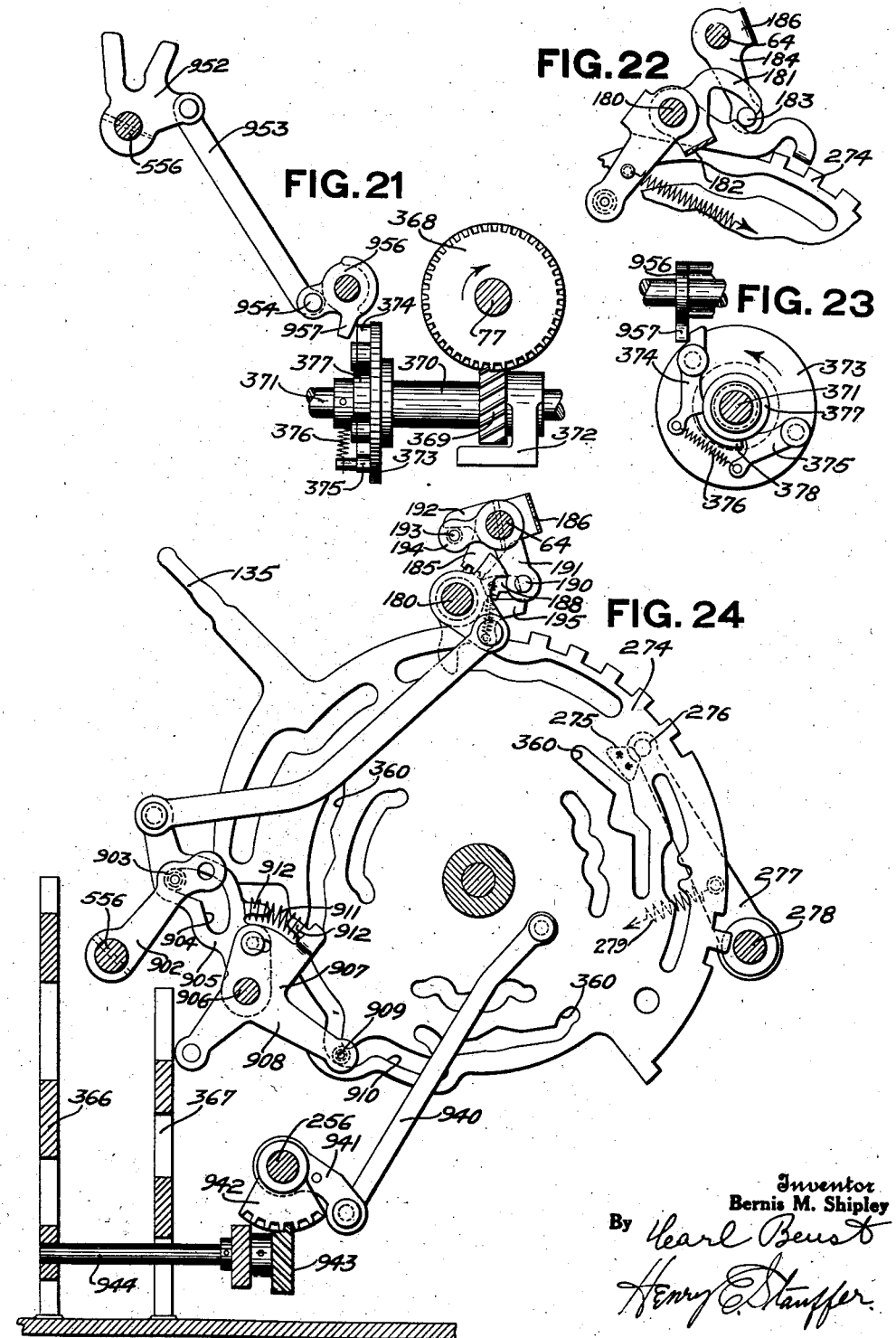

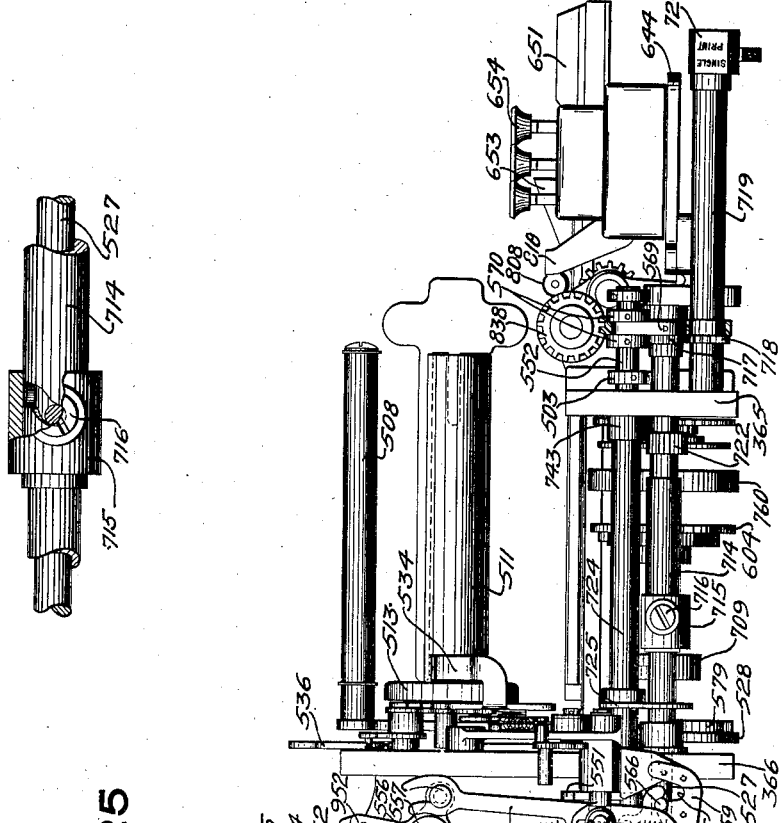

June 3, 1930.                B. M. SHIPLEY                1,761,542
                              CASH REGISTER
                            Filed Jan. 2, 1923         23 Sheets-Sheet 13

Inventor
Bernis M. Shipley
By Carl Beust
Henry E. Stauffer
His Attorneys

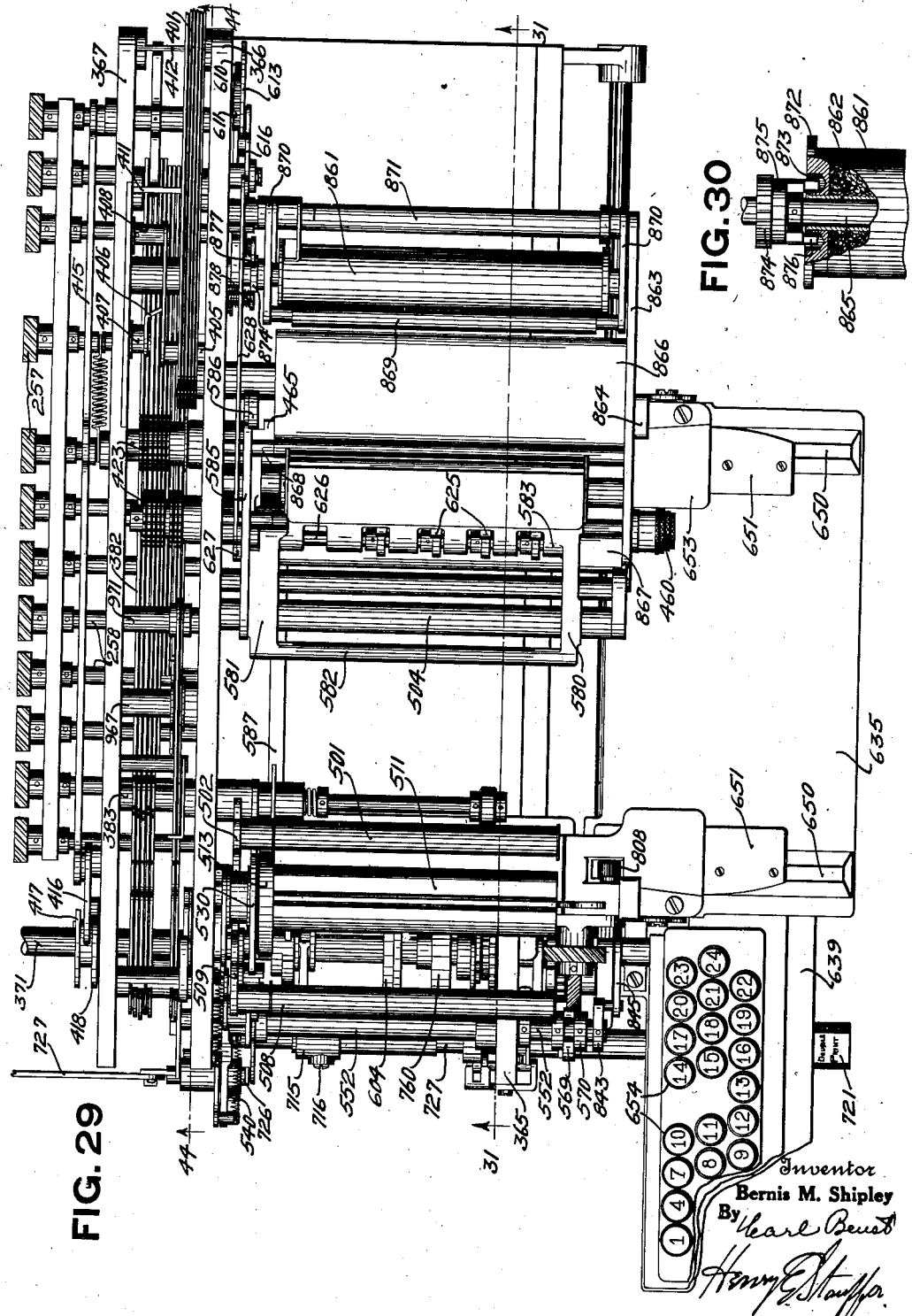

June 3, 1930.  B. M. SHIPLEY  1,761,542
CASH REGISTER
Filed Jan. 2, 1923   23 Sheets-Sheet 15
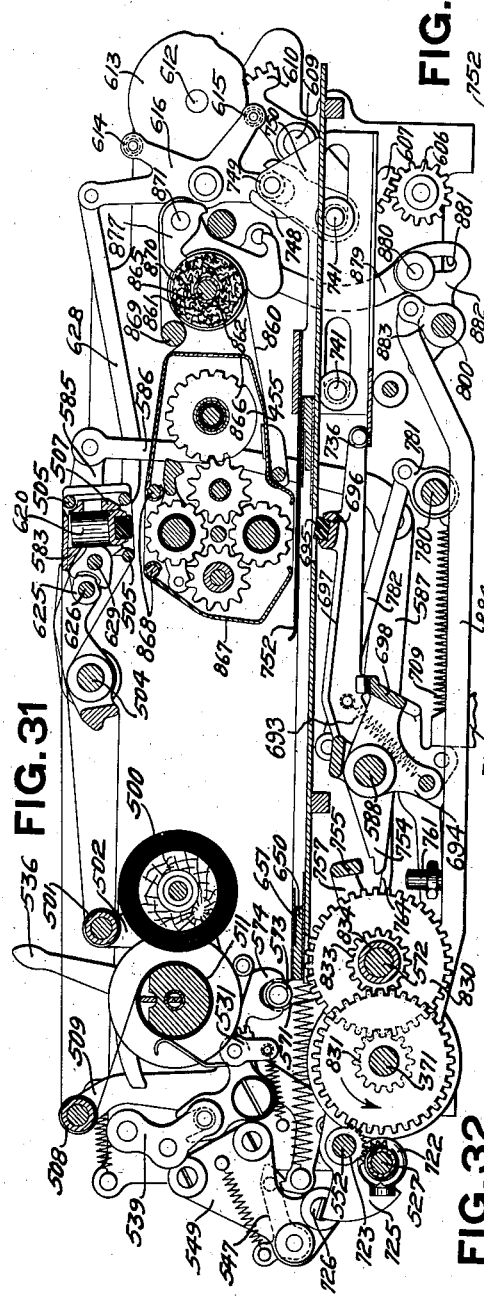
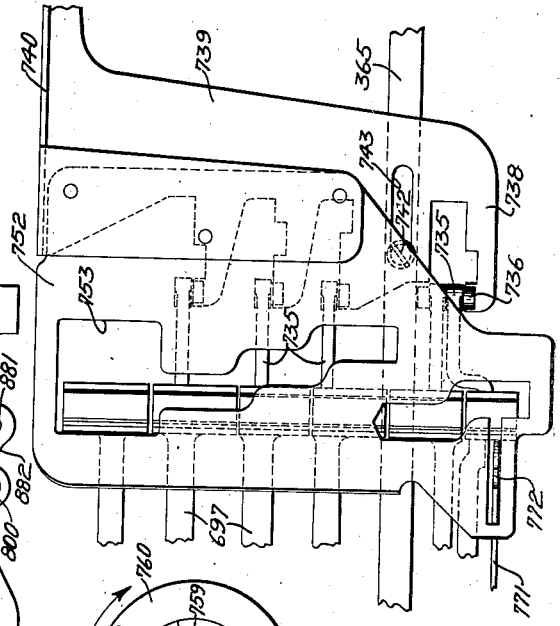
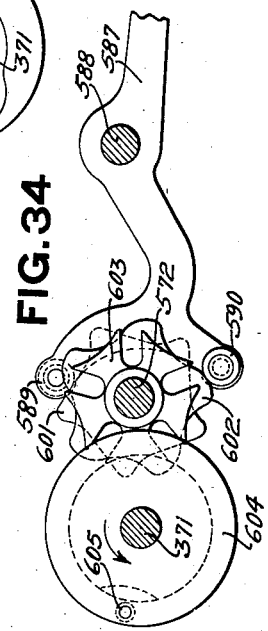
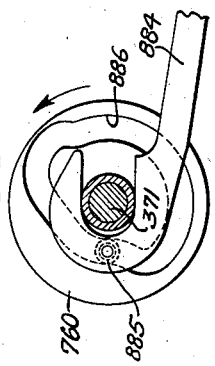
Inventor
Bernis M. Shipley
By
His Attorneys

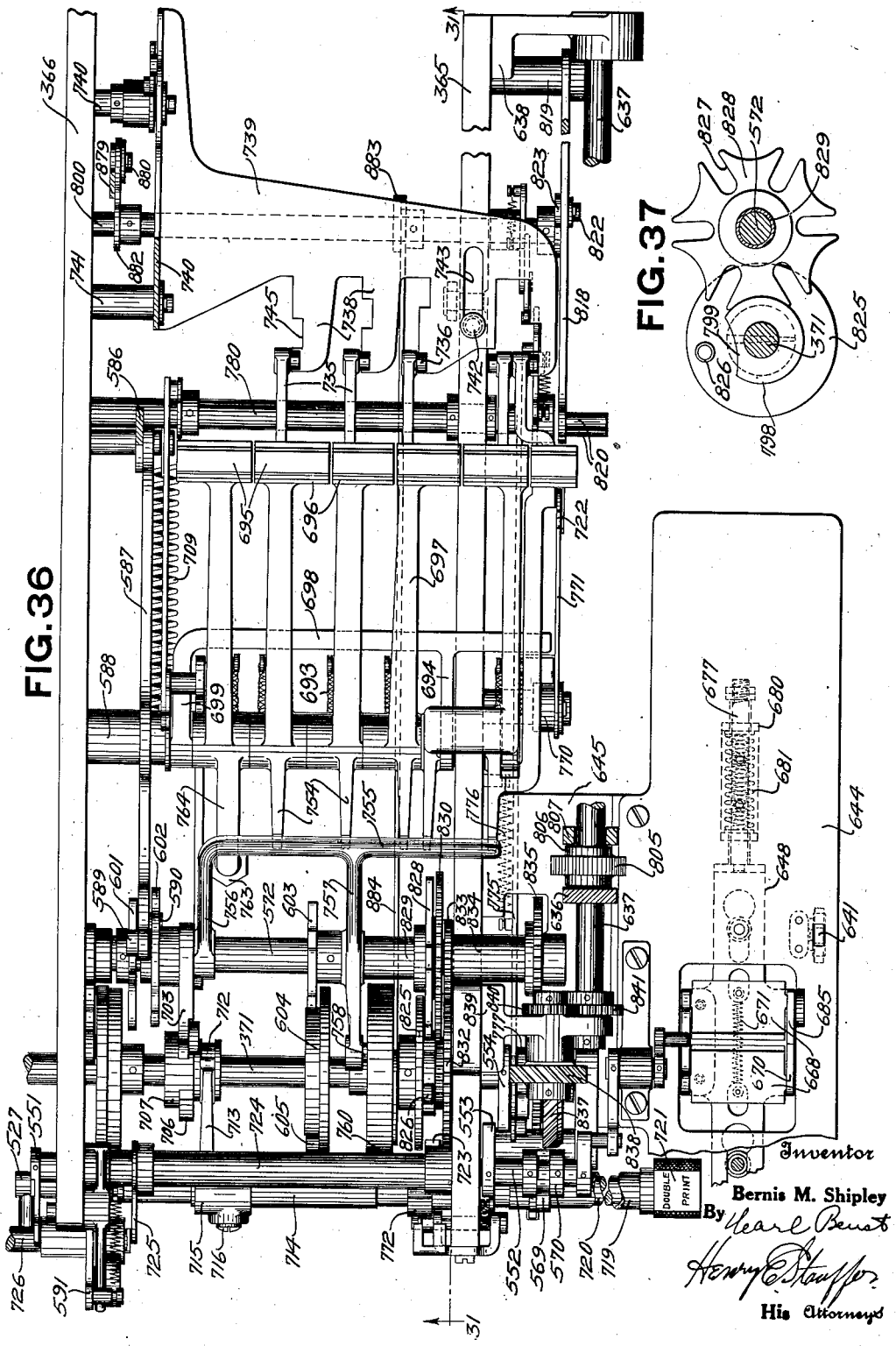

June 3, 1930.
B. M. SHIPLEY
1,761,542
CASH REGISTER
Filed Jan. 2, 1923
23 Sheets-Sheet 17
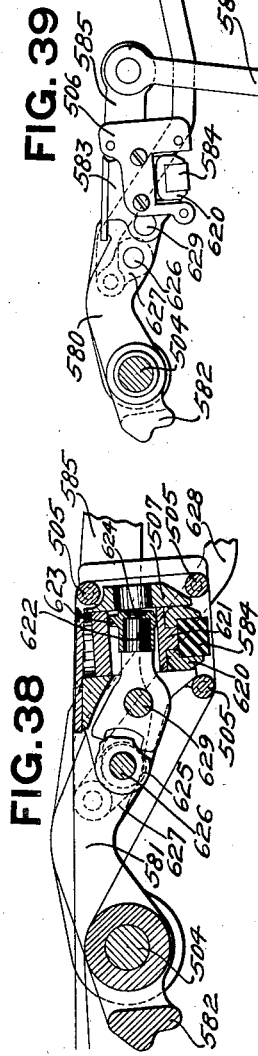
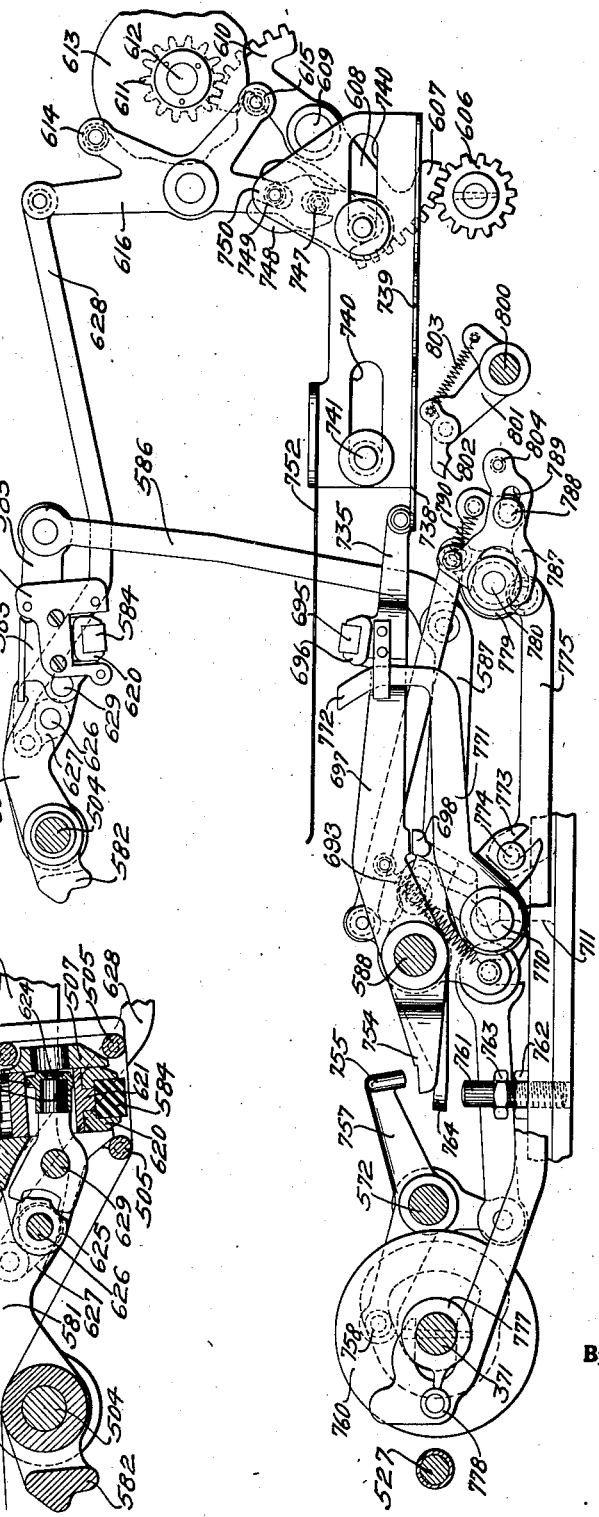
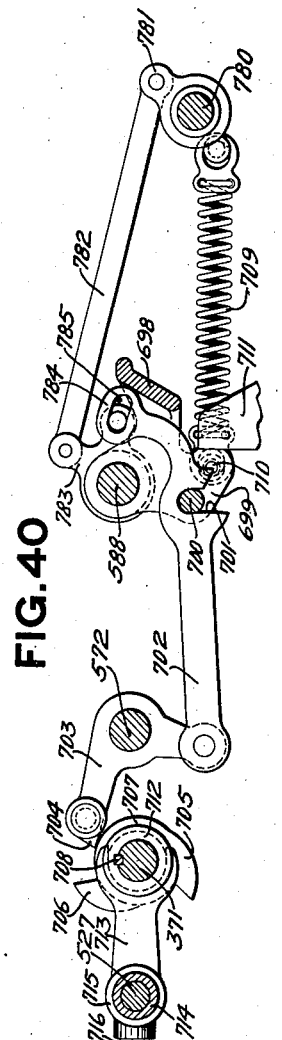
FIG. 38
FIG. 39
FIG. 40
Inventor
Bernis M. Shipley
By Pearl Beust
Henry E. Stauffer
His Attorneys

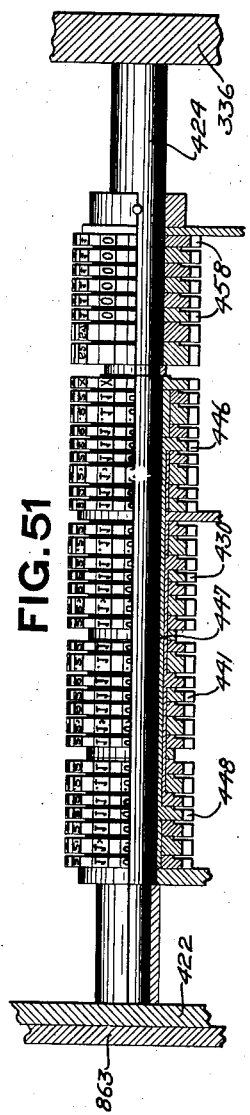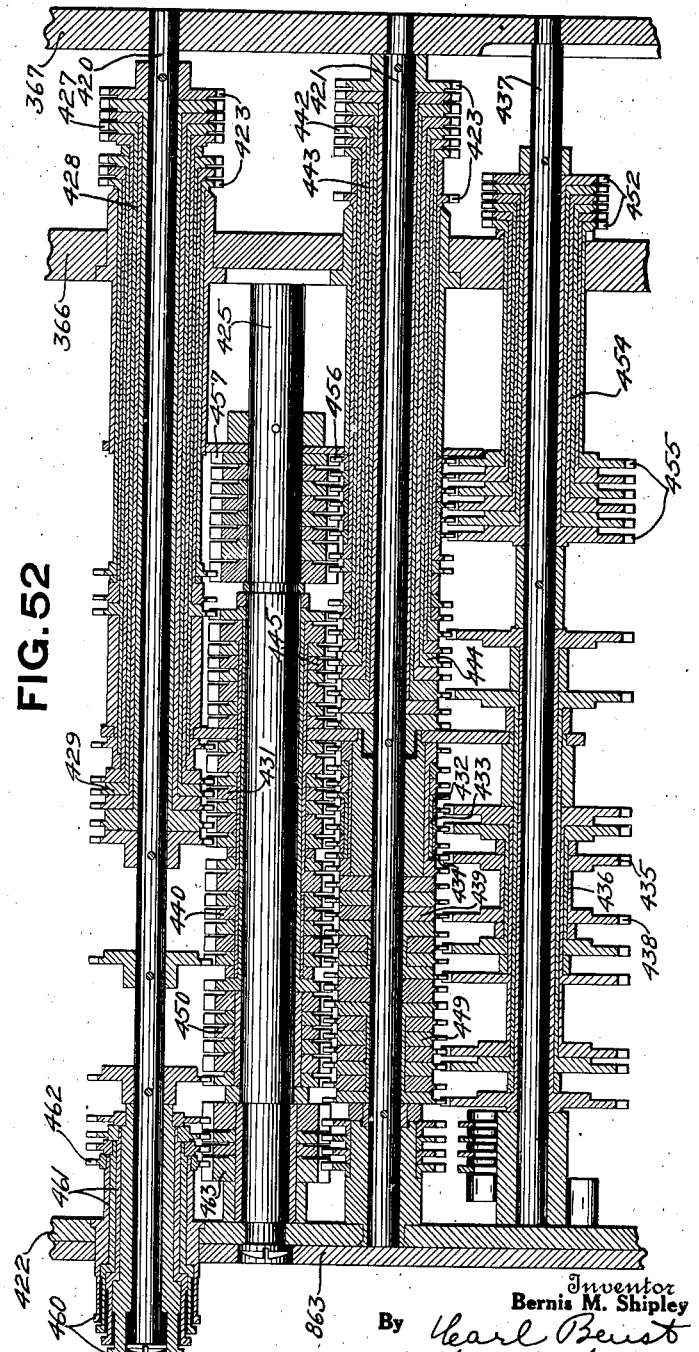

Inventor
Bernis M. Shipley
By Carl Beust
Henry E. Stauffer
His Attorneys

June 3, 1930.                B. M. SHIPLEY                 1,761,542
                              CASH REGISTER
                          Filed Jan. 2, 1923          23 Sheets-Sheet 20
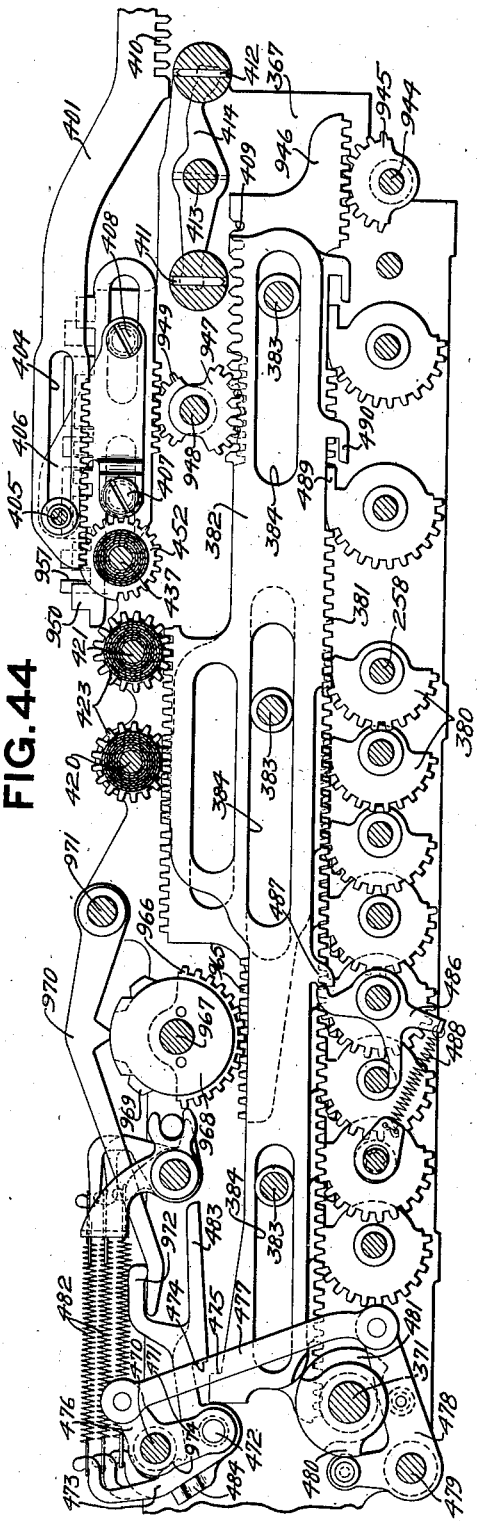
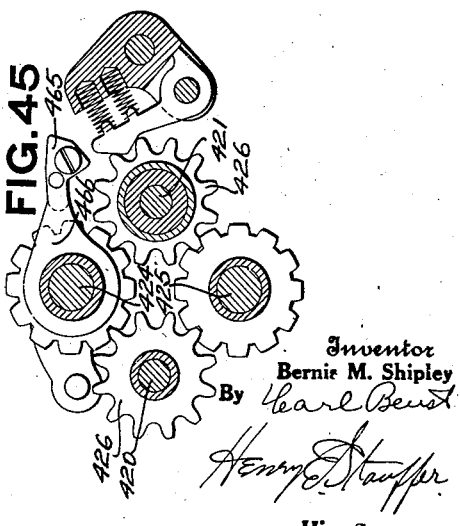
Inventor
Bernie M. Shipley
By
His Attorneys

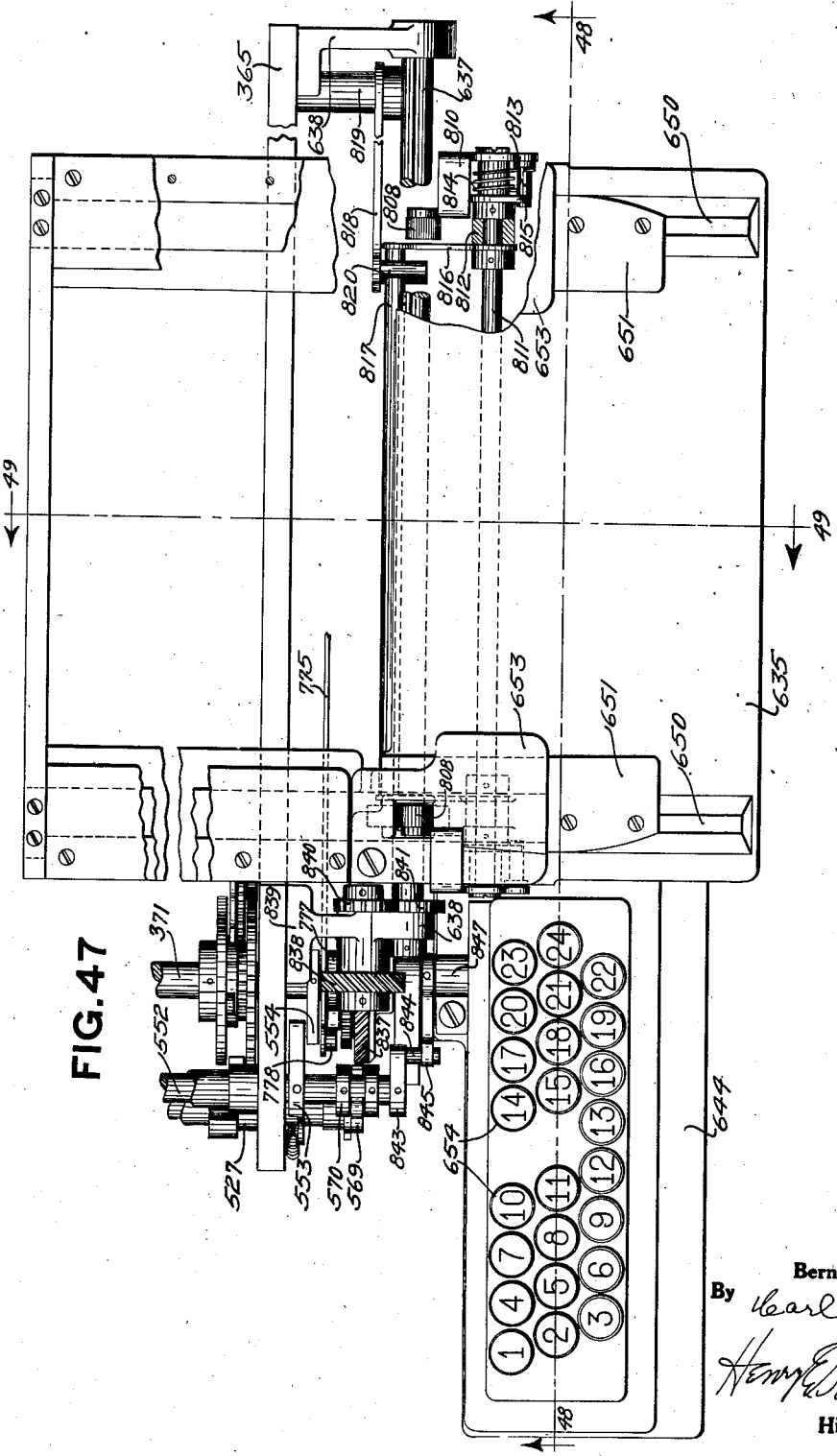

June 3, 1930.　　　　B. M. SHIPLEY　　　　1,761,542
CASH REGISTER
Filed Jan. 2, 1923　　23 Sheets-Sheet 22
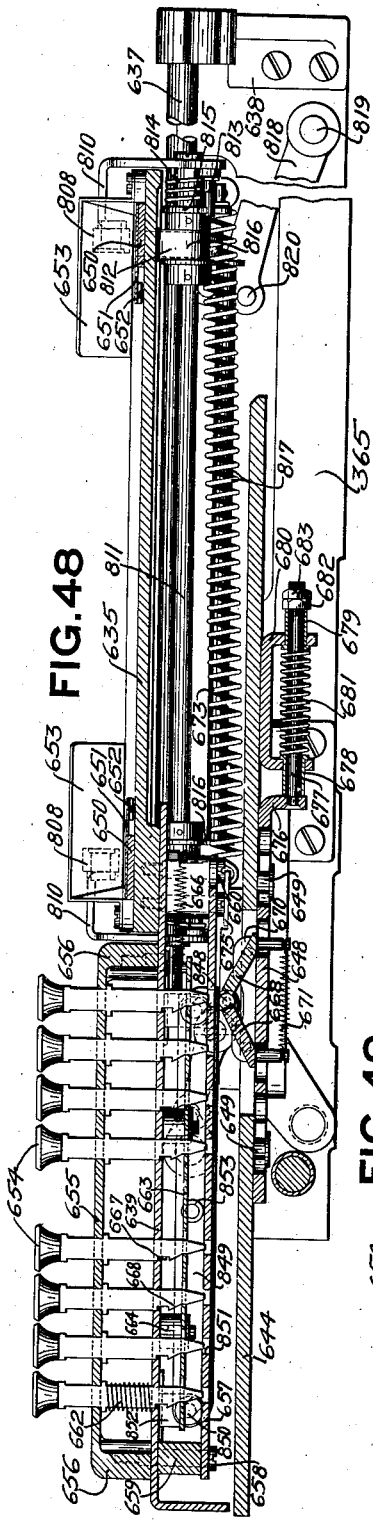
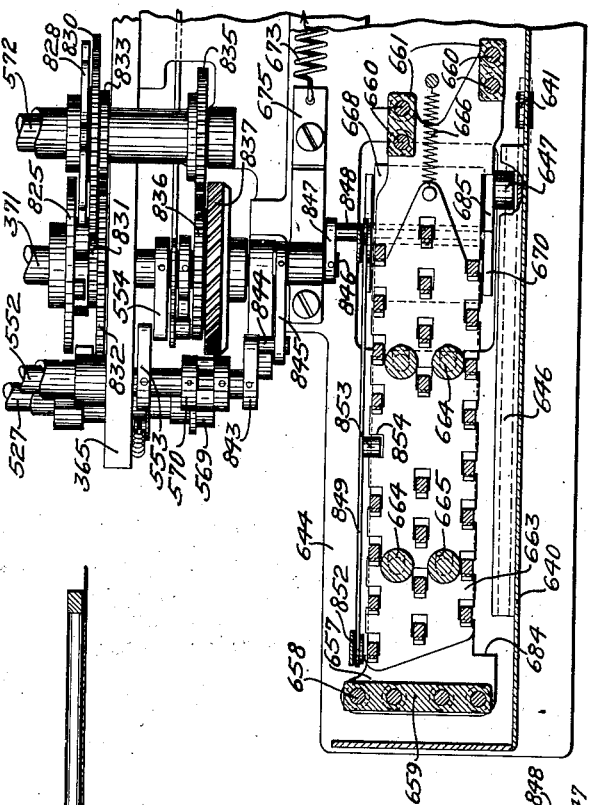
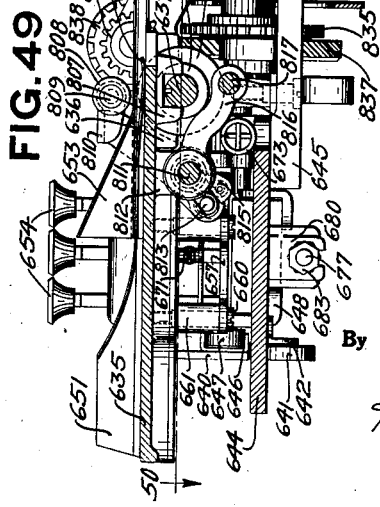
Inventor
Bernis M. Shipley
By
His Attorneys June 3, 1930.  B. M. SHIPLEY  1,761,542

Figures 53, 54, 55:
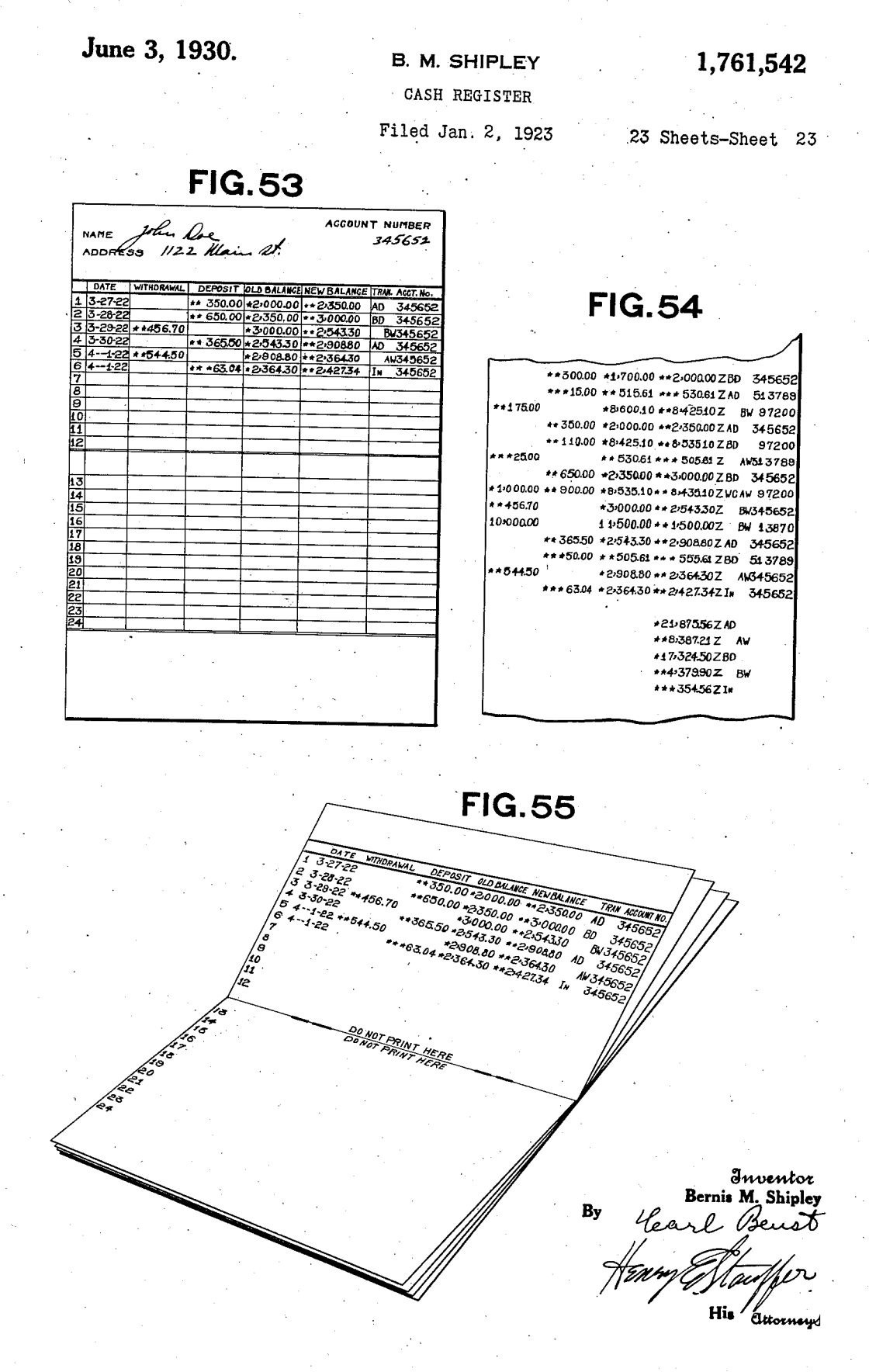

CASH REGISTER

Filed Jan. 2, 1923  23 Sheets-Sheet 23

Inventor
Bernis M. Shipley
By Hearl Beust
Henry E Stauffer
His Attorneys

Patented June 3, 1930

1,761,542

UNITED STATES PATENT OFFICE

BERNIS M. SHIPLEY, OF DAYTON, OHIO, ASSIGNOR, BY MESNE ASSIGNMENTS, TO THE NATIONAL CASH REGISTER COMPANY, OF DAYTON, OHIO, A CORPORATION OF MARYLAND

CASH REGISTER

Application filed January 2, 1923. Serial No. 610,273.

This invention relates to cash registers and the like and has more particular relation to the type of machine shown and described in Letters Patent of the United States, No. 1,230,864, issued to W. A. Chryst on June 26, 1917; Nos. 1,242,170 and 1,394,256, issued to F. L. Fuller on Oct. 9, 1917 and Oct. 18, 1921, respectively; and also Letters Patent of the United States, No. 1,619,796, granted to the present applicant, on March 1, 1927.

One object of the present invention is to provide a machine adapted for use in savings banks and similar institutions.

Another object of the invention is to construct a machine so that a plurality of differential mechanisms may be controlled by a single bank of keys.

Still another object of the invention is to provide mechanism whereby, if a key in one bank is depressed, the keys in certain other banks are held against depression.

A further object is the provision of novel mechanism to lock the machine against operation.

Another object is to include a set of keys which will select any line on the record material to receive the impression.

Still another object is to provide a carriage for the record material which will properly position said record material under control of said selecting keys.

Another object is to provide a plurality of hammers for taking an impression on the record material and means for selecting one or more of said hammers for operation.

A still further object is to protect the record material against any impression except the one selected.

With these and incidental objects in view, the invention consists of certain novel features of construction and combinations of parts, the essential elements of which are set forth in appended claims and a preferred form of embodiment of which is hereinafter described with reference to the drawings which accompany and form part of this specification.

Of said figures:

Fig. 2 is a section through the machine taken just to the right of the release or motor bar, and also shows the mechanism for giving the machine two cycles of operation on totalizing operations.

Fig. 3 is a section taken on line 3—3 of Fig. 2, looking in the direction of the arrows.

Fig. 7 is detail sectional view of part of the mechanism actuated by the release or motor bar.

Fig. 8 is a detail rear elevation of the release mechanism.

Fig. 9 is a section through the machine taken to the left of an amount bank and looking toward the right.

Fig. 13 is a detail sectional view of the mechanism to prevent the depression of a key in more than one control bank at a time.

Fig. 14 is a detail elevation of the mechanism of Fig. 13.

Fig. 15 is a section through the machine taken just to the right of the deposit bank, looking towards the left.

Fig. 17 is a front elevation of the upper and front totalizer lines. The upper line in this figure carries the adding and subtracting totalizer.

Fig. 18 is a diagrammatic view of the control banks and the total lever positions.

Fig. 19 is a detail view of the control plate which corresponds to the deposit bank.

Fig. 20 is a detail view of the control plate which corresponds to the withdrawal bank.

Fig. 21 is a detail view of the mechanism for driving the printer, and also shows the means for disabling the printer drive during the first cycle of operation of the register when a total is taken.

Fig. 22 is a detail side elevation of the mechanism for locking the total lever plate upon the release of the machine.

Fig. 23 is a detail view of a portion of the mechanism shown in Fig. 21.

Fig. 24 is a side elevation of the total lever plate, together with various mechanisms cooperating therewith.

Fig. 25 is a left hand side elevation of the machine with the motor removed and shows the motor clutch mechanism and a portion of the printing mechanism.

Fig. 29 is a top plan view of the printing mechanism.

Fig. 30 is a detail top plan view of the inner end of the inking roll with a portion of the roll broken away.

Fig. 31 is a section through the printing mechanism taken on the line 31—31 of Fig. 29, looking in the direction of the arrows.

Fig. 32 is a detail view of the cam for operating the ribbon feed and the lower impression disabling mechanism.

Fig. 33 is a detail view of the cam for operating the lower hammer restoring means.

Fig. 34 is a detail view of the Geneva wheel and its cooperating mechanism for operating the upper impression mechanism.

Fig. 35 is a detail top plan view of the shield for protecting the book and card against impressions, except those made by selected hammers on any certain operation.

Fig. 36 is a horizontal sectional view through the printing mechanism.

Fig. 37 is a detail view of the Geneva wheel for operating the card ejecting mechanism.

Fig. 38 is a detail side elevation of the upper impression mechanism.

Fig. 39 is a detail view of the upper and lower impression means, together with the mechanisms for selecting certain impression means, for disabling the lower impression means, and for restoring the lower impression means.

Fig. 40 is a detail view of the device which disables the lower impression means when neither card nor book has been inserted in the machine.

Fig. 44 is a section through the printing mechanism taken on the line 44—44 of Fig. 29, looking in the direction of the arrows.

Fig. 45 is a detail sectional view showing the upper and lower type lines, together with the means for setting the type wheels.

Fig. 46 shows a portion of the racks for setting up the ledger number type wheels.

Fig. 47 is a top plan view of the card and book carriage, and also shows the card ejectors and tension mechanism.

Fig. 48 is a detail sectional view taken on the line 48—48 of Fig. 47, looking in the direction of the arrows.

Fig. 49 is a detail sectional view taken on the line 49—49 of Fig. 47, looking in the direction of the arrows.

Fig. 50 is a detail horizontal section taken on the line 50—50 of Fig. 49, looking in the direction of the arrows.

Fig. 51 is a side elevation, partly in section, of the upper type line.

Fig. 52 is a sectional view of the lower type line and the tube lines for setting up both the upper and lower type lines.

Fig. 53 is a facsimile of the individual account card upon which the present machine is adapted to print.

Fig. 54 is a facsimile of a fragmentary portion of the detail or audit strip, as printed by the present machine.

Fig. 55 is a facsimile of the pass book adapted to be used with the present machine.

Fig. 56 is a detail view of a portion of the manual impression disabling mechanism for the lower platens.

Fig. 57 is a detail of the line selecting key release mechanism.

GENERAL DESCRIPTION

Figure 1:
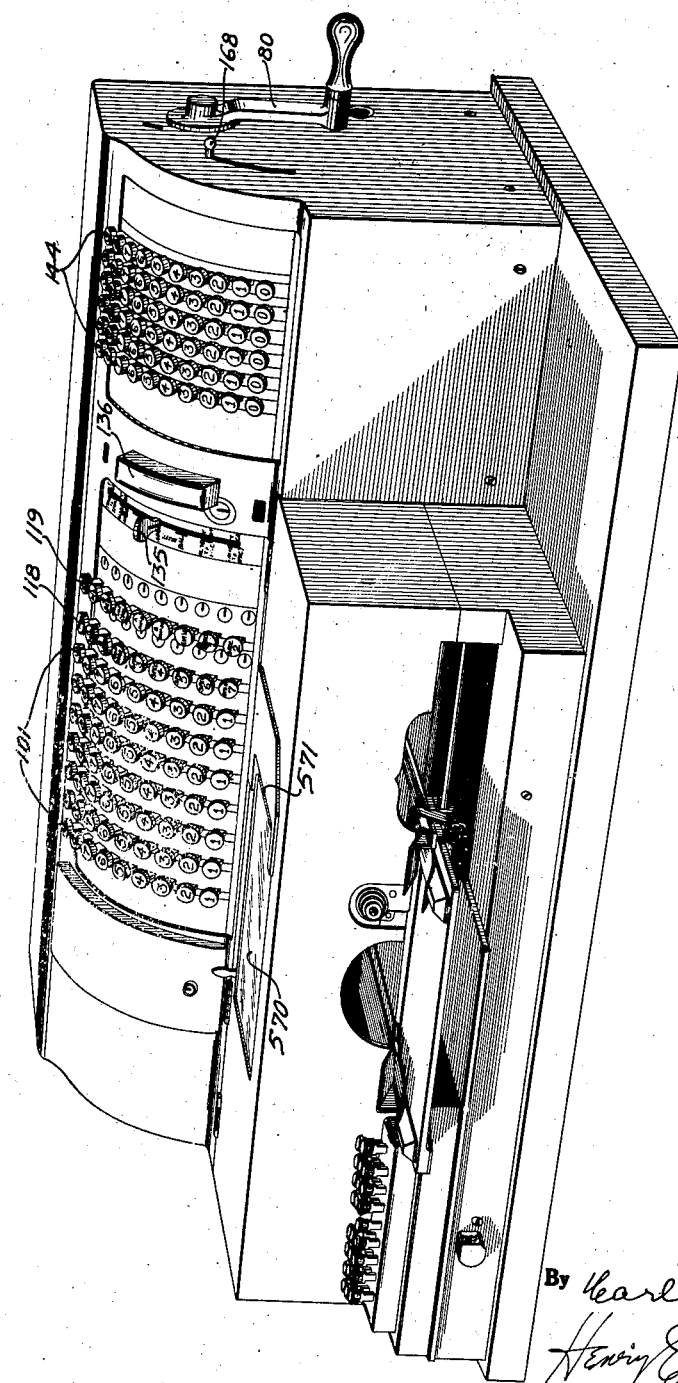
Fig. 1 is a perspective view of the entire machine, with the cabinet in place thereon.

Described in general terms, the machine embodying the present invention is one particularly suited for use by tellers in savings banks or similar institutions. The machine as shown herein is adapted to be used by two tellers, although a greater number can be provided for without in any way departing from the spirit of the invention.

In institutions of this type the principal transactions handled by the tellers consist either of entering withdrawals or deposits, and it is therefore the principal function of the present machine to take care of such transactions. If, for instance, a customer desires to make a deposit the teller first withdraws the account card from his file and enters on the keyboard the customer's account number, together with the amount of the customer's present balance, as shown by the card. The machine is operated and the old balance is entered upon an adding and subtracting totalizer. It is also printed upon the detail or audit strip, the customer's account card and his passbook. The amount of the deposit is then entered upon the keyboard, the deposit key depressed and the machine released, whereupon the amount of the deposit is added to the amount of the old balance, which has previously been entered on the adding and subtracting totalizer. The amount of the deposit is printed on the audit strip, card and passbook. The total lever is then moved to the balance position and the machine released, whereupon the total of the old balance and the deposit which forms the new balance will be printed upon the detail strip, card and passbook and at the same time the adding and subtracting totalizer will be returned to zero. The depression of the deposit key controls the selection of a totalizer which will also receive the amount of the deposit, and another totalizer is automatically selected, which receives the totals of the deposits of all the tellers.

Practically the same procedure is carried out when the customer desires to make a withdrawal. In this case, the old balance is first entered upon the adding and subtracting totalizer and printed as above described. The amount of the withdrawal is then set up on the keyboard and the withdrawal key corresponding to the teller handling the transaction is depressed. Then when the machine is operated, the amount of the withdrawal is subtracted from the amount of the old balance standing on the adding and subtracting totalizer. Then when the total lever is moved to the balance position the new balance will be printed, as above described, and the adding and subtracting totalizer returned to zero. The withdrawal key also controls a totalizer which accumulates all the withdrawals of that particular teller and the withdrawal key automatically selects another totalizer in which the total withdrawals handled by all tellers are accumulated.

Means are provided for correcting either a deposit or withdrawal if a mistake has been made. Keys are also provided for entering duplicate deposits in case a deposit has previously been made but has not been entered in the customer's passbook.

As above mentioned, the machine prints the old balance, either the deposit or the withdrawal, and the new balance, together with the customer's account number, on a detail strip, the account card and the passbook. The date is also printed on the card and passbook, but not on the detail strip. When an entry is to be made, the book and account card are placed on a table, under appropriate guides, and slid beneath the printing wheels. A line selecting mechanism is provided whereby it is necessary only to press a key and the table can be moved to the proper position to print on the next vacant line. The first impression is made upon the account card, which is then ejected from the machine, and the second impression made upon the passbook. When the total, or new balance, is printed, the table is automatically returned to its normal position.

*Operating mechanism*

The present machine may be operated either by an electric motor or a crank handle, as desired. Any suitable type of motor may be used, and none is therefore shown herein. The motor is adapted to drive a clutch mechanism, shown in Fig. 25, and which is old and well known in the art. A very brief description, therefore, is considered sufficient. The motor drives a clutch shell 50 adapted to cooperate with three rollers 51 loosely mounted on pins carried by a disk 52. The disk 52 has a shoulder 54 normally engaged by a stop 55 carried by a lever 56 loosely mounted on a stud 57 in side frame 58 of the machine. Fast to the lever 56 is an arm 59 normally under tension in a counter-clockwise direction due to a spring 60 extending between the end of said arm and a stud on the frame 58. At its opposite end the arm 59 carries a pin 61 which cooperates with a hook 62 of a lever 63 fast on a shaft 64 supported by the machine side frames. This hook 62 normally prevents the lever 59, and therefore arm 56, from being rocked counter-clockwise to remove the stop 55 from the shoulder 54 of disk 52. When the machine is released the shaft 64 will be rocked counter-clockwise by mechanism to be hereinafter described and will rock the hook 62 from under the pin 61 on arm 59 and permit this arm to rock counter-clockwise, thereby moving the stop 55 from engagement with said shoulder. When the stop 55 is thus rocked, a disk (not shown herein, but which is normally under spring tension) is released and engages a roller 65 carried by an arm 66 loose on a stud 67 on the frame 58. This arm 66 has a finger 68 which contacts with a roller 69 carried by an arm 70. When the arm 66 is rocked clockwise the finger 68 thereof engages the roller 69 and rocks the arm 70 clockwise. This arm 70 carries a bar of insulating material engaging spring contacts 71 and its movement causes these contacts to meet a stationary contact 72 and close the circuit for the electric motor. Fast on a sleeve loose on the stud 53 is a pinion 74 which engages with a gear 75 mounted on a stud on the side frame 58.

This gear in turn engages with a gear 76 fast on a shaft 77 which is rotatably mounted in the machine side frames and is the main driving shaft of the machine. The gear 75 carries a pin 78 which when the gear 75 nears the end of its rotation comes into contact with the lower edge of an arm 79 pivoted at its upper end to the lever 56. The engagement of the pin 78 with the arm 79 raises this arm and rocks the lever 56 clockwise far enough for the hook 62 to pass beneath the pin 61 on the arm 59 and hold said lever in its normal position. When the lever 56 is rocked as just described, it will be rocked clockwise into such a position that it will engage the shoulder 54 of the disk 52 and stop the machine in its zero position. This type of motor clutch is fully illustrated and described in the United States Letters Patent to C. F. Kettering and W. A. Chryst, No. 1,144,418, granted June 29, 1915.

Figure 4:
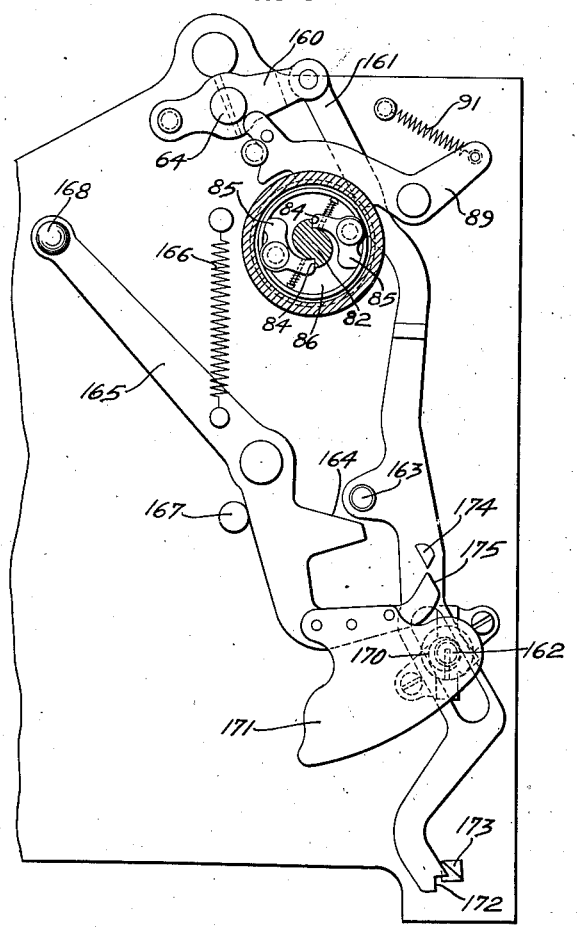
Fig. 4 is a detail view of the mechanism for releasing any erroneously depressed keys and for locking the machine against operation.
Figure 5:
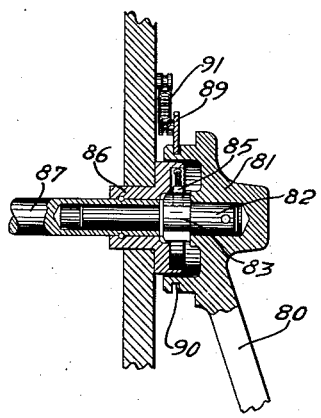
Fig. 5 is a detail sectional view of the mechanism for connecting the crank handle to the machine.

If for any reason it is not desired to use the electric motor to operate the machine, a crank handle 80 (Figs. 1 and 5) is provided. The crank handle consists of a hub 81 (Fig. 5) in which is rigidly mounted a short rod 82. Formed integral with the rod 82 (Fig. 4) are projections 83 which form two shoulders 84 against which two spring-pressed pawls 85 normally abut. These pawls are mounted upon a hub 86 secured to a shaft 87 supported by the frames of the machine. It can be seen from Figs. 4 and 5 that when the crank handle 80 is rotated in a clockwise direction, the shoulders 84 on the rod 82 will contact with the pawls 85 and thereby, through the hub 86, rotate the shaft 87. The rod 82 is inserted into a hole in the end of the shaft 87 and is held in this position by means of a lever 89, the lower edge of which engages in a groove 90 cut in the outer periphery of the hub 81. The lever 89 is held in contact with this groove by a spring 91 stretched between the end of said arm and a pin on the frame. If it is desired to remove the crank handle all that is necessary is to manually lift the lever 89 until its lower edge is disengaged from the groove 90, then the rod 82 can be withdrawn from the hole in shaft 87. It can be seen that when the machine is operated by the motor, the pawls 85 will ride over the projections 83 and drop off of the shoulders 84 but will have no effect on the crank handle, leaving it in its normal position.

Fast on the shaft 87, driven by the rotation of the crank handle as above described, is a gear 93 (Fig. 2) which meshes with a gear 92 rotatably mounted on a stud 94 carried by the machine frame. This gear 92 in turn meshes with a gear 95 fast on shaft 77, which is the main drive shaft of the machine. The ratio of these gears is such that the shaft 77 is given one complete rotation when the crank handle is given two rotations.

KEYBOARD

Amount keys

Figure 6:
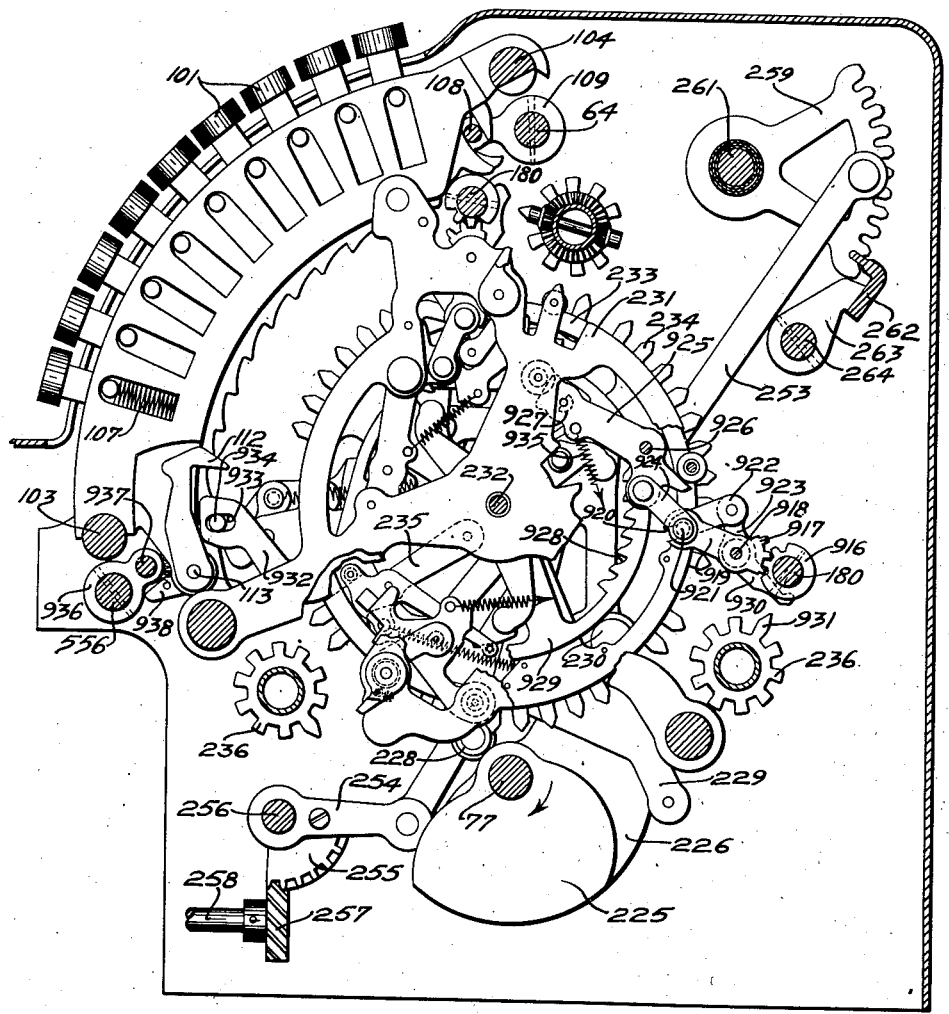
Fig 6 is a section through the machine just to the right of one of the amount banks, looking toward the left.

There are seven banks of amount keys 101 (Figs. 1, 6 and 9) in the present machine. These amount banks are identically the same as the amount banks shown and described in the above mentioned patents and therefore but a brief description thereof will be given herein. Keys 101 are slidably mounted in key frames 102 supported at their lower ends upon a rod 103 and at their upper end upon a rod 104. Each of these keys cooperates with a detent 105 and a locking bar (not shown), and is held in its normal outer position by springs 107 contacting with pins carried by the shanks of the keys. Each of these keys has a shoulder which, when the key is depressed, contacts with a corresponding pin on the detent 105, thereby rocking said detent downwardly until the shoulder on the key has passed the pin on the detent, whereupon the detent will move upwardly far enough to prevent the key from returning to its normal outer position. The keys are released near the end of the operation of the machine by a rod 108 carried by a plurality of arms 109 fast on a shaft 64. The rod 108 cooperates with a tail 111 of the detent 105 and when the shaft 64 is rocked clockwise, by means to be later described, near the end of the operation, the detent is moved downwardly far enough to permit the shoulders on the keys to pass the pins carried by the detent and thereby be returned to their normal positions.

Cooperating with each bank of amount keys is a zero stop pawl 112 (Fig. 9), the function of which will be described later. These pawls are fast on short shafts 113 mounted in the key banks. These shafts 113 also carry arms 114 which in turn support pins 115 engaged by arms 116 pivoted to the key banks and also pivotally connected to the lower ends of the detents 105. The zero stop pawls 112 are normally in the position shown in Fig. 9, but when a key in its corresponding bank is depressed the lowering of the detent 105 rocks the arm 116 counterclockwise, which, through pin 115, arm 114 and shaft 113, rocks the zero stop pawl 112 clockwise to its ineffective position. The zero stop pawl is normally maintained in its effective position by a spring 117 (Fig. 9) extending between a pin on a projection of arm 115 and a pin on the key bank.

Withdrawal and deposit banks

To the right of the amount keys, as seen in Fig. 1, there is first a bank of keys 118 which, for the purposes of this specification, will be called the "Withdrawal" keys. The next bank to the right will be known as "Deposit" keys 119. As can be seen in Fig. 18, the withdrawal bank contains first the transfer key, then the A and B withdrawal keys, each of these keys being appropriate to a separate teller, then the deposit correction key and five special keys. In the deposit bank there is first the old balance key, then the A and B deposit keys, the withdrawal correction key, the A and B duplicate deposit keys, the interest key, and two special keys. The keys and their cooperating mechanisms in these two banks are quite similar, with some small exceptions, which will hereinafter be pointed out, and the description of one of these banks will therefore apply to both of them.

The keys are mounted in key banks 120 (Fig. 15) similar to the key banks 102 for the amount keys and supported on the rods 103 and 104 before described. The keys have shoulders cooperating with pins carried by a detent 121 which holds the keys in depressed position, as described in connection with the amount keys. These keys 118 and 119 are released near the end of an operation by the same mechanism which releases the said amount keys.

Mechanism is provided to prevent a key in the deposit bank from being depressed when there has been a key depressed in the withdrawal bank, or vice versa. Slidably mounted on a shaft 556 are two collars 123 and 124. These collars are shaped so as to conform to the rod 103 above mentioned to prevent turning of said collars. Loose on said shaft 556 are two collars 125 and 126. Fast on said shaft to the left of collar 125 (Fig. 14) is an arm 958 the function of which will be later described. A spacing collar is located between arm 958 and collar 125 and thereby prevents any lateral movement of the collars 125 and 123 towards the left. Also fast on shaft 556 is an arm 936 which lies immediately adjacent the collar 126 and thereby prevents lateral movement of the collar 126 to the right. All of the collars 123, 124, 125 and 126 carry flanges which have their corners beveled, as seen in Fig. 14. These beveled corners cooperate to form V-shaped notches.

Pivoted to the key bank 120 for each of these banks is an arm 130 (Fig. 13) to which is pivoted the lower end of the detent 121. It can be seen that when the detent 121 is lowered, due to the depression of a key in that bank, the arm 130 will be rocked clockwise (Fig. 13). This arm 130 has a beveled edge 131 which normally lies opposite the V-shaped notch formed by the beveled corners of the flanges 125, 126 and 127. When the arm 130 is rocked clockwise, as above described, the beveled edge thereof wedges between the flanges 126 and 127 or between the two flanges 127 and forces the collar 124 one way or the other upon the shaft 122, depending upon in which bank a key was depressed. It can be seen from Fig. 14 that there is room for only one of the arms 130 to enter between the collars 123 and 124, as the movement of the parts is limited by arms 958 and 936 which are fast to the shaft. Therefore, if an attempt is made to depress a key in the withdrawal bank when a key in the deposit bank has already been depressed, the arm 130 will not be able to wedge its way between the collars and it will therefore be impossible to depress this key. The arm 130 is also used to rock the zero stop pawl 112 of its respective bank out of its effective position if a key is depressed. The zero stop pawl 112 for this bank carries a pin 132 engaged by the arm 130, and when this arm is rocked clockwise, as above described, it is evident that the zero stop pawl will be rocked counter-clockwise to its ineffective position.

*Balance bank*

Figure 12:
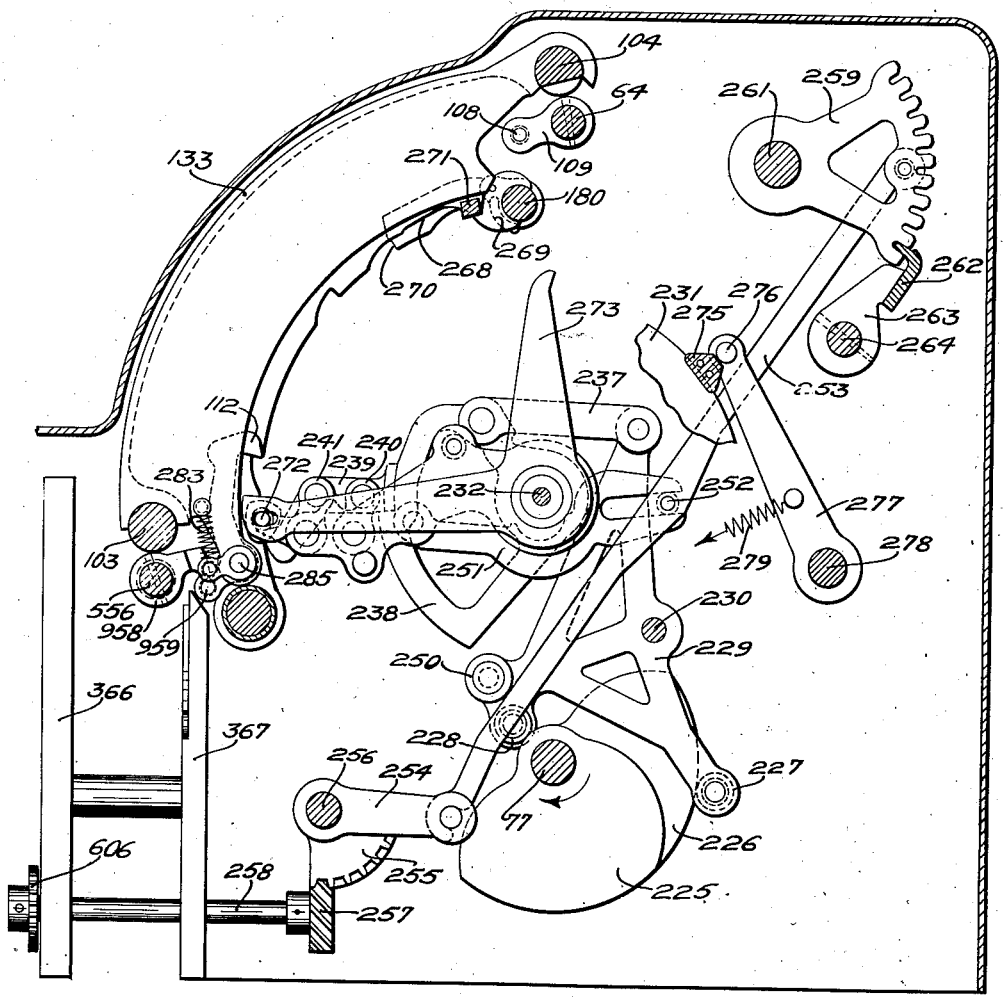
Fig. 12 is a section through the machine, taken to the right of the "Bal." bank and looking towards the left.

There are no keys in the "Balance" bank 133 (Fig. 12). The differential mechanism for this bank is controlled by other means which will be fully described later.

*Total lever*

Next to the "Balance" bank is the total lever 135 (Figs. 1 and 24). This lever controls the machine on total and sub-total printing operations in a manner well known in the art and fully shown and described in the beforementioned patents.

*Release bar*

A release or motor bar 136 is provided to release the machine. It has a shank 137 (Fig. 2) bifurcated to straddle screws 138 mounted on a slide 139 supported by screws 140 mounted in the frame of the machine and projecting through slots 141 in said slide 139. This slide also carries a stud 142 which cooperates with mechanism to release the machine, as will be hereinafter described. It is evident that the release bar can be removed from the machine by simply pulling it straight out. This will prevent the operation of the machine until the bar is again inserted.

*Account number keys*

At the extreme right of the machine are keys 144 which control printing mechanism to be hereinafter described for printing the account number on the detail strip, card, and book. These keys are mounted in a frame 145 (Fig. 16) mounted on rods 1030 and 1040 identical with rods 103 and 104, before described. The keys are held in place by frames 151, also carried by rods 1030 and 1040. Each key has a flattened pin 152 which cooperates with hooks 153 of a detent 154 integral with an arm 155 loose on a shaft 156 supported by the machine side frames. The hooks 153 are held against the pins 152 by springs 150 stretched between detent 154 and a rod supported by the machine frames. The keys are held in their normal position by springs (not shown).

Figure 16:
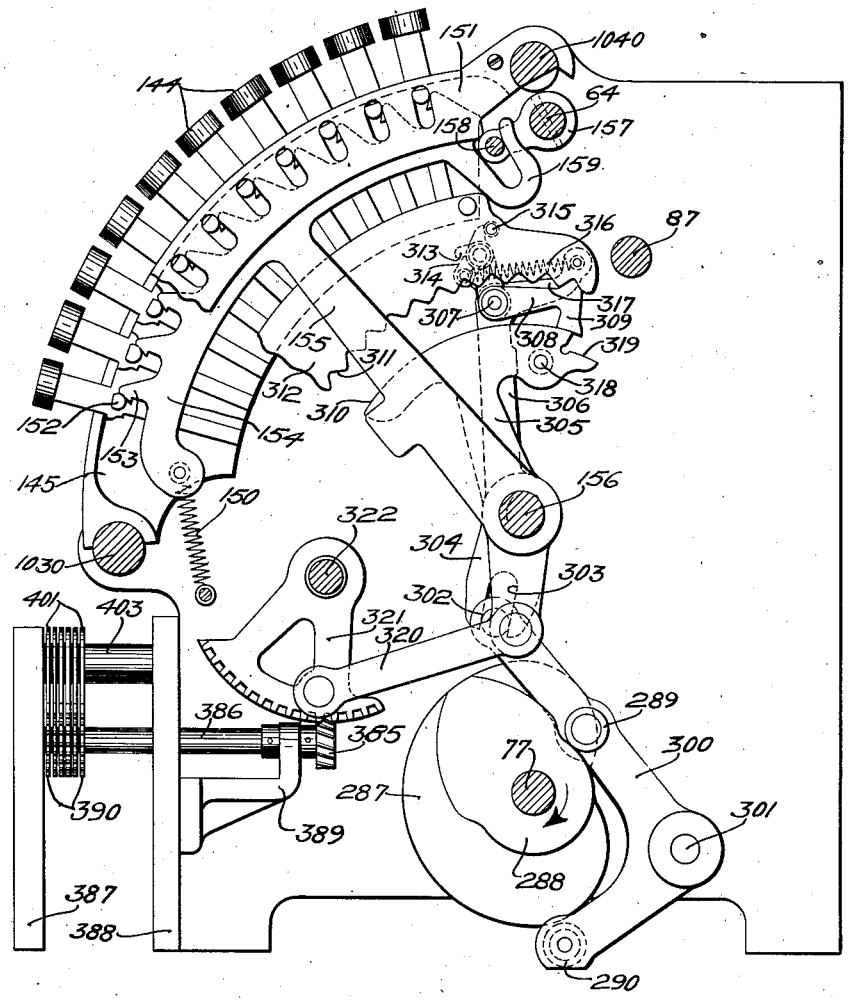
Fig. 16 is a section taken through the machine beside one of the ledger number banks.

When a key 144 is depressed, its pin 152 moves the detent 154 and arm 155 clockwise until the pin is below the hook 153, whereupon the spring returns the detent and arm to normal, thus locking the key in depressed position. When the amount, withdrawal and deposit keys are released near the end of the operation of the machine, the keys 144 are also released at the same time. To accomplish the release of these keys there are two arms 157 (only one of which is shown in Fig. 16) carrying between them a rod 158 engaging a hook 159 integral with detent 154 for each bank. When the operating mechanism is released and the shaft 64 is rocked clockwise the rod 158 does not move the detent 154. But as the shaft 64 is rocked counter-clockwise to release the amount, withdrawal and deposit keys, the rod 158 through its engagement with the hook 159 rocks the detent 154 and arm 155 clockwise, thereby disengaging the hook 153 from the pin 152 and their springs return the depressed keys to normal, after which the shaft 64 is rocked clockwise to normal, thereby allowing the spring 150 connected to detent 154 to return this detent and arm 155 to normal.

Manual key release

It may happen that the operator will make a mistake in the depression of the keys. In order to enable him to correct this mistake, mechanism is provided to manually release the keys. It will be remembered that the keys are automatically released when the shaft 64 is rocked counter-clockwise near the end of the operation. In order to release the keys manually all that is necessary is to provide manual means for rocking this shaft. On the extreme right hand end of this shaft 64 is an arm 160 (Fig. 4) to which is pivoted a link 161 slotted near its lower end to receive a key barrel 162 supported by the side frame of the machine. Near the center of this link 161 is a roller 163 adated to cooperate with an edge 164 of a lever 165 pivotally mounted on said side frame. A spring 166 stretched between this lever and a stud on the frame tends constantly to rock this lever in a clockwise direction, but this movement is limited by a stud 167, also projecting from the frame. A handle 168 is secured to the upper end of lever 165 and projects through a slot in the cabinet of the machine (Fig. 1).

When an error has been made in the depression of the keys the handle 168 is pulled downwardly, thereby rocking the lever 165 counter-clockwise and bringing the edge 164 thereof into engagement with roller 163. This movement of lever 165, through roller 164, raises link 161 and rocks arm 160 and shaft 64 counter-clockwise, which will cause the depressed keys to be released, as above described.

There is a lug 174 carried by the link 161, which, when the machine is released, moves down opposite the end 175 of lever 165 and prevents the operation of this lever to release any depressed keys during an operation.

Machine lock

Means are also provided for locking the machine against operation when desired. It will be recalled that link 161 has a slot therein through which projects the key barrel 162. This key barrel has integral therewith an eccentric 170 cooperating with said slot. The lever 165 has riveted thereto a shield 171 which normally covers the key hole in the key barrel 162. When it is desired to lock the machine the lever 165 is rocked counter-clockwise by the handle 168 until the said key hole is uncovered. The key is then inserted and turned, which, due to the eccentric on the key barrel 162 rocks the link 161 counter-clockwise about its pivot. Then the key is removed and lever 165 returned to normal by spring 166 and when the link 161 moves downwardly, a notch 172 in its lower end rests on a square stud 173 mounted in the side frame. It can, therefore, be seen that if it is attempted to release the machine it will be impossible to do so, as the link 161, through arm 160, prevents the shaft 64 from being rocked for this purpose.

When the machine is unlocked, the key is rotated in the reverse direction and the eccentric 170 moves the link far enough to the left so that when it is lowered upon the release of the machine its lower end will clear the stud 173 and therefore permit the completion of the releasing movement.

Release mechanism

The driving mechanism is released when the release bar 136 is depressed by the operator. When this occurs, the slide 139 is slid inwardly on the screws 140. This slide carries a pin 142 (Figs. 2, 7 and 8) which extends through a slot 175 in the side frame into the bifurcated end of a lever 176 pivoted on a stud 177 mounted in the side frame. The other end of the lever 176 carries a pin 178 projecting through the bifurcated end of an arm 179 pivoted on the upper one of three shafts 180 supported by the machine frames. This arm 179 is made integral with a hook 181 by a yoke 182. The hook 181 cooperates with a pin 183 carried by an arm 184 pivoted on the shaft 64 which runs entirely across the machine and is supported by the side frames thereof. Arm 184 is made integral with an arm 185 by a yoke 186, and the arm 185 has teeth 187 formed on its lower end which mesh with teeth formed on a collar 188 carried by shaft 180. This collar 188 has an arm 189, the flattened end of which engages a flat side of a pin 190 carried by an arm 191 loose on the release shaft 64. Integral with the arm 191 is a projection 192 which has a flat side cooperating with a pin 193 carried by an arm 194 fast on shaft 64. An arm 195 loose on the shaft 180 lies against and is connected to the arm 189 by a spring 196.

When the release bar 136 is depressed to release the machine the lever 176 is rocked counter-clockwise (Fig. 7) by the slide 139 and pin 142. This movement through pin 178 rocks arm 179, yoke 182 and hook 181 clockwise. The hook engages the pin 183 and rocks said pin and its arm 184 clockwise, thereby also rocking arm 185 through yoke 186 in the same direction. This movement of arm 185 through its teeth 187 rocks collar 188 counter-clockwise and thereby moves the arm 189 from in front of pin 190, thereby stretching spring 196 as the arm 195 contacts with the pin 190 and cannot rotate with collar 188 and arm 189. This movement permits the pin 190 to move to the left (Fig. 7) between the arms 189 and 195. As the pin 190 is carried by arm 191, this arm and the projection 192 are rocked clockwise (Fig. 7). This movement of the projection 192 permits the pin 193 and arm 194 and therefore the release shaft 64 which is constantly under tension in a clockwise direction due to a spring 197 (Fig. 2), to be rocked clockwise (Figs. 2, 4, 6, 7 and 8) and counter-clockwise (Fig. 9).

The means for restoring the shaft 64 to its normal position at the end of an operation will now be described. It will be remembered that when the shaft 64 is released it is rocked clockwise (Fig. 2) by means of the spring 197. This spring surrounds pilots 205 on two arms mounted on a stud 206 carried by an arm 207 fast on shaft 64. This spring 197 is compressed between shoulders at the base of the pilots 205 and the lower end of a slot 208 in a link 209, and through the upper end of which projects stud 206. Pivoted on a stud 210 in the side frame is an arm 211 which at its end carries a pin 212 projecting through an opening 213 in the link 209. This arm 211 also carries a roller 214 projecting into a cam groove 215 in the gear 92. This gear receives a one-half rotation at every adding or subtracting operation of the register. Just before the gear finishes its one-half rotation, a node 216 of the cam groove 215 cooperates with roller 214 on arm 211 and thereby first lowers and then raises said arm. When the shaft 64 is released the stud 206 moves to the upper end 217 of the slot 208 in link 209 under the influence of spring 197. When, therefore, the arm 211 is lowered, as above described, the link 209 is lowered to its normal position due to the engagement of pin 212 on arm 211 with a shoulder 218 on link 209. When the link 209, arm 207 and shaft 64 are returned to normal position the pin 193 (Fig. 7) on arm 194 comes into contact with a surface 220 of a restoring lever 221 pivoted on shaft 180 and rocks said lever counter-clockwise. This restoring lever has a tail 222 contacting an extension 199 of the pin 190. When, therefore, the lever 221 is rocked counter-clockwise, as above described, the tail 222, through the extension 199, will rock the arm 191 counter-clockwise and permit the arm 189 of collar 188 to rock clockwise under the influence of spring 196. This movement of collar 188 moves arm 185, hook 181, arm 179, lever 176, slide 139 and key 136 to their normal positions, assisted by a spring 223 extending between lever 196 and a stud on the frame.

Differential mechanism

The differential mechanism of the machine is employed differentially to operate the different totalizers and to select them for operation, and also to set type carriers in the printing mechanism, as controlled by the banks of keys. The amount differential mechanism will be described first.

Amount differential units

There is one complete differential unit for each amount bank, but as they are all identical in construction and operation only one will be described.

To drive the differential mechanism of the machine the drive shaft 77 is provided with a plurality of pairs of cams 225 and 226 (Figs. 6 and 9), each pair cooperating with rollers 227 and 228 respectively carried by Y-shaped levers 229, of which there is one for each bank of keys in the machine. Each of these levers 229 is pivoted at 230 on a corresponding frame 231. Loosely mounted on hollow studs 245 carried by frames 231, are differentially movable actuators 233 carrying racks 234 and transfer arms 235 for operating totalizer pinions 236. A rod 232, extending through the studs 245 and frames 231, acts as a stabilizer for the differential units. The levers 229 at the ends of their upwardly extending arms are pivotally connected by links 237 to driving segments 238 loose on the rod 232. The driving segments 238 adjacent the banks of amount keys are connected to the differentially movable actuators 233 by latches 239, each of which is supported by an arm 240 and a lever 241 pivoted on the corresponding differentially movable actuator. Springs (not shown) hold the rear ends of the latches 239 in engagement with shoulders on the driving segments. When the segments 238 are driven by their cams 225 and 226 the differentially movable actuators 233 are carried with their latches up to points where the forwardly extending arms of the levers 241 engage the inner ends of the depressed amount keys. Such engagement results in disengagement of the latches from the driving segments and engagement of the forward ends of the latches with the particular one of a series of notches 242, formed in a plate 243 supported by the frame 231, which is opposite the latch when the latch is disengaged from the driving segment. Upon return movement of the driving segments to normal position a pin 244 mounted on one of the differentially movable actuators 233 is engaged by the inside of the driving segment and is returned thereby to its normal position. If a key is not depressed in an amount bank, the zero stop pawl 112 for that particular bank operates the latch to arrest the differentially movable actuator in its zero position. When a key is depressed, however, the zero stop pawl is moved out of its operative position, as above described.

*Differential mechanism for the deposit and withdrawal banks*

As the deposit and withdrawal banks serve to select totalizers, but not to accumulate thereon, no differentially movable racks are used in connection with these banks. With the exception of this fact, however, the differential mechanism for these banks is similar to that shown and described with relation to the amount banks, and the same reference numerals will be used to indicate like parts.

It can be seen from Fig. 15 that there are two cams 225 and 226 which drive a Y-shaped lever 229, connected by link 237 to a driving segment 238. This driving segment 238 cooperates with a differentially movable arm 249, in lieu of the differential actuator 233 of the amount banks. This arm 249 carries a latch 239 identical with latch 239 for the amount banks, said latch being supported by an arm 240 and a lever 241. When the cams 225 and 226 are rotated, the segment 238, through link 237 and Y-shaped lever 229, will raise the differentially movable arm 249, due to the engagement of the latch 239 with a shoulder on said driving segment until the outer end of the lever 241 comes in contact with whichever one of the keys in these banks is depressed. When this occurs, the latch 239 will be moved forwardly out of engagement with the shoulder and the forward end of said latch will engage one of a plurality of notches 242 in plate 243. If no key in the deposit or withdrawal banks is depressed, the zero stop pawls 112 for these banks will engage the ends of levers 241 and disconnect the latches 239 for these banks in the zero position as in the amount banks. If one of these keys has been depressed the corresponding zero stop pawl for that bank will be rendered inoperative.

Appropriate to each amount differential mechanism and to the deposit and withdrawal differential mechanisms is a beam 251 pivoted at one end to the differentially movable actuator 233 and arm 249 and bifurcated at its opposite end to straddle a roller 252 carried by a link 253. The beams 251 are operated by rollers 250 carried by the Y-shaped levers 229. At its lower end this link is pivoted to an arm 254 fast to a spiral segment 255 loose on a shaft 256 supported by the machine side frames. These spiral segments 255 mesh with spiral gears 257 fast on the inner ends of shafts 258, which, through mechanism to be described later, sets up the type wheels for printing the amount and other data on the various record retaining means.

At their upper ends the links 253 are pivoted to segments 259 fast to nested sleeves 260 supported by a shaft 261. An aliner 262, carried by a plurality of arms 263 fast on a shaft 264, are adapted normally to engage with teeth 265 formed on the segment 259. When the differential mechanism is operated, the aliners 262 will be moved out of engagement from the teeth 265, and when the differential movement is complete they will be again moved into engagement therewith to properly aline and hold the various mechanisms set up by the differential mechanisms in their set positions. The means for operating the aliner 262 is old and well known in the art and it is not therefore either shown or described herein.

*Balance bank differential*

Figure 10:
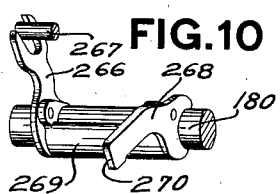
Fig. 10 is a detail view of the mechanism for breaking the latch of the Balance bank differential by the depression of the "Old balance" key in the next bank to the left.

The differential mechanism which cooperates with the balance bank is identically the same as the differential mechanism for the deposit and withdrawal banks, with one exception, which will be hereinafter mentioned. The differential mechanism for this bank is for positioning the adding and subtracting totalizer so that either the adding pinions or the subtracting pinions thereof will be in alinement with the differentially movable racks of the amount differential mechanisms. There are no keys for disconnecting the latch of the differential mechanism appropriate to this bank, as there are in the other banks of the machine. The latch is disconnected under the control of certain keys in the deposit and withdrawal banks on adding or subtracting operations and under control of the total lever on totalizing operations. As will be fully described later, the adding and subtracting totalizer is normally so positioned that the subtracting pinions thereof are in position to cooperate with the actuators. It can be seen therefore that if an operation which involves subtraction is to be entered, such as a withdrawal operation, the totalizer need not be moved, and it is therefore necessary to disconnect the latch of the balance bank differential which selects the positions of the adding and subtracting totalizer in the zero position. If however a transaction involves addition, it is necessary to disable the means for disconnecting the latch of the Balance bank in the zero position, and to provide means for disconnecting this latch in the position appropriate to the character of the transaction which will, in all cases not involving withdrawal, position the adding and subtracting totalizer to the adding position. Taking, for instance, an operation which involves the making of a deposit, the operator first depresses the old balance key, which, as can be seen from Fig. 18, is in the deposit bank. The depression of this key automatically controls mechanism, for disconnecting the latch of the balance bank differential in the seventh position. The mechanism for disconnecting the latch in this position consists of a bifurcated arm 266 (Figs. 10 and 15) loose on the shaft 180, the bifurcated end of which straddles a pin 267 carried by the shank of the old balance key in the deposit bank. The arm 266 is made integral with another arm 268 by a yoke 269 (see Figs. 10, 12 and 15). It can be seen from Fig. 15 that when the old balance key is depressed the pin 267 will rock the arm 266 counter-clockwise and through the yoke 269 will rock the arm 268 to the same extent, which will position the end 270 of this arm in the path of movement of the lever 241 which carries the latch 239 appropriate to the balance bank. Therefore, when the lever 241 comes in contact with the end 270 of the arm 268 the latch will be disconnected. The disconnecting of the latch in this position, positions the adding elements of the adding and subtracting totalizer to receive the amount of the customer's old balance.

The amount of the deposit is then set up on the amount keys, and the deposit key, either A or B, depending upon which teller handles the transaction, is depressed. Then, when the machine is operated, the differential mechanism for the balance bank moves to the 9 position, as the zero stop pawl has been moved to ineffective position by the depression of the deposit key and there are no other obstructions in its path. When the latch reaches the 9 position it is disconnected by a flattened stud 271 on what would normally be the key frame. The forward end of the lever 241 has a pin 272 which projects through a slot in the end of a lever 273 loosely mounted on the stud 232. It is the upper edge of the forwardly extending arm of the lever 273 which contacts with the flattened stud 271 for disconnecting the latch in the 9 position, as above described. The disconnecting of the latch in the 9, or deposit, position, causes the adding and subtracting totalizer to be positioned with the adding wheels in cooperative relation with the actuators so that the amount of the deposit will be added on the adding elements of this totalizer.

It is now desired to print the new balance, which is the total of the old balance and the deposit. The total lever 135 (Fig. 1) is moved downwardly to the first position below its adding position and the machine released. The movement of the total lever automatically renders the zero stop pawl for the balance bank ineffective as will be hereinafter described and, therefore, the differential mechanism for this bank will move upwardly. Integral with the total lever 135 is a plate 274 (Fig. 24) which carries riveted thereto a lug 275 which, when the total lever is in its adding position, is in contact with a pin 276 carried by an arm 277 loose on a shaft 278 supported by the machine side frames. This arm constantly tends to rock in a counter-clockwise direction due to a spring 279 attached thereto. It can be seen from Fig. 12 that when the total lever plate is moved downwardly one space to the balance position, the lug 275 will be moved out from under the pin 276 and permit the pin to rest on the periphery of the differential supporting frame 231 for this bank. Then, when the differentially movable arm 249 of this bank moves upwardly, an upwardly extending arm of the lever 273 will engage the pin 276, and through the forwardly extending arm of lever 273 and pin 272 disconnect the latch 239 in the 5 position. The disconnecting of the latch in this position will position the adding and subtracting totalizer so that the adding elements thereof are in cooperative relation with the actuators and therefore the actuators are moved under control of the adding elements in a manner well known in the art to set up and print the new balance which is on the adding and subtracting totalizer.

Figure 11:
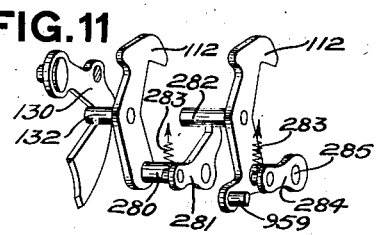
Fig. 11 is a detail showing the means for disabling the zero stop pawl of the "Balance" bank when any key in the "Dep." bank is depressed.

The mechanism for moving the zero stop pawl of the balance bank to its ineffective position when it is desired to add on the adding and subtracting totalizer will now be described. It will be remembered that when any key in the deposit bank is depressed, the moving of the key detent 121 for this bank will rock an arm 130 clockwise. This arm 130 (Figs. 11 and 15) cooperates with a pin 132 carried by the zero stop pawl 112 for the deposit bank and rocks this zero stop pawl counter-clockwise to its ineffective position. The zero stop pawl for the deposit bank is fast on a short shaft 280, which also carries a lever 281 adapted to cooperate with a pin 282 mounted on the zero stop pawl 112 for the balance bank (Fig. 11). It is clear therefore that when the zero stop pawl 112 for the deposit bank is rocked counter-clockwise to its ineffective position, as above described, the lever 281 will contact with the pin 282 and simultaneously rock the zero stop pawl 112 for the balance bank to its ineffective position, thereby permitting the differentially movable arm 249 for this bank to move upwardly and disconnect in one of the three adding positions. Springs 283, one fastened to a pin carried by lever 281, and the other attached to the end of an arm 284 mounted on the shaft 285 which supports the zero stop pawl 112 for the balance bank, are for the purpose of normally maintaining the zero stop pawls in their normal effective positions.

When a key in the withdrawal bank is depressed, it means that a subtraction is to be made from the adding and subtracting totalizer, and it is therefore desired to position this totalizer so that the subtracting elements thereof are opposite the actuators. As the subtracting elements are normally in this position, all that it is necessary to do is to cause the latch for the differential mechanism of the balance bank to be disconnected in the zero position. It is clear, therefore, that when one of the withdrawal keys is depressed the zero stop pawl 112 for the balance bank will not be disturbed and will contact with and disconnect the latch for the balance bank differential mechanism in the zero position and thereby, when the adding and subtracting totalizer is rocked in, cause whatever amount has been set up on the keyboard to be subtracted from the amount on the adding wheels of said adding and subtracting totalizer.

Account number differential

The differential mechanism for the ledger number key banks is driven by a pair of cams 287 and 288 (Fig. 16) cooperating with rollers 289 and 290 respectively on a lever 300 pivoted on a stud 301 on the machine frame. The lever 300 carries a pin 302 projecting into a slot 303 in an arm 304 fast on the shaft 156.

Clockwise movement of the cams 287 and 288 rocks the lever 300 first clockwise and then counter-clockwise, whereby the arm 304 and shaft 156 are rocked first counter-clockwise and then clockwise to normal position. Secured to the shaft 156 for each bank of keys is a driving segment 305. Associated with each segment 305 is a lever 306 loose on the shaft 156. Pivoted on a stud 307 on the lever 306 is a latch 308 having a foot 309 normally resting upon the periphery 310 of the segment 305. The upper edge of the latch is normally in engagement with one of a plurality of notches 311 in a plate 312 secured to the key frame 145. Rigid with the latch 308 is an arm 313. Pivoted on a stud on this arm is a pawl 314 normally in engagement with a pin 315 on the plate 312. A spring 316 stretched between an arm 317 integral with the lever 306 and a pin on the pawl 314 holds the pin in engagement with the arm 313 of the latch 308. In Fig. 16 the latch is shown engaging the notch 311 in the highest or eleventh position. This is the normal position of the parts when there has been no key depressed in the bank.

Counter-clockwise movement of the shaft 156 rocks the segment 305 counter-clockwise, whereby a pin 318 carried thereby engages the lever 306 and rocks said lever counter-clockwise. As the pin 318 engages the lever 306 the spring 316 rocks the latch 308 so that its foot 309 rests upon a step 319 of the segment 305. This counter-clockwise movement of the segment 305 occurs immediately after the beginning of the operation of the machine. If one of the keys 144 is depressed, as the lever 306 is moved counter-clockwise, the upper end of the pawl 314 engages the end of the depressed key, whereby said pawl is rocked slightly clockwise until it has passed the key, whereupon the spring 316 returns the pawl so that the pin again engages the arm 313.

When the clockwise movement of the segment 305 to normal position is started, the foot 309 is on the step 319 of said segment. During this movement of the segment 305 if a key has been depressed, the upper end of the pawl 314 engages the end of this key. As in this direction the pawl cannot rock independently, due to the engagement of the pin carried thereby with the arm 313, and as the arm 313 is rigid with the latch 308, the engagement of said pawl with the depressed key rocks the pawl 314 and latch 308 counter-clockwise as a unit. This disengages the foot 309 from the step 319, whereby the upper end of the latch engages the notch 311 appropriate to the key which has been depressed. After the latch 308 is disengaged from the step 319, the driving segment 305 continues its clockwise movement to normal position.

Pivoted to each of the levers 306 is a link 320 also pivoted to a spiral segment loose on a rod 322 carried by the machine frames. Through the link 320 and segment 321 the account number printing device, which will be later described, will be set differentially under the control of the account number keys 144.

Totalizers

The totalizers used in the present machine are old and well known in the art, and therefore no detailed description of them will be given herein. If such a description is desired, reference may be had to the patents previously mentioned.

There are three lines of totalizers in the machine. Two of these lines consist of ten groups of totalizer pinions each (Fig. 17) loosely mounted on a tube 326 supported by frames 327. These frames are slidably mounted on a shaft 328. Each totalizer consists of a plurality of pinions 236, one pinion in each group of pinions. Therefore, if the first pinion of each group is engaged with the differential actuators a certain totalizer will be actuated, if the second pinion in each group is actuated a different totalizer will be operated, etc.

The other line of the three above mentioned carries an adding and subtracting totalizer, there being but the one totalizer on this line. This totalizer consists of a plurality of totalizer pinions 329 and 330, the pinions 329 being engaged with the actuators for subtracting and 330 for adding. All are loosely mounted on a tube 331 identical with tube 326 for the other lines, which tube is carried by frames 332 slidably mounted on a shaft 333.

These pinions 329 and 330 operate in pairs, that is, one adding pinion and one subtracting pinion cooperate. Fast to the sides of each of these pinions are bevel gears 334. Each pair of pinions has a bevel pinion 335 meshing with the bevel gears of its appropriate pair of pinions. It is evident that if one of the pinions is rotated the other pinion of the pair will be rotated in the opposite direction so that when the subtracting pinions are in mesh with the actuating racks 234 the adding pinions will be actually turned backwardly an extent corresponding to the movement given the subtracting pinions by the actuating racks 234.

Means are provided in the present machine for transferring from totalizer elements of lower order to those of higher order. As the mechanism used in this machine is identical with that used in the before mentioned patents no description thereof will be given herein.

Totalizer selecting mechanism

In order to shift the totalizer lines so as to bring any desired one of the totalizers opposite the differential actuators (Fig. 17) the frame 332 of each of the totalizer lines carries a boss 336 in which is secured a rod 337 provided with a roller 338 extending into a cam groove 339 in a cam 340 rotatably mounted on a stud projecting from the side frame. There is one of these cams for each totalizer line. As the adding and subtracting totalizer only has to be slid a short distance the cam for this line is of a somewhat different shape from the others, as can be seen in Fig. 17. Each cam has a rearwardly extending arm 341 to which is pivoted a link 342 pivoted at its opposite end to an arm (not shown) fast on the left hand end of shaft 261 (Fig. 15) or on one of the sleeves 260. Also secured to this shaft, or the corresponding sleeve surrounding it, are the segments 259 to which the links 253, operated by beams 251, are pivoted. The front totalizer line is controlled by the withdrawal bank, the back line by the deposit bank and the upper line by the balance bank. It can be seen, therefore, that the cams 340 are differentially position by their corresponding banks. The movement of the cams will cause the totalizer line to be shifted laterally of the machine to move the desired totalizer pinions into position to be operated.

Totalizer engaging mechanism

The mechanism for engaging the selected totalizer pinions with the actuators for the purpose of operating these totalizers will now be described. Near each end of each of the shafts 328 is an arm 344 (Fig. 17) carrying a roller 345 projecting into a cam slot (not shown) in plates 351 fixed to the side frames. Pivoted to the right hand one of these arms on each shaft is a link 352 moved by means of a mechanism not shown herein, but well known in the art, to rock the shafts 328 and 333 clockwise (Figs. 9 and 17). This movement of the shafts 328 and 333 through the engagement of the rollers 345 with the slots in plates 351 causes these shafts and arms 327 carrying the totalizers to be slid toward the center of the machine, whereby the totalizer pinions 236 and 329 or 330 engage the differential racks 234. This engaging takes place in adding operations after the differential racks have been positioned under the control of the depressed keys 101. When said racks are restored to normal position the amount which was placed thereon is accumulated on the totalizer pinions, after which the links 352 are moved to disengage said pinions from the differential racks.

When the shaft 328 is rocked clockwise (Fig. 9) a pair of pawls 354 fast thereon engage shoulders 355 of levers 356 pivoted on a rod 357 and rock said levers clockwise (Fig. 9). These levers carry an alining bar 358, normally in engagement with all of the pinions 236 on that particular line when they are out of engagement with the differential mechanism. When the levers 356 are rocked clockwise by the pawls 354 the bar 358 is withdrawn from the pinions 236 to allow the selected ones to be rotated. When the selected pinions 236 are in engagement with the differential segments the remaining pinions are in engagement with lugs 359 (Fig. 17) carried by the frames 231, and thereby prevent those pinions 236 which are not in alinement with the racks 234 from being accidentally rotated. When the pinions are disengaged from the racks 234 the alining bar 358 is again moved into engagement with said pinions.

Engaging controlling mechanism

The mechanism for engaging the selected totalizers with the actuators, that is, the mechanism which operates the links 352 (Fig. 17) is not shown herein, as it forms no part of the present invention and as it is fully shown and described in the before mentioned patents.

The mechanism for controlling which of the totalizer lines are to be moved to engaging position on either adding or subtracting operations consists of the two circular plates shown in Figs. 19 and 20. These plates are connected with and differentially set by the differential mechanism for the deposit and withdrawal banks. The plate shown in Fig. 19 cooperates with the deposit bank, and the plate in Fig. 20 cooperates with the withdrawal bank.

As is well known in the art, these plates control the movement of the totalizer lines to engage with the actuators by presenting either a high spot or a low spot on their peripheries to pins carried by the engaging mechanism. In a deposit transaction for instance the operation of these plates is as follows: The "Old bal." key is first depressed, and as this key is in the ninth position the plate in Fig. 19 will be rotated until the ninth position thereon is brought opposite the engaging control pins not shown in this case, but which are shown with their cooperating mechanisms and fully described in the previously mentioned patents to Fuller and Shipley.

As brought out in the previously described patents, when a high spot is opposite a pin that particular line will be rocked in. In the present case, therefore, it can be seen that the nine position corresponding to the upper totalizer line is a high spot, therefore this line will be rocked into engagement. The nine position corresponding to the front totalizer is a low spot, so that the "credits" totalizer in the zero position, which has been selected, will not be rocked in. On the portion corresponding to the back line there is a high spot so that this line will be rocked in. This totalizer on the back line is for accumulating all of the old balances entered.

Next the amount of the deposit is entered on the key-board and the "A Dep." key pressed. This key is in the eighth position so that the plate shown in Fig. 19 is moved to the eighth position. On the portion corresponding to the upper line there is a high spot, so that the adding and subtracting totalizer will be rocked in. On the portion corresponding to the front line there is a high portion, so the "credits" totalizer will be rocked in. On the back portion there is also a high spot, so the "A Dep." totalizer is rocked in.

In this manner under control of the selecting plates shown in Figs. 19 and 20 the three totalizer lines are rocked in, or not rocked in, depending on whether or not it is desired to have the amount set up on the keyboard entered in the totalizers selected by said keys.

On total or sub-total taking operations the rocking of the totalizer lines is controlled by the plate 274 (Fig. 24) integral with the total lever 135. This plate has three slots 360 which cooperate with pins carried by the engaging mechanism. These slots are so shaped that only one line at a time is engaged with the actuators, depending upon the position of said lever. For instance, when the total lever is moved to the first position below or above its adding position, the upper line, which carries the adding and subtracting totalizer, will be rocked into engagement. If the total lever is moved into the second position either above or below its adding position, the back totalizer line will be rocked in, and if the lever is moved either up or down to its third position the front line will be rocked in.

Printing mechanism

The printing mechanism is located in front of the machine proper. The framework for this mechanism comprises a front frame 365, an intermediate frame 366 and a rear frame 367 (Fig. 29).

The entire printing mechanism is driven by the operation of the cash register. The shaft 77 has secured near the left hand end thereof a spiral gear 368 (Fig. 21) meshing with a spiral pinion 369 fast on a sleeve 370 loose on a shaft 371. The front end of shaft 371 is mounted in frame 365 and the rear end thereof in a bracket 372 secured to the base of the machine. Fast on the sleeve 370 is a disk 373 upon which is pivotally mounted a driving pawl 374 and a retaining pawl 375 (Fig. 23) held in their normal positions by a spring 376. Secured to the shaft 371 is a disk 377 provided with a boss 378 normally engaged by the driving pawl 374.

From the above description it can be seen that clockwise rotation of the shaft 77 rotates the disk 373 counter-clockwise and through the engagement of the pawl 374 with boss 378 rotates shaft 371 counter-clockwise. The pawl 375 serves to retain the shaft 371 from any excessive overthrow movement.

Racks

It will be recalled that, meshing with each of the spiral segments 255 (Figs. 6, 9 and 15), actuated by the movement of the differential mechanism, is a spiral gear 257 secured to a shaft 258 mounted in the frames 366 and 367. Secured to each shaft 258 is a segment 380 (Fig. 44). Meshing with segments 380 are teeth 381 on the lower edge of racks 382. These racks are slidably mounted on rods 383 which extend through slots 384 in said racks and are supported by the frames 366 and 367.

From the above description it can be seen that the movement of the differential mechanism through spiral segments 255, spiral gears 257, shafts 258 and segments 380, is imparted to the racks 382.

Account number rack mechanism

Meshing with each of the spiral segments 321 (Fig. 16), differentially actuated under control of the account number keys, is a spiral gear 385 fast on a shaft 386 mounted in two frames 387 and 388 and a bracket 389 supported by frame 388. There is one of these gears associated with each of the banks of account number keys.

Secured to each shaft 386 is a gear 390. Meshing with these gears are racks 401, each having a slot 402 through which extends a rod 403 (Figs. 16 and 46) supported by the frames 387 and 388. Each rack 401 also has another slot 404 (Fig. 44) through which projects a rod 405. At its forward end this rod is mounted in the frame 366 and at its rear end is supported by a plate 406 mounted on studs 407 and 408 carried by the frame 367.

From the above description it can be seen that all of the account number racks are differentially set by the differential mechanism under control of the account number keys.

*Rack aliners*

The racks 382 have alining notches 409 (Fig. 44), and the racks 401 have alining notches 410. Cooperating with these notches are aliners 411 and 412 slidably supported at their ends by bosses on the frames 366 and 367. A shaft 413 has secured thereto two levers 414 projecting into slots in said aliners. After the racks are positioned the shaft 413 is rocked counter-clockwise which movement through levers 414 moves the aliner 411 into engagement with the notches 409 and the aliner 412 into engagement with notches 410. This engagement is maintained until near the end of the operation, when the parts are returned to normal.

The means for rocking shaft 413 as above described consists of an arm (not shown) fast to shaft 413. To this arm is connected a link 415 (Fig. 29) pivoted to a lever 416. This lever carries two rollers cooperating with a pair of cams 417 and 418 secured to the printer drive shaft 371. These cams are given one rotation on every operation and are so shaped as to move the lever 416 and link 415 towards the right and then back to normal. A more complete showing and description of this mechanism is given in the patent of B. M. Shipley, No. 1,619,796, above referred to.

*Tube lines*

Associated with the racks 382 are two tube lines, which with their cooperating mechanism, are for the purpose of setting up the amount type wheels, the transaction type wheels, and a type wheel set by the total lever for printing an X or Z to indicate either a total or sub-total, as is well known in the art. These tube lines are supported by shafts 420 and 421 (Fig. 52) supported at their rear ends in the frame 367, passing through frame 366, and supporting at their forward ends a plate 422. The teeth on the racks 382 mesh with the teeth of gears 423 fast either to the shafts 420 or 421, or to the ends of the tubes surrounding these shafts.

It will be remembered that the present machine is adapted to print in any one of four different columns. In order to accomplish this, there are provided four complete sets of amount type wheels on each of the upper and lower type lines. These type wheels are supported by shafts 424 and 425. The upper type line, which is adapted to print on the detail strip, is shown in Figure 51, and the lower type line, which prints on the account card and the passbook, in Figure 52. When the racks 382 are actuated to set up the type wheels the same amount will be set up in all four groups of type wheels on both the upper and lower type lines. The column in which the amount is to be printed is selected by mechanism which will be hereinafter described, and this mechanism permits the actuation of whichever one of a plurality of hammers corresponds to the position on the paper of this column.

As can be seen from Fig. 45, the two type lines are located one directly over the other, and the type wheels of both lines are connected by intermediate gears 426 so that if one of said type wheels or gears is actuated the movement thereof will be transmitted to the other type line and the appropriate wheel thereon will receive a similar movement. The manner in which a particular type wheel is given the same actuation in all of the eight groups of type wheels will now be described.

For an example, the train of mechanism which connects the tens of dollars type wheel in each group with the tens of dollars rack will be described. The tens of dollars rack meshes with a gear 427 fast to a tube 428 surrounding shaft 420. At its opposite end the tube 428 carries a gear 429 which meshes with the tens of dollars type wheel 430 in the third group from the front on the upper line. The gear 429 also meshes with the tens of dollars type wheel 431 in the third group from the front on the lower type line. The teeth of this type wheel 431 engage a gear 432 fast on a tube 433 surrounding shaft 421. This tube 433 also carries a gear 434 which meshes with a gear 435 fast on a tube 436 surrounding a shaft 437, supported in the same manner as the shafts 420 and 421. The tube 436 also carries a gear 438 which meshes with a gear 439 loose on shaft 421, and this gear in turn meshes with the tens of dollars gear 440 in the second group from the front on the lower type line and also with the tens of dollars type wheel 441 in the second group from the front of the upper type line. It can be seen from the mechanism thus far described that the tens of dollars type wheels in the second and third groups from the front have now been set up. The tens of dollars rack 382 also meshes with a gear 442 secured to a tube 443 surrounding shaft 421. Also fast on the tube 443 is a gear 444 meshing with the tens of dollars type wheel 445 in the fourth group from the front on the lower type line and also with the tens of dollars type wheel 446 in the fourth group from the front on the upper type line. This type wheel 446 is fast on a tube 447 surrounding shaft 424 and at its other end this tube carries the type wheel 448 in the first group on the upper type line. Type wheel 448 in turn meshes with gear 449 loosely supported by the shaft 421, which in turn meshes with the tens of dollars type wheel 450 in the first group on the lower type line. The tens of dollars type wheels in all four groups on the upper type line and in all four groups on the lower type line have now been set to the same extent by the movement of the tens of dollars rack 382.

It is not thought necessary to describe in detail the train of mechanism whereby each denomination of an amount to be entered is set up in the various groups of amount type wheels. It is thought to be sufficient to describe one of these various trains of mechanism, as has been done. It is a simple matter to select any particular denomination and trace the means by which the various type wheels corresponding thereto will be actuated.

The racks 401 for the account number mechanism cooperate with gears 452 (Figs. 44 and 52) fast on the inner ends of a series of nested tubes 454 surrounding the shaft 437. At its opposite end each of these tubes carries fast thereto a gear 455 which in turn meshes with an intermediate gear 456 loosely mounted on the largest of the nested tubes surrounding shaft 421. These gears in turn mesh with the account number type wheels 457 on the lower type line and 458 on the upper type line. It is evident from Fig. 52 that the differential movement of the racks 401 will be transmitted through gears 452, tubes 454, gears 455 and gears 456 to both the lower and the upper account number type wheels 457 and 458.

The date of the transaction is printed upon both the customer's account card and his passbook, but not upon the detail strip. The means for setting the date wheels is old and well known in the art and a brief description thereof is thought to be sufficient herein. A series of knurled flanges 460 project through the plate 422 in such a position that they may be readily turned by hand. These knurled flanges are integral with sleeves 461 surrounding shaft 420 and carry at their inner ends gears 462, which in turn mesh with type wheels 463 on the lower type line. These type wheels 463 carry the numerals for printing the day, month and year on the account card and passbook, and a manipulation of the flanges 460 will set them through the above described mechanism so that any desired date may be printed.

*Type wheel aliner*

Means is provided for alining the type wheels. It consists of an aliner 465 (Fig. 45) carried by arms 466 loosely mounted on the shaft 424. This aliner is operated in part by the same mechanism that operates the rack aliners 411 and 412, and at the same time.

The mechanism for connecting the type wheel aliner to the rack aliner mechanism is neither shown nor described herein, as the same is clearly shown in the previously named patents. When the rack alining mechanism is operated the arms 466 are rocked clockwise and the aliner engages with the teeth of all the intermediate gears carried by shaft 421. As there is a gear on this line corresponding to every type wheel, all such wheels will be alined and held against movement during the taking of the impression.

*Zero elimination*

After the racks 382 have been positioned by the differential actuators, as determined by the keys depressed in the various banks, and before an impression is taken from the type wheels associated with these racks, a mechanism is operated for the purpose of preventing the printing of cyphers to the left of the highest denomination represented by a digit, other than a cypher, in any printed number, or to the left of the units of dollars rack, and for the printing of cyphers to the right. This mechanism, known in the art as "zero elimination mechanism," will now be described.

Loose on a rod 470 (Fig. 44) carried by frames 366 and 367 is an arm 471 carrying a pin 472 on which are loosely mounted a plurality of levers 473, each having a shoulder 474 adapted to engage with a shoulder 475 on its corresponding rack 382. Pivoted to an arm 476 integral with arm 471 is a link 477 which, at its lower end, is pivoted to one arm of a bell crank lever 478 loose on a stud 479 supported by the frame 366. This bell crank lever carries two rollers cooperating with a pair of cams 480 and 481 fast on the printer drive shaft 371. This shaft and the cams 480 and 481 are given a complete counter-clockwise rotation at each operation of the machine. This movement will cause the bell crank 478 to be rotated clockwise and then counter-clockwise to normal position. The clockwise movement does not take place until the racks have been differentially set. When this movement does take place, the arm 476 will be rocked clockwise through link 477 and will move the levers 473, which are constantly under tension by springs 482, first clockwise about their pivots, and will then cause shoulders 474 on these levers to engage the shoulders 475 on any of the racks to the left of the rack of highest denomination which has been operated. When a rack 382 is moved, the left hand end of this rack comes beneath a tail 483 carried by its corresponding lever 473 and prevents this lever from being moved by the action of cams 480 and 481 and springs 482. Each of the levers 473 has an ear 484 thereon, which is bent over to come into the path of movement of the lever on its left. It can, therefore, be seen that if a lever of higher order is held up by its rack all of the levers to the right thereof will also be held up, so that their shoulders will not engage the shoulders on their corresponding racks and they will therefore remain in the zero position.

After the shoulders on the levers 473 are in engagement with the shoulders on the racks the levers are given a further movement by the cams 480 and 481 which moves the racks toward the left and thereby rotates the higher order type wheels to bring a blank portion thereof to the printing line in place of the zeros.

Loose on the shaft 258 appropriate to the hundreds of dollars segment 380 are a plurality of three-armed levers 486 (Fig. 44). The upwardly extending arms of these levers contact with projections 487 carried by each of the racks that is capable of elimination. The downwardly extending arms of the levers 486 have fastened thereto springs 488 which tend constantly to rock these levers in a clockwise direction. The third arm of these levers contacts with the shaft 258 next to the left of the one carrying the levers and limits the clockwise movement thereof so as to prevent the springs from moving their appropriate racks out of zero position. These springs and levers also keep any of the racks that are not to be eliminated from being moved when the eliminating movement takes place.

Each of the segments 380 corresponding to racks that may be eliminated carries a flat finger 489 which contacts with the bottom edge of its appropriate rack. When the racks are moved to eliminated position, a hook 490 on each of the racks engages with the finger 489 on the segments 380 and thereby prevents the segments from getting out of time when the teeth thereof are disengaged from the teeth on the racks.

Detail strip mechanism

The detail strip mechanism of the present machine is similar to the detail strip mechanism shown and described in the beforementioned patents, and therefore only a general description of this mechanism will be given herein, except of those parts which differentiate from the previous constructions.

The detail paper is carried on a storage roll 500 (Figs. 26, 29, 31, 38 and 42). From this roll it passes about a roller 501 carried by a lever 502 pivoted on a stud 503 (Fig. 42) in the frame 366. From roller 501 the strip extends to the right and passes over a shaft 504, also supported by frame 366. The strip then passes around three rollers 505 (Fig. 38) carried by plates 506 fast to each end of an upper impression block 507 for supporting the upper platens, as will be later described. After passing around the upper one of rollers 505 the strip passes to the left and around a roller 508 carried by an arm 509 pivoted on a stud 510 in the frame 366. The strip then passes onto a receiving roll 511 loose on a rod 512 also mounted on frame 366.

Detail strip feeding mechanism

Figure 41:
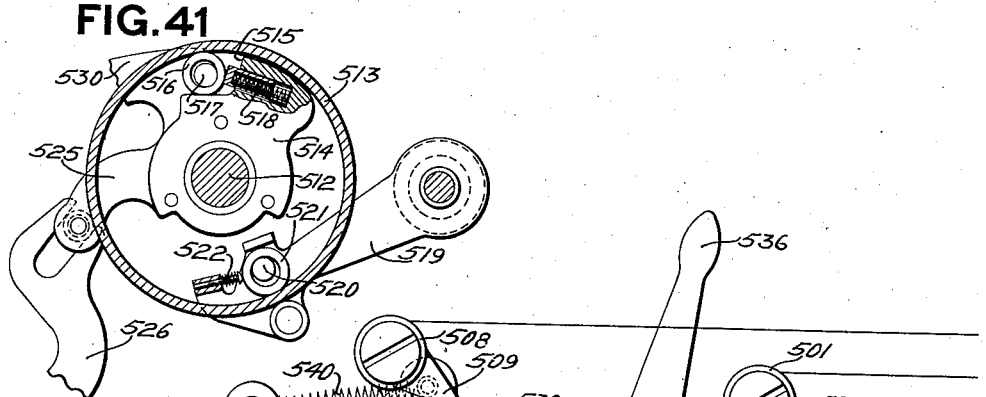
Fig. 41 is a detail sectional view of the means for feeding the detail strip.

Integral with the receiving roll 511 is a flanged disk 513. Loose on the rod 512 and operating within the flange of said disk 513 is a lever 514 (Fig. 41) having a recess 515 in which is a roller 516 loosely mounted on a pin 517 carried by said lever. The roller 516 engages with a spring-pressed plunger 518. It can be seen that when the lever 514 is rocked counter-clockwise the roller will engage the plunger 518 and will force it inwardly. When, however, the lever 514 is rocked clockwise the roller will wedge between the recess of said lever and the inside periphery of the flange carried by disk 513 so that said disk and the receiving roll 511 are rotated to an extent sufficient to bring a new space on the strip under the upper platens. An arm 519 pivoted on the rod which supports the storage roll 500 has a pin 520 upon which is loosely mounted a roller 521 which cooperates with a spring plunger 522 and a bent over flange of arm 519 in exactly the same manner as the roller 516 above described. When the lever 514 moves counter-clockwise the roller 521 wedges between the bent flange and the inside of the flange 513 and prevents the receiving roll from being moved. When, however, the lever is given its clockwise movement and disk 513 is rotated clockwise (Fig. 41), the roller 521 engages the spring plunger and permits the receiving roll to rotate freely.

The means for rocking the lever 514 first counter-clockwise and then clockwise (Figs. 41 and 42) to feed the detail strip will now be described. Integral with the lever 514 is an arm 525 which carries a roller cooperating with the bifurcated end of an arm 526 loose on a rod 527 supported by frames 366 and 365. This arm 526 carries a roller which engages with the periphery of a cam 528 fast on the printer drive shaft 371. A powerful spring 529 keeps the roller on the arm 526 constantly in contact with its cam 528. This cam is rotated counter-clockwise (Fig. 42), and is shaped so as to permit the spring 529 to rock the arm 526 clockwise. The cam then rocks the lever counter-clockwise to normal. This movement, through arm 525, rocks the lever 514, as above described, and feeds the detail strip.

As the paper strip accumulates on the receiving roll, the length of feed thereof would increase if some means for compensating for this increase were not provided. This is accomplished by means of the following mechanism. Integral with lever 514 is an arm 530 which, when the lever is rotated counterclockwise (Figs. 41 and 42), comes in contact with the upper end of an arm 531 pivoted on a pin 532 carried by a bell crank lever 533 pivotally mounted on stud 510. The arm 531 has a bent feed control arm 534 held in contact with the receiving roll 511 by a spring 535 stretched between a downwardly extending portion of arm 531 and a stud on the frame.

As the receiving roll increases in size the arm 534 is rocked counter-clockwise and this movement so positions the arm 531 that the curved arm 530 integral with the lever 514 will come into contact therewith sooner than was originally the case and will therefore shorten the length of the return feeding movement of the lever increasingly as the receiving roll grows larger.

Double spacing mechanism

Figure 42:
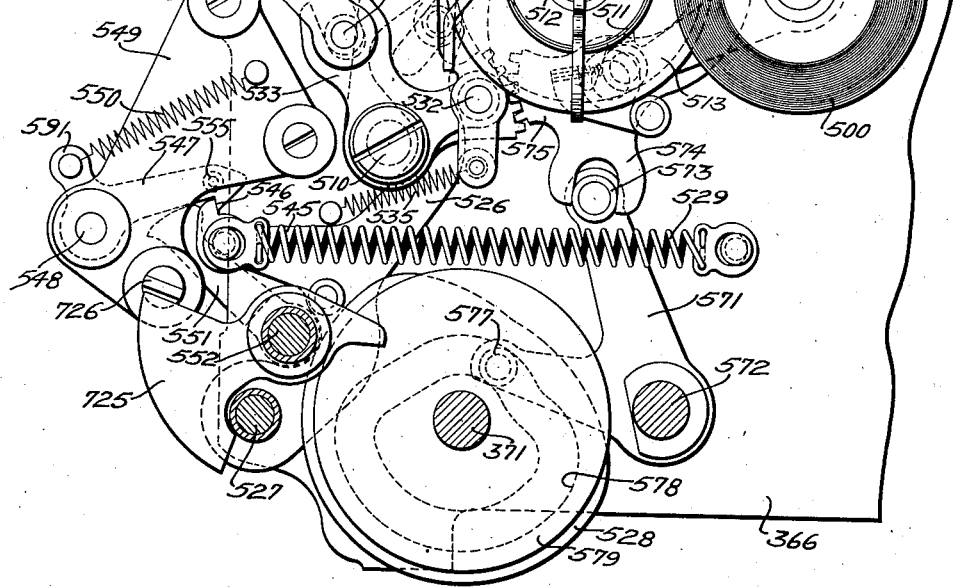
Fig. 42 is a full sized front elevation of the mechanism for feeding and shifting the detail strip, together with the mechanism for disabling the feeding means except on totalizing operations.

It is sometimes desirable to feed the detail strip a double space so as to permit written notations to be made on the strip adjacent the printed entry to which it appertains. The mechanism for imparting this double space movement to the strip is controlled by a hand lever 536 loosely mounted on the rod 512 (Fig. 42). This lever 536 has an arm 537 held in engagement with a roller 538, mounted on an arm 539, by means of a spring 540 extending between the upper end of this arm and a stud on the frame. At its lower end, arm 539 carries a pin 541 cooperating with the bifurcated end of lever 533.

It can be seen from the above that when the lever 536 is pushed to the left the roller 538 is moved out of the position shown in Fig. 42 into recess 542 in the arm 537. This movement permits the arm 539 to be rocked counter-clockwise by spring 540 and thereby rock lever 533 clockwise. As the arm 531 is pivoted on this lever it will be lowered, and when the lever 514 is rocked, as above described, the arm 530 will not contact with arm 531 until the lever has moved far enough to give the strip a movement double the length of the normal feed.

Disabling detail strip feed

It will be remembered that the present machine prints the old balance, either the deposit or withdrawal, and the new balance, as well as the customer's account number, and other data. It is desired to have all of these items printed on the same line on the detail strip, and therefore, the normal feeding mechanism for the detail strip is disabled, except when the total lever is moved to the balance position in order to control the machine to register and print the new balance.

The means for normally disabling the detail strip feed and the means for making this mechanism ineffective will now be described. It will be remembered that the lever 514 is rocked by the arm 526 (Figs. 41 and 42) to feed the detail strip. This arm has a rearwardly extending projection 545 which cooperates with a hook 546 carried by an arm 547 supported by a stud 548 mounted in a bracket 549 attached to the machine frame. This hook 546 is held in engagement with the projection 545 of arm 526 by a spring 550 extending between a projection 591 of arm 547 and a stud on the bracket 549. It can be seen from the above that the arm 526 is normally held against movement by the hood 546 so that the spring 529 and cam 528 will have no effect upon it and, therefore, the detail or audit strip is not fed during the entry of the old balance, deposit or withdrawal items. When, however, a new balance is printed, mechanism will be operated by the total lever which will cause the hook 546 to be moved out of engagement from the projection 545 of arm 526, thereby permitting this arm to be rocked clockwise and then counter-clockwise to normal in order to feed the detail strip, as has been described. The mechanism for rocking the hook 546 out of engagement from the projection 545 of arm 526 includes an arm 551 fast on a shaft 552 supported by the frames 365 and 366. Also fast to the shaft 552 (Figs. 36, 47 and 50) is an arm 553 adapted to be placed in the path of an arm 554 pinned to the main drive shaft 371 for the printer when the shaft 552 is shifted toward the front of the machine as will be later described. This movement of the shaft 552 also places the arm 551 so that its path is in the plane of the pin 555 on the arm 547. When the shaft 371 is rotated, and the shaft 552 has been shifted, the arm 554 will come into contact with the end of arm 553 and rock this arm clockwise (Fig. 50), which movement through shaft 552 will rock the arm 551 clockwise (Fig. 42). As arm 551 moves in a clockwise direction its end strikes the pin 555 carried by the arm 547 and rocks this arm counter-clockwise about the stud 548, thereby disengaging the hook 546 from the projection 545 of arm 526, permitting this arm to be moved under the influence of spring 529 and cam 528 to feed the detail strip.

The mechanism for shifting shaft 552 a sufficient distance to bring the arm 553 into the plane of arm 554 is under the control of the total lever. When the total lever is moved one space either above or below its adding position to its "new balance" read, or reset positions, a shaft 556 (Figs. 24 and 25) is rocked slightly clockwise. Fast on this shaft is an arm 557 carrying a stud which cooperates with the bifurcated end of a link 558, which at its lower end is pivoted to an arm 559, which in turn is pivoted to one end of a pitman 560 which is slidably supported by a stud 561 projecting through a slot in said pitman. Also supporting said pitman 560 is a short arm 562 pivoted to the side frame 58 of the machine. At its left hand end the pitman 560 is bifurcated to straddle the hub of the gear 76 which is fast to the main driving shaft 77 of the machine. The pitman also carries a roller 563 which cooperates with a cam groove 564 cut in the side of the gear 76.

When the shaft 77 is rotated in a counter-clockwise direction the pitman 560 is moved first to the left and then to the right by means of the cam slot 564 and roller 563. As the pitman 560 moves toward the left it carries with it the arm 559 which is pivoted thereto. This arm has a notch 565 near its right hand end which, as the arm is moved toward the left, will move upwardly and engage a pin 566 carried by a shaft 527 slidably supported in the frames 365 and 366. It can be seen that unless the total lever has been moved as above described, thereby rocking shaft 556 and arm 557 counter-clockwise (Fig. 25), the link 558 will hold the arm 559 in its lower position due to the engagement of the stud on arm 557 with the end of the bifurcated portion of the link 558 and the notch 565 will not be moved into engagement with the pin 566. When, however, the arm 557 is rocked counter-clockwise by the total lever, the link 558 will be pulled upwardly by means of a spring 568 extending between a hook on the link 558 and a pin on the side frame, and this spring will cause the notch 565 to be raised into engagement with the pin 566 as the pitman 560 moves the arm 559 rearwardly. Then when the pitman 560 is returned to its normal position the arm 559, through the notch 565 and pin 566, will slide the rod 527 toward the front of the machine. Fast on the rod 527 is a bifurcated arm 569 (Figs. 36, 47 and 50) which straddles the shaft 552 between two collars 570 secured to said shaft. It can therefore be seen that when the rod 527 is slid forwardly, as above described, the shaft 552 will be carried therewith. This movement, as can be seen in Fig. 36, will move the arm 553 on said shaft into the plane of arm 554 so that the detail strip feed disabling mechanism can be rendered ineffective.

*Detail strip shifting mechanism*

As has been previously stated herein, it is possible for the operator to write any desired data in connection with any entry made by the register but, when using the autographic feature the lever 536 is to be moved to cause the feeding mechanism to move the detail strip a double space. This will leave room on the strip for making any such entries. As can be seen from Fig. 1, the detail strip is located beneath a glass plate 570 in the top of the printer cabinet. This plate has an opening 571 though which the written entry can be made. Mechanism is necessary to move the detail strip from its normal position, in which it is possible to read the last entry thereon and to write any desired data, to the position in which the impression is taken from the upper set of type wheels. The mechanism for effecting this shifting movement of the detail strip will now be described.

Figure 43:
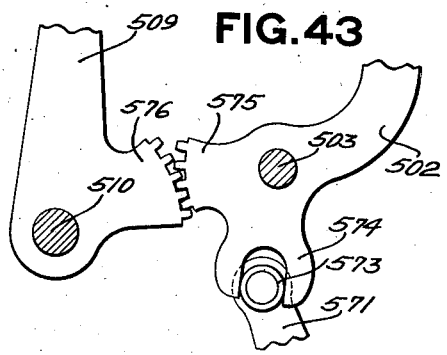
Fig. 43 is a detail view of the means for shifting the detail strip.

It will be recalled that the detail strip passes about rollers 501 and 508 carried by arms 502 and 509 respectively (Fig. 42). In order to shift the detail strip from its reading and writing position to its impression-receiving position all that is necessary is to rock the arm 502 counter-clockwise and the arm 509 clockwise simultaneously and then to return these arms to their normal positions. This rocking is accomplished by means of a bell crank lever 571 pivoted on a shaft 572 supported by the frames 365 and 366. The upwardly extending arm of this bell crank lever carries a roller 573 entered in a bifurcated projection 574 of the arm 502 (Fig. 43). The arm 502 also has a segment 575 meshing with a segment 576 of the arm 509. The other arm of the bell crank lever 571 carries an anti-friction roller 577 cooperating with a cam slot 578 formed in a cam 579 fast on the main drive shaft 371 for the printing mechanism. It can be seen from Fig. 42 that when the cam 579 is rotated counter-clockwise the bell crank lever 571 will be given a clockwise movement, which through the roller 573 and bifurcated projection 574, will rock the arm 502 counter-clockwise. This movement of the arm 502 through the segments 575 and 576 will rock the arm 509 clockwise about its pivot. As the arms 509 and 502 rock clockwise and counter-clockwise simultaneously (Figs. 26, 31 and 42) it can be seen that the detail strip will be shifted so that the last entry thereon will be moved toward the right far enough to receive the impression from the upper type wheels, whereupon the shifting mechanism will again become operative to return the detail strip to its normal position.

*Detail strip impression mechanism*

Loosely mounted on the rod 504 is a frame composed of two side arms 580 and 581 (Figs. 26, 29, 31, 38 and 39). Integral with the left hand ends of these arms is a cross bar 582, and at the right hand ends thereof is the previously mentioned impression block 507 which supports a plurality of platens 584. In order to take an impression from the upper type wheels it is necessary to rock the frame clockwise (Figs. 38 and 39) and thereby bring the platens 584 into contact with the type wheels. This is done in the following manner. Fast to the arm 581 is an arm 585 pivoted to a link 586, which at its lower end is pivoted to a lever 587 loose on a rod 588 supported by the frames 365 and 366. At its left hand end (Fig. 34) this lever carries rollers 589 and 590 cooperating with two cams 601 and 602 respectively, pinned to the shaft 572. Also fast on this shaft is a Geneva wheel 603. A disk 604 fast on shaft 371 carries a pin 605 adapted to cooperate with the Geneva wheel. The shaft 371 and disk 604, are rotated in a counter-clockwise direction on every operation of the machine. The pin 605 will engage one of the notches of the Geneva wheel and give said wheel a partial rotation, which, through shaft 572, will rotate the pair of cams 601 and 602. These cams are so shaped as to rock the lever 587 first clockwise and then counter-clockwise to normal (Fig. 34). This movement, through link 586 and arm 585, will lower the platen frame to take an impression from the type and will then return it to its normal position.

Platen selecting mechanism

It will be recalled that there are four sets of type wheels on the upper line, and the amount set up on the keyboard is set up on each of these sets. An impression is taken, however, from only one of these sets, depending on the character of the transaction and in which column it is desired to print the amount.

There are five separate platens carried by the platen frame. The platen on the inside is for taking an impression from the customer's account number type wheels, and this platen is always in effective position. The remaining four platens, however, are for printing in the four columns appropriate to "Old Bal.," "Dep.," "Withdrawal" and "New Bal." All of these platens are normally ineffective, with the exception of the "Withdrawal" platen, and are selected and rendered effective under the control of the Balance bank differential mechanism. The "Withdrawal" platen is the one nearest the front of the machine. As the latch for the differential mechanism for the Balance bank is disconnected in the zero position on "Withdrawal" operations, this platen is normally in position to print and is rocked out of effective position when any other platen is selected.

The differential mechanism for this bank differentially positions a link 253 (Fig. 12) identical with the links 253 for the amount banks. This movement is transmitted by an arm 254, spiral segment 255, spiral gear 257 and shaft 258 to a pinion 606 (Figs. 12, 31 and 39) fast on said shaft. The teeth of this pinion mesh with teeth formed on a segment 607 carried by an arm 608 pivoted on a stud 609 mounted in the frame 366. The arm 608 also carries a segment 610 which meshes with a pinion 611 loose on a stud 612 also mounted in frame 366. The pinion 611 is integral with a cam 613 with which rollers 614 and 615, each carried by an arm of a multi-armed lever 616, engage.

Each of the platens 584, except the one for the account number, is carried by a U-bar 620, which in turn is carried by a plunger 621, slidably mounted in a cylindrical opening in the block 507. Each plunger 621 has an opening therein into which projects the end of a lever 622 (Fig. 38) which carries an eccentric collar 623 held by a screw 624 extending into the end of lever 622. It is evident that if this screw is loosened and the eccentric turned, the vertical adjustment of the platen can be changed and set in any desired position and held there by the tightening of the screw 624. These levers are loose on a rod 629 supported by arms 580 and 581.

The opposite end of each of the levers 622 is recessed to form two points cooperating with one of a series of four cams 625 (Figs. 29 and 38), one for each of the platens 584, differentially spaced about a shaft 626 carried by arms 580 and 581. Also fast on this shaft is a short arm 627 to which is pivoted a link 628 which at its opposite end is pivoted to the multi-armed lever 616.

When the differential mechanism for the "Balance" bank is operated the cam 613 is rotated clockwise (Fig. 39). This cam is so shaped that the multi-armed lever 616 is rocked clockwise thereby to any one of three positions, depending on the position in which the latch of the Balance bank is disconnected from the driver. This movement will, through link 628 and arm 627, rock the shaft 626 so as to bring the cam 625 selected by the "Balance" bank into cooperative relation with its appropriate lever 622. In Fig. 38 the cam 625 has just rocked the lever 622 clockwise to lower the platen to its effective position. It can be seen that as this cam continues to rotate in a clockwise direction the lever will be rocked counter-clockwise and will raise the platen 584 out of printing position. It is evident from the above that the "Balance" bank selects the column in which the impression is to be made and moves the platen appropriate to that column to effective position so that when the platen frame is operated the impression will be made in the proper column.

Account card and pass book

The account card (Fig. 53) adapted for use with the present invention has a space at the top for the name, address and account number of the customer. Below this space are twenty-four numbered lines. The card is divided into columns by vertical lines. At the head of each column is its appropriate designation. This form of card is of course not the only one which can be used with the present invention, but it is the desired form for use with the embodiment thereof shown herein.

The passbook (Fig. 55) has the column designations printed across the top and the line numbers printed down the left side. The spacing is of course the same as on the account card but no lines are ruled thereon to separate either columns or entries.

Card and book carriage

The card and passbook are placed upon a table or carriage slidable crossways of the machine to properly position the card and book to receive the impression from the lower type wheels. This carriage includes a card and book supporting table 635 (Figs. 26, 29, 47, 48 and 49) supported by bearings 636, one at each side thereof, slidably mounted on a shaft 637 supported by brackets 638 projecting forwardly from the front printed frame 365. Secured to the table 635 is a key guide-plate 639 (Fig. 48). This plate is formed with a downwardly extending flange 640 (Fig. 49), the lower edge of which rests on a roller 641 rotatably mounted on a stud carried by an angle iron 642 secured to a supporting plate 644. This plate is rigidly secured to a bracket 645 which projects from the front printer frame 365. It is clear from the above description that the carriage will readily slide laterally of the machine on the shaft 637 and roller 641 (Fig. 49).

Means are provided to prevent any radial movement of the carriage about the shaft 637. The flange 640 carries a channel bar 646 in which a roller 647 operates. This roller is supported by an upright flange of a bar 648 slidably attached to the under side of plate 644, for purposes to be later described, by two studs 649 (Fig. 48). It is evident that as the carriage slides laterally of the machine the roller 647 will move along the channel bar 646 and will therefore maintain the carriage in its proper horizontal position.

Guides for card and book

The book is first placed on the carriage and slid inwardly to printing position between two parallel guides 650 (Figs. 47 and 48) secured to the sides of the table 635. Secured to the guides 650 are shields 651 which carry presser feet 652 for the purpose of holding the pages flat. The card is longer than the book and is placed in the machine on top of the book. It is guided to this position by two tapered guides 653, one on each side of the table. These guides extend from front to rear of the carriage and hold the card in the printing position.

Line selector

It is of course desirable to print the entries on the first available blank line. In order to simplify the setting of the carriage so that the machine will print on any desired line, a mechanism is provided which will greatly facilitate this operation.

Just to the left of, and forming part of the carriage, is a group of twenty-four keys 654 (Figs. 26, 29, 47, 48 and 49), corresponding to the twenty-four lines on the card and book. These keys are slidably mounted in the key guide-plate 639, secured to the table 635. A casing 655 is supported above plate 639 by flanges 656 and has openings therein through which the keys project. Below guide-plate 639 is another guide-plate 657 secured at its left end (Fig. 48) by screws 658 extending through a block 659 and at its right end by screws 660 extending through two blocks 661 into the casing 655. The key shanks are tapered and when depressed extend through slots in plate 657. The key shanks have shoulders formed thereon just below the casing 655 to limit their upward movement. They are maintained in their upper positions by springs 662 compressed between the said shoulders on the keys and the guide-plate 639.

When a key is depressed to select any one of the lines on the card and book, it is held in depressed position by a detent 663 slidably mounted on four studs 664 depending from the plate 639, and which extend through slots 665 in said plate. The detent constantly has a tendency to move toward the right (Fig. 50) under the influence of a spring 666 stretched between the detent 663 and a pin on plate 639. Each key has a notch 667 adapted to receive the detent when the key is depressed. When a key is depressed an inclined portion contacts the detent and moves the same towards the left (Fig. 48) thereby releasing any key which may have been previously depressed and latching the key last depressed in its depressed position by the detent engaging the notch 667.

After the key appropriate to the line on which it is desired to print has been depressed the carriage is moved bodily by hand to the right until the lower end of the depressed key comes in contact with a stop. This stop consists of two plates 668 (Figs. 48 and 50) pivotally mounted in upwardly extending flanges 670 of the bar 648. Projecting downwardly from each of the plates 668 is a pin, and stretched between these pins is a spring 671 which rocks the left hand plate 668 (Fig. 48) counter-clockwise and the right hand one clockwise. It can be readily seen that should the carriage be in such a position that the depressed key is to the left of the plates (Fig. 48) when the carriage is moved towards the right, the lower end of the said key will first come in contact with the left hand plate 668 and rock said plate clockwise until it has passed the plate, when said plate will return to its normal position. The key will then strike the edge of the right hand plate 668, and as this plate cannot be rocked in this direction the carriage will be stopped, and the selected line will be in position to receive an impression. If the depressed key is on the right hand side of the stop plates 668 the depressed key will first engage the right hand plate 668 and rock it counter-clockwise and then engage the left hand plate, which will stop the carriage with the depressed key between the plates 668.

The depressed key will be released only when a "New balance" is printed, and in a manner to be hereinafter described. When the key is released the carriage will be returned to its extreme left hand position (Figs. 47 and 48) by a powerful spring 673 fastened to the carriage by a clip 674 (Fig. 26) and to the supporting frame by a clip 675 (Fig. 50).

Shock absorber

When the carriage is moved either by hand or by the spring 673 to any of its selected positions, there will be a certain amount of shock when the carriage comes to a sudden stop. Means are provided for absorbing this blow so as to prevent any damage to the mechanism. The bar 648 which carries the stop plates 668 is slidably mounted on studs 649, as above described. At its right hand end (Fig. 48) this bar has a right angle flange 676 in which is secured a rod 677. This rod carries sleeves 678 and 679 which extend through and are supported by a U-shaped bar 680 secured to the under side of plate 644, which is stationary. A spring 681 surrounds the rod 677 and abuts against shoulders formed on the inner ends of the sleeves 678 and 679.

If the carriage is moving from left to right and is suddenly stopped by the bar 668, it is evident that the plate 648 and the rod 677 will be slid slightly towards the right (Fig. 48) against the tension of the spring 681. As soon as the carriage has come to a stop the spring 681 will return it to its correct position. If the carriage is moving from right to left the same thing will occur, except that the spring will compress against the shoulder on sleeve 678. The sleeve will be held in its relative position with the rod by a nut 682 on the end of the rod 677. This nut is locked in position by a lock nut 683. A stop is provided for the carriage so that it cannot be overthrown when moved towards the right. This is accomplished by constructing the plate 657 with a shoulder 684 (Fig. 50). As the carriage moves towards the right this shoulder will come into contact with an upwardly extending lug 685 of the flange 670 which will stop the carriage in position to print on the twenty-fourth line.

Card and book impression mechanism

There are six separate platens 695 (Figs. 31, 36 and 39) for making impressions on the card and the passbook. Proceeding from the front, these are the date, withdrawal, deposit, old balance, new balance, and account number. All of the platens are carried by U-bars 696 supported by arms 697 which are pivoted on rod 588, previously described. These platens are actuated by mechanism, to be presently described, to strike the book and card a sharp blow in order to take impressions thereon from the lower set of type wheels.

Selecting mechanism for selecting which of the platens will operate is provided and will be presently described. As the same mechanism actuates all of the platens to take an impression, this mechanism will be described first. Running across the printing mechanism beneath all of the arms 697 is a yoke 698 which is pivotally mounted on the rod 588 (Figs. 36 and 39) by means of arms 694 and 699. These arms support a rod 700 to which are attached springs 693 that hold the arms 697 in contact with the yoke 698. A link 702 pivoted to a bell crank lever 703 loose on shaft 572 has a notch 701 engaging the rod 700. This lever 703 carries a roller 692 and has a sharp nose 704 both of which are adapted to cooperate with cams 705 and 706 fast on the periphery of a disk 707. This disk is slidably mounted on the printer drive shaft 371 and is connected thereto and rotated by a key 708.

The shaft 371 is given one rotation in a counter-clockwise direction upon each operation of the machine. It can be seen that as the nose 704 of bell crank 703 rides upon the high portion of the cam 705 the said bell crank will be rocked clockwise and thereby rock the yoke 698 clockwise through the engagement of link 702 with rod 700. This rocking movement of yoke 698 is against the tension of a powerful spring 709, one end of which is attached to the yoke arm 699 and the other end to a pin on frame 366.

This rocking of the yoke 698 away from beneath the platen-carrying arms permits them to rotate clockwise (Fig. 39) by means of gravity assisted by the springs 693. Then when the nose 704 on bell crank 703 passes the high point of cams 705, the spring 709 will rotate the yoke 698 and thereby the platens rapidly counter-clockwise until a toe 710 of said yoke arm 699 comes in contact with a stop 711 on the base of the machine; whereby the yoke will be stopped. The platens however will continue their rapid counter-clockwise movement and so strike the book and card to take impressions from the type wheels. In normal operations the card is ejected after the first impression is made and then the cam 706 causes another impression to be made on the book.

Single or double print

Means are provided for manually controlling the machine to take either one or two impressions from the lower type wheels. This is necessary when a customer makes a deposit, but does not have his passbook. In this event the amount is printed on the account card only. The cam disk 707 is slidably mounted on the shaft 371 and integral with said disk is a flanged hub 712 (Figs. 36 and 40). A bifurcated arm 713 straddles the hub 712 and is slidably mounted on a sleeve 714 surrounding shaft 527. The lever 713 has a hub 715 carrying a screw 716 which projects into a curved slot in the sleeve 714 (Fig. 56). The sleeve 714 for a portion of its length near its right hand end has a smaller diameter and secured to this portion is a gear 717 (Fig. 25), and meshing with this gear is a segment 718 fast on a sleeve 719 surrounding a rod 720 mounted in the frame 365. Fast to the sleeve 719 is a knurled knob 721 which has two flat surfaces carrying the words "Double print" and "Single print" (Figs. 25 and 36). As shown in Fig. 36, the parts are in positions to cause two impressions to be made. When it is desired to set the mechanism so that only one impression will be made, the knob 721 is rotated clockwise a quarter turn. This movement through sleeve 719 and segment 718 will rotate gear 717 and sleeve 714 counter-clockwise (Fig. 40). This movement, through the cooperation of the slot in this sleeve with screw 716, will move the bifurcated arm 713 and therefore the cam disk 707 towards the front of the machine far enough to remove the cam 706 from the path of movement of bell crank lever 703. The cam 705 however is wide enough to still lie in the path of said lever 703 and thereby operate the impression mechanism to take one impression from the lower type wheels.

Mechanism is provided to prevent the release of the machine in case the knob 721 is not in one of its two normal positions. Fast on the sleeve 714 is a partial gear 722 (Fig. 31) the teeth of which mesh with the teeth of another partial gear 723 fast on a sleeve 724 surrounding shaft 552. Fast to the opposite end of this sleeve is a segmental arm 725 (Fig. 42) which cooperates with a plunger 726 slidably mounted in bracket 549. Pivoted to this plunger is a link 727 (Fig 25) which at its opposite end carries a pin 728 operating in a slot 729 in a lever 730 pivoted on a stud in the left hand side frame of the machine. Pivoted to the lever 730 is a link 731 which at its other end is pivoted to the lever 63 fast on the release shaft 64 above described. When the machine is released the lever 63 is rocked counter-clockwise, which movement lowers link 731 and rocks lever 730 counter-clockwise. The slot 729 in this lever is so shaped that the link 727 is moved forwardly, thereby pushing the plunger 726 forwardly.

When the knob 721 is in either of its two regular positions the segmental arm 725 will not be in the path of movement of plunger 726. If, however, the knob 721 is left out of one of its normal positions the arm 725 will be in front of the plunger 726 and it will be impossible to release the machine until said knob is properly positioned.

*Platen selecting mechanism*

Of the various platens which are adapted for use with the book and card printer only one is operated on every operation. This is the innermost one, as shown in Fig. 36, and it cooperates with the account number type wheels. These wheels are set up on the first operation of the machine and the impression taken therefrom on the card, and book. Upon the next operation, however, these wheels are moved to a blank position so that even though the platen operates, no impression will be made. Means are provided for selecting all of the other platens when it is desired to have them print and this mechanism will now be described.

Each of the platens, except the account number platen, has an arm 735 integral therewith. These arms carry rollers 736 at their ends which rest on arms 738 of a platen selecting plate 739, which is bent upwardly at one end, and has two slots 740 therein, through which project two studs 741 (Figs. 36 and 39) upon which the plate is slid. A stud 742 in frame 365 projects through a slot 743 in the horizontal portion of said plate to maintain its alinement. It can be seen from Fig. 39 that if the roller 736 of any of the platens is resting on the arm 738 the platen will not be lowered when the yoke 698 is lowered and therefore will not be operated to take an impression from its appropriate type wheel, as above described. The arms 738 of plate 739, however, have differentially placed recesses 745 and if the plate is so positioned that one of these recesses is under the roller 736 of any particular platen, then that platen will be operated. With the parts in their normal positions, as shown in Fig. 36, it can be seen that the second and sixth platens from the front are in position to operate. When the plate 739 is moved one position to the left this second platen will be prevented from operating and the first, fifth and sixth platens will be effective. In the next position the fourth and sixth platens are effective, and in the next position the third and sixth are effective.

The plate 739 is moved under the control of the same mechanism which selects the platens for the detail strip. It will be remembered that the cam 613 is so shaped as to rock the multi-arm lever 616 (Fig. 39) either one, two or three steps in a clockwise direction. The downwardly extending arm of the multi-armed lever 616 is bifurcated to straddle a roller 747 carried by an arm 748 loose on the right hand one of the studs 741. This arm 748 is also bifurcated to straddle a roller 749 carried by an upwardly extending projection 750 of plate 739.

It is evident from the above description that the plate 739 will be moved under the control of the cam 613. This cam is operated by the differential mechanism for the "Balance" bank, as above described. It will be recalled that the differential mechanism of this bank is disconnected from its driver in the zero position when the amount of a withdrawal is to be printed. Therefore, the withdrawal platen is free to operate with the plate 739 in its zero position. When the plate 739 is moved to the second position, in which the new balance platen is selected, the arm 697 for the date planten presents a recess 745 to its roller and thereby permits the operation of this platen so that the date is always printed when the new balance is printed. The third position in which the Balance bank differential breaks is the one corresponding to "Old balance". It is evident that if the plate is moved to its third position the "Old balance" platen will be permitted to operate, and the others held in ineffective position. When the plate is moved to its fourth position the "Deposit" platen is selected, as this is the position selected by the Balance bank differential mechanism.

Attached to the top of the vertical portion of the plate 739 is a horizontal shield 752 (Figs. 35 and 39). This shield lies over the book and card and has a plurality of openings 753 cut therein. These openings are so arranged that when the plate 739 is moved to select a platen for operation the opening in shield 752 corresponding to the platen to be operated will be the only one through which an impression can be made. The shield 752 prevents the card or book from becoming soiled by any accidental contact with the ink ribbon.

*Platen restoring mechanism*

The plate 739 remains in the position to which it was moved until the next operation of the machine. The platen which was operated rests upon the yoke 698 and the roller 736 is in its appropriate recess in plate 739. It might happen that when the plate is moved on the next operation of the machine the edge of the recess for the platen last operated would abut against the center of the roller 736 for this platen and thereby cause the machine to jam. In order to prevent this contingency, means are provided for raising all of the platens at the beginning of the operation so that when the plate 739 is moved to its new position it will not come in contact with the rollers. After the plate has been set the platens are lowered so that the rollers 736 rest upon said plate, with the exception of the selected platen whose roller will be in one of the recesses 745 of arms 738.

The mechanism for raising the platens will now be described. Each of the platen-carrying arms 697 has a tail 754 (Figs. 36 and 39) integral therewith, with the exception of the arm for the account number platen, which does not cooperate with plate 739. Extending across all of said tails, and just above their left hand ends, is a bar 755 carried by an arm 756 and a lever 757 which are pivoted on shaft 572. The lever 757 carries a roller 758 projecting into a cam groove 759 (Fig. 33) in a disk 760 fast on shaft 371. The cam groove 759 is so shaped that at the beginning of the operation the lever 757, and therefore bar 755, will be rocked clockwise (Fig. 39) about shaft 572. The bar 755 will engage all of the tails 754 of arms 697 and thereby rock these arms counter-clockwise. It can be seen that this movement will raise the rollers 736 away from the plate 739. The arms and rollers will be held in this position until the plate is set, after which the bar 755 will be raised and thereby permit the rollers 736 to rest on said plate, except the ones which are to print. The rollers for these platens will of course be in the recesses of arms 738. When the cam 760 has rotated about 180 degrees the lever 757 will be rocked counter-clockwise past its normal position and held in this position in order to give the tails 754 sufficient clearance when the platens are rocked clockwise by gravity, assisted by the spring 693 as has been previously described.

A stud 761 screwed into the base of the machine is set by a nut 762 and locked by a nut 763. It is located directly under a tail 764 connected to the hub of the arm 697 for the account number platen. It can be clearly seen that when the bar 755 is lowered the stud 761 will act as a stop therefor and will thereby prevent the platens from being raised to a sufficient height to contact the type wheels and possibly cause the book and card to receive a wrong impression or become smeared.

*Lower platen disabling mechanism*

Figure 26:
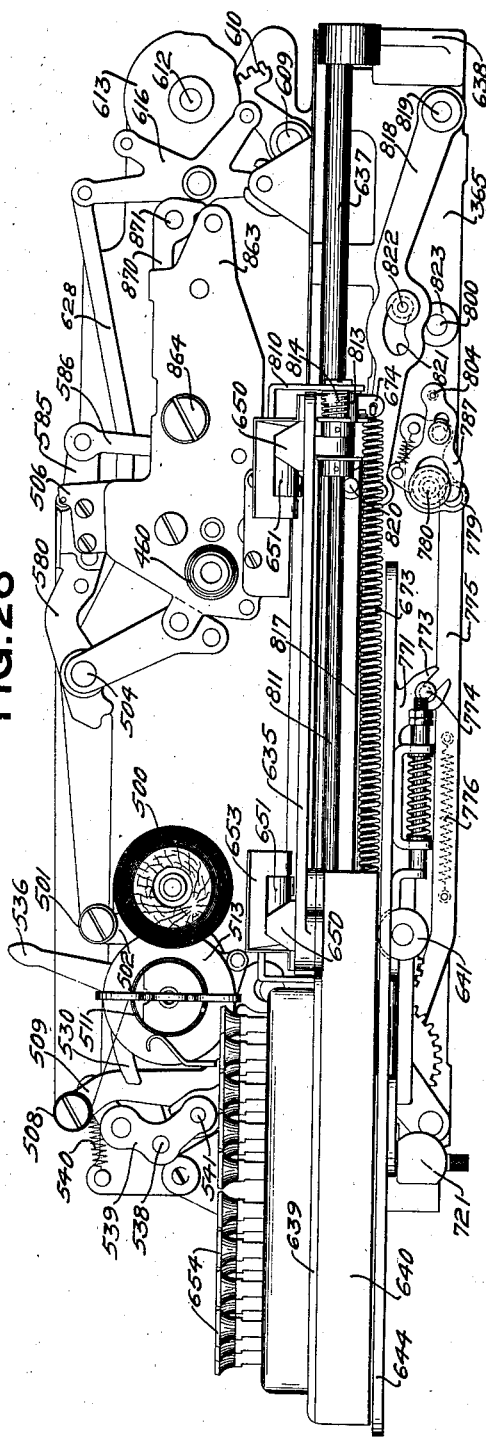
Fig. 26 is a front elevation of the printing mechanism.
Figure 28:
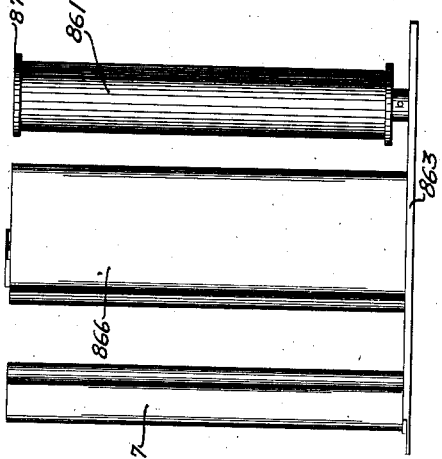
Fig. 28 is a top view of the mechanism shown in Fig. 27.

A device is provided to disable the lower platens when neither a card nor a passbook is in the machine. Loose on a stud 770 projecting from frame 365 is an arm 771 having an upwardly extending feeler finger 772 (Figs. 26, 36, and 39). The arm 771 has a bifurcated arm 773 straddling a stud 774 carried by a pitman 775. At its left hand end (Fig. 39) this pitman is bifurcated to surround the drive shaft 371. A spring 776 extending between a pin on said pitman and a pin on the front frame 365 constantly tends to move the pitman towards the right. It is normally prevented, however, from such movement by the engagement of the high point of a cam 777 with a roller 778 on said pitman.

It can be seen from the above that when the machine is operated with no card or book therein, and the shaft 371 is given a counter-clockwise rotation (Fig. 39), the high point of cam 777 will be moved away from the roller 778 and will thereby permit the pitman 775 to move toward the right and, due to its connection with arm 771, this arm will be rocked counterclockwise. At its right hand end the pitman is pivoted to an arm 779 fast on a shaft 780. Also fast on this shaft is an arm 781 to which is pivoted a link 782 pivoted to a bell crank lever 783 (Fig. 40) loose on rod 588 adjacent the beforementioned link 702. This link 702 has an enlarged end 784 in which is a slot 785 surrounding a pin carried by said bell crank lever 783. It will be remembered that link 702 has a notch 701 engaging a rod 700 carried by the yoke 698, and that the movement of this link to the left rocks the yoke 698 to actuate the platens. I can be seen, therefore, that when the bell crank lever 783 is rocked counter-clockwise as above described the link 702 will be raised, due to its slot and pin connection with said bell crank, far enough to disengage the notch 701 in said link from rod 700 carried by the yoke arms 694 and 699. This movement will prevent the yoke from being rocked and therefore the platens will not be operated.

However, when a book or card is in the machine the upwardly extending finger 772 of arm 771 comes in contact with the lower side of said card or book and further rotation thereof is then prevented. It can be readily seen that if the arm 771 is held against rotation, the link 702 is not raised, as above described, and therefore the yoke 699 will be lowered to operate the platens.

A slide 787 (Fig. 39) is bifurcated to surround shaft 780 and is also supported by a stud 788 mounted in the arm 779 and projecting through a slot 789 in slide 787. A spring 790 tends to hold said slide in its extreme right hand position, as shown in Fig. 39. Fast on a shaft 800 supported by frames 365 and 366 is an arm 801 carrying a pawl 802. This pawl cannot rock clockwise due to a pin therein engaging a shoulder on said arm. The pawl is free, however, to rock counter-clockwise against the tension of a spring 803 stretched between the pin on said pawl and an extension of arm 801.

The shaft 800 is rocked counter-clockwise near the beginning of the operation by means to be later described, and if the shaft 780 is rocked only a short distance, due to the engagement of the feeler 772 with the card or book, the pawl 802 contacts a pin 804 in slide 787 and rocks the parts back to normal position. They are held by pawl 802 in this position until near the end of the operation, when the cam 777 picks up the roller 778 and holds the parts in normal position.

If there is no card or book in the machine the pin 804 is moved out of the path of movement of the pawl 802. The pawl, however, is rocked as usual and the pin 804 is returned as the pawl returns to normal, so that when the pawl is moved upwardly it strikes said pin but, the pawl is flexible in this direction and can therefore wipe by the pin 804 to its normal position.

*Card tension mechanism*

After the card is in the machine, mechanism is provided to hold it against movement during the time it is being printed upon. In order to accomplish this there are two pairs of knurled rollers which are normally separated, but which can be brought together to hold the card, as above described.

The lower rollers 805 of these pairs (Figs. 36 and 49) are fast on hubs 806, which are slidable on, but keyed to, shaft 637. The hubs 806 are located between the bearings 636 for the carriage and forked lugs 807 which are integral with the table 635, and are therefore shifted laterally of the machine with carriage. As can be seen in Fig. 49 these rollers extend upwardly through openings in the table 635 and cooperate with smaller rollers 808 loose on pins 809 mounted in arms 810 (Figs. 26 and 48). These arms are pivoted on a shaft 811 rotatably mounted in bearing lugs 812 depending from the table 635, and carry pins 813 about which are hooked one end of torsion springs 814 surrounding shaft 811. The opposite ends of these springs are hooked over pins carried by arms 815 pinned to shaft 811 and having slots through which the pins 813 carried by arms 810 project. It is evident from the above that if the shaft 811 is rocked clockwise (Fig. 49) the arms 810 will also be rocked clockwise through arms 815, springs 814 and pins 813, which movement will rock the upper knurled rollers against the lower rollers 805 and thereby hold the card against movement. The card is made longer than the book so that the rollers 805 and 808 may engage the said card, but not the book.

The mechanism for rotating the shaft 811 to move the pairs of rollers into contact with each other will now be described. Fast on shaft 811 are two arms 816 (Figs. 48 and 49) which support a rod 817. A lever 818 pivoted on a stud 819 projecting from the front frame 365 carries two pins 820 (Figs. 26, 36 and 48), one on each side of the rod 817. The lever 818 has a slot 821 therein, through which projects a pin 822 carried by an arm 823 fast on shaft 800. This shaft 800 is given a counter-clockwise rotation (Fig. 26) upon every operation by means to be later described. This will move the pin 822 in slot 821 of lever 818 and due to the shape of this slot the lever will be rocked counter-clockwise and then clockwise, which will, through pins 820, rock rod 817, arms 816 and shaft 811 clockwise (Fig. 49), and thereby move the upper rollers 808 into contact with the lower rollers 805. The shaft 800 is rocked first at the beginning of the operation and back to normal near the end thereof so that the tension is maintained on the card during nearly the complete operation of the machine.

Card ejector

After the card has received its impression from the lower type wheels it is ejected from the machine so that upon the next operation of the platens the same impression may be taken upon the passbook. It will be remembered that the card is held between the two pairs of knurled rollers 805 and 808. It is apparent, therefore, that in order to eject the card all that is necessary is to give the larger one of these rollers in each pair a rapid counter-clockwise rotation, as seen in Fig. 49. It will be remembered that the larger roller 805 of each pair is slidably mounted upon the shaft 637 to which it is keyed. Therefore, if the shaft 637 is given a counter-clockwise rotation both the rollers 805 will be rotated, no matter in what position on this shaft the carriage may be located. The means for giving the shaft 637 a counter-clockwise rotation will now be described. Fast on the printer drive shaft 371 is a disk 825 which carries a pin 826 adapted to engage one of a plurality of notches 827 in a Geneva wheel 828. The Geneva wheel is fast on a sleeve 829 surrounding shaft 572 (Figs. 36 and 37). Also fast to the sleeve 829 is a gear 830 (Figs. 31 and 50) which meshes with a pinion 831 loose on shaft 371. This pinion is pinned to a gear 832, which in turn meshes with a pinion 833 fast on a sleeve 834 surrounding shaft 572. Also fast on the sleeve 834 is a gear 835 which meshes with a gear 836 loose on shaft 371. The gear 836 (Fig. 50) is fast to a spiral gear 837 also loose on shaft 371, which meshes with a spiral pinion 838 (Figs. 36 and 47) fast on a short shaft carried by a bracket 839 supported by the front frame 365. At its opposite end the short shaft carried by bracket 839 has fast thereto a gear 840, which in turn meshes with a gear 841 fast to the shaft 637. It can be seen from the above description that when the shaft 371 has received slightly more than one-half of a rotation the pin 826 on disk 825 cooperates with one of the slots 827 in the Geneva wheel 828 and thereby rotates this wheel until the pin 826 is disengaged therefrom. This partial rotation of the Geneva wheel 828, through the gearing already described, will rotate the shaft 637 counter-clockwise (Fig. 49) and thereby rotate the two knurled rollers 805 also counter-clockwise at a very rapid rate in order to quickly eject the card from the machine after it has received its impression.

The Geneva wheel 828 is held against rotation, except when engaged by the pin 826, by a Geneva stop wheel 798 secured to the disk 825. As the pin 826 engages the wheel 828, a notch 799 in the stop wheel 798 is presented to the wheel 828 thus unlocking the same and permitting it to be turned one step by the pin 826. As the pin 826 leaves the wheel 828, the periphery of the Geneva stop wheel 798 again locks the Geneva wheel 828.

Key release for line selecting mechanism

The key 654 (Figs. 47 and 48) which has been depressed to select the line upon which the printing is to be done, will remain in its depressed position and thereby maintain the carriage in the proper position until the end of the operation on which the new balance is printed. Near the end of the new balance operation the depressed key is released and returned to its normal position. This release of the depressed key will permit the spring 673 to return the carriage to its extreme left hand position, in which it will remain until the next operation of the machine. The mechanism for causing the release of the depressed key 654 will now be described.

It will be recalled that upon totalizing operations the shaft 552 is slid toward the front of the machine by mechanism which has already been described. This movement will bring the arm 553 (Fig. 50), which is fast on shaft 552, into the same vertical plane as the arm 554, which is fast on shaft 371. Therefore, when the shaft 371 is rotated in a counter-clockwise direction the arm 554 will strike the arm 553 and cause the shaft 552 to rock clockwise. Also fast on the shaft 552 is an arm 843 (Figs. 50 and 57) carrying a pin 844 projecting through an opening in an arm 845 fast on a short shaft 846 supported in a bearing attached to the plate 644. Also fast on the short shaft 846 is an arm 847 carrying a pin 848. The pin 848 lies just under the lower edge of a bar 849 (Fig. 48) which is carried by two studs 850 projecting through slots 851 in said bar and carried by depending lugs 852 of the plate 639. The bar 849 also carries a roller 853 (Figs. 48 and 50) which extends into a recess 854 of the detent 663 for the line selector keys. It can be seen from Fig. 57 that when the shaft 552 is rocked clockwise, as above described, the pin 844 carried by arm 843 will rock the arm 845 counter-clockwise, which movement will through the short shaft 846 rock arm 847 and pin 848 counter-clockwise. As the pin 848 normally lies just beneath the bar 849 this bar will be moved upwardly, and due to the angle at which the slots 851 therein are cut, will be moved toward the left at the same time that it moves upwardly. As this bar carries the roller 853 it can be seen that the detent 663 will be moved toward the left (Fig. 50), which will disengage said detent from the notch 667 in the lower part of the key which was depressed and will thereby permit this key to return to its normal undepressed position under the influence of its spring 662.

Ribbon mechanism

Both the upper and lower type wheels print through a continuous ink ribbon 860 (Fig. 31), which receives its supply of ink from an ink roller 861. This roller is supported by a sleeve 862 (Figs. 27, 30 and 31) mounted in a plate 863, which has an opening therein through which the date knobs project. This plate is held in position by a screw 864. The sleeve 862 surrounds a rod 865 fast in the frame 366. The ribbon 860 passes about two metal shields 866 and 867. These shields are rigidly secured to the plate 863. At their upper ends they are bent to surround rods 868 supported by frame 366. It is apparent that if the screw 864 is removed the plate 863, roller 861, shields 866 and 867 and the ink ribbon 860 can be removed from the machine as a unit. This feature greatly facilitates the changing of the ribbon.

The ribbon is held taut while in the machine by means of an idler 869 carried by two arms 870 the front one of said arms being pivoted on a short arm fast on a shaft 871 supported at its rear end by frame 366 and supporting the right hand end of plate 863 at its outer end. The rear one of said arms is pivoted on a stud projecting from the frame 366.

Figure 27:
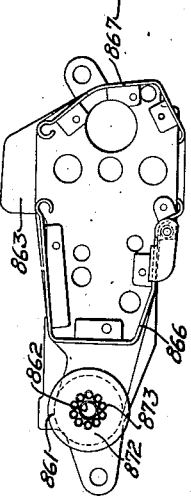
Fig. 27 is an elevation taken from the rear of the removable ribbon and ink roll carrying plate.

In order to feed the ink ribbon to present a freshly inked surface to the type, the following mechanism is provided. The ink roller 861 has a disk 872 fast on its inner end in which there are drilled a plurality of holes 873 forming a circle surrounding sleeve 862, as seen in Fig. 27. Loose on rod 865 is a ratchet 874 having integral therewith a disk 875 with two prongs 876 (Fig. 30) which are adapted to extend into any opposite pair of the holes 873. Cooperating with the ratchet 874 is a spring-pressed feeding pawl 877 and a retaining pawl 878. Pivoted to the feeding pawl 877 is a link 879 which at its lower end carries a pin 880 projecting through a slot 881 (Fig. 31) in an arm 882 pinned to shaft 800, above described. Also fast to this shaft is an arm 883 to which is pivoted a pitman 884, which at its opposite end is adapted to slide on shaft 371. This pitman carries a roller 885 (Fig. 32) which cooperates with a cam slot 886 in the previously described cam disk 760.

This disk is given a complete counter-clockwise rotation at every operation of the machine, and due to the shape of cam slot 886 moves the pitman first towards the left and then back to normal position. This movement is transmitted through arm 883 and shaft 800 to arm 882, which will be rocked counter-clockwise and then clockwise. As this arm moves counter-clockwise the end of slot 881 will come in contact with pin 880 on link 879 and will thereby raise said link and cause the pawl 877 to move the ratchet 874, and, through the engagement of prongs 876 with holes 873, the ink roller 861, counter-clockwise far enough to feed the ribbon one space.

Mechanism is provided to give the ink ribbon an extra long feed when the seam in the ribbon lies adjacent the type line. This mechanism however, is not, described herein, as it has been shown and described in the previously mentioned patent of B. M. Shipley, No. 1,619,796, granted March 1, 1927.

Total and sub-total mechanism

In order to allow sufficient time for the selection of a total and the engagement of said totalizer with the actuating racks when a total or sub-total is to be printed, the main drive shaft 77 is given two continuous rotations on such operations instead of one, as in adding operations. During the first rotation of the shaft 77 one of the totalizers is moved into engagement with its actuating racks. During the second rotation of the shaft the engaged totalizer pinions 236 control the extent of movement of the differentially movable racks and hence the setting of the type wheels to print a total or sub-total on the record strip.

To permit two rotations of the shaft 77 in total and sub-total operations, the total lever 135 controls mechanism shown in Fig. 24 to prevent the restoration of the motor locking arm 63 (Fig. 25) to normal position until near the end of the second rotation. Slidably mounted on the stud 94 (Figs. 2 and 3) is a link 890, one end of which is pivoted to a lever 891 loose on the stud 210. Pivoted to the lever 891 is a link 892 also pivoted to an arm 893 fast on the shaft 556. The link 890 has a stud 894 engaging a slot 895 in the link 209. The link 890 has two pins 896, one on each side of an ear on a bar 897 slidably mounted in a groove 898 in a disk 899. The link 890 also has an anti-friction roller 900 normally in engagement with a notch 901 in the disk 899. The gear 92 has a circular depression cut therein in which the disk 899 lies. Fast on shaft 556 is an arm 902 (Fig. 24) carrying a pin 903 projecting into a slot 904 in a lever 905 loosely mounted on a stud 906 in the machine frame. Also loose on the stud 906 is a lever 907 having an arm 908 carrying a roller 909 cooperating with a slot 910 in the plate 274.

The movement of the total lever 135 either up or down rocks the lever 907 counter-clockwise through the engagement of its pin 909 with the slot 910. This movement is transferred to lever 905 through a coiled spring 911 supported by projections 912 on levers 905 and 907, and moves said lever 905 counterclockwise. This movement through pin 903 rocks arm 902 and shaft 556 clockwise. Clockwise movement of this shaft 556 rocks arm 893 clockwise (Fig. 2), whereby, through the link 892 the lever 891 is rocked clockwise and moves the link 890 to the left.

This movement of the link 890, through the engagement of pins 896 with the ear on the bar 897, slides said bar to the left into engagement with a notch 913 in the gear 92, thus connecting said gear and the disk 899. At the same time the roller 900 is moved into a cam slot 914 in the disk 899. The movement of the link 890 also rocks the link 209 clockwise about stud 206. As the disk 899 is connected to the gear 92, the counter-clockwise movement of said gear and disk, through the cam roll 900, moves the link 890 still farther to the left and rocks the link 209 still farther. When the arm 211 is lowered near the end of the first half rotation of the gear 92 by the cam node 216, as described in adding operations, the stud 212 moves idly in the elongated portion of the opening 213 thus preventing the link 209 from rocking the shaft 64 to return the motor locking lever to normal position. As lever 63 is not rocked to normal position the lever 56 is not locked near the end of the first rotation of shaft 77 when the pin 78 raises the link 79 to rock the lever 56 to normal, and therefore the spring 60 immediately rocks the lever 56 to allow the motor clutch to drive the gears and shaft 77 a second rotation.

Near the end of the complete rotation of the gear 92 the link 890 is moved to the position in which it was adjusted by the total lever 135 so that when the lever 211 is rocked clockwise the second time by the second cam node 216, the stud 212 engages a shoulder 1950 in the opening 213 to lower the link 209 to rock the lever 207 and shaft 64 counter-clockwise (Fig. 2) slightly past normal position, but not as far past normal position as in adding operations, as this movement on adding operations is to release the amount keys and in this operation there are no amount keys depressed. Just before this movement of the lever 63 the pin 78 (Fig. 25) rocks the lever 56 to normal, and the lever 63, when moved past normal, engages the pin 61 and locks the lever 56 to stop the motor, as in adding operations. The shaft 64 is rocked slightly past normal so that the pin 190 (Fig. 24) is carried to the rear of the arm 195 and said arm is rocked clockwise by its spring to prevent an immediate second operation of the machine when the total lever is out of its adding position. With the arm 195 in front of the pin 190, when the total lever is out of adding position, the arm 188 is rocked clockwise to normal position, which moves the arm 195 out from in front of the pin 190 and the spring 197 rocks the shaft 64 and arm 191 to normal position.

In totalizing operations a selected totalizer is moved into engagement with the rack 234 before said rack is moved by the segment 238 and latch 239, whereby the differential movement of the rack 234 is controlled by the totalizer pinions 236. After the actuators have been moved differentially under the control of said totalizer pinions, the totalizer is disengaged from the actuator, thereby leaving the totalizer at zero.

In sub-totalizing operations, the totalizer is engaged with the actuator before the actuator is moved differentially, and held in engagement with said actuator to control the differential movement thereof to print a sub-total. The totalizer is also held in engagement with the actuator while said actuators are being returned to normal, thereby restoring to the totalizer the amount which was taken therefrom.

The mechanism whereby the said totalizer controls the differential movement of the actuators during total and sub-total operations will now be described.

Fast on three shafts 180 (Fig. 6) are partial gears 916 whose teeth mesh with segments 917 pivoted on studs 918 in frame 231. Each of the segments 917 has an arm 919 having a slot 920, through which projects a stud 921 in a link 922 pivoted at its opposite end to an arm 923 fast on a sleeve surrounding stud 918. Also pivoted on stud 921 is a link 924 pivoted to a lever 925 pivotally mounted on a stud 926 in the frame 231. This lever 925 carries a half-round stud 927 which is adapted to cooperate with teeth 928 on the inner periphery of a reset spider 929 loosely mounted on stud 232.

One of the shafts 180 is adapted to be rotated slightly in a counter-clockwise direction (Fig. 6) upon totalizing operations depending upon the adjustment of the total lever 135. This movement of shaft 180 through gear 916 and segment 917 will straighten the toggle formed by link 922 and link 924.

Fast on the sleeve which supports the arm 923 is an arm 930. When the shaft 180 and gear 916 are rocked, as previously described, the arm 930 is rocked clockwise upon the straightening of the toggle formed by link 922 and link 924 by the segment 917 into the path of the long tooth 931 carried by each totalizer pinion in its zero position. When, therefore, the selected totalizer wheels 236 are rocked into engagement with the actuators 234, and rotated to their zero positions, the long teeth 931 will strike the arms 930, and, through arms 923 and links 922 and 924, rock the lever 925 clockwise (Fig. 6) and cause the half-round stud 927 to engage one of the teeth 928 on the spider 929. This spider 929 has an arm 932 integral therewith having a slot 933 through which projects a pin 934 fast in the end of bell crank lever 241 which carries the latch 239 so that the reset spider 929 is moved with the actuator 233 and racks 234. It can be seen, therefore that when the movement of the spider 929 is arrested, as above described, the latch 239 will be broken. On total-taking operations the totalizer wheels are then disengaged from the actuators, as they are at zero, but on sub-total operations the totalizer wheels remain in mesh with the actuators, thus allowing the amounts taken off of them to be replaced. When the totalizer is disengaged a spring 935 extending from the lever 925 to a pin on the frame 231 rocks said lever 925 counter-clockwise to normal position, thereby disengaging the stud 927 from the teeth 928 of the spider 929.

At the end of the totalizing operation the shaft 180 and partial gear 916 are rocked clockwise, and rock the segment 917 counter-clockwise to normal, thereby lowering the arm 923 and rocking the link 922 counter-clockwise to normal position. This movement of the segment also rocks link 924 clockwise to normal position.

Should the totalizer be in the zero position when it is rocked into engagement with the segments 234, the long teeth 931 of the totalizer pinions will immediately strike the arms 930. When this occurs the clockwise movement of the segments 917, through the engagement of their arms 919 with the studs 921, straightens out the links 922 and arms 923 and immediately rocks the lever 925 clockwise, whereby the stud 927 engages with the notch 928 in the zero position. Consequently the latch is broken at zero and the segment 234 and spider 929 are not moved beyond zero position.

*Total and sub-total mechanism.—Interlocks*

As it is unnecessary to depress any amount keys during a total or sub-total printing operation, means must be provided to rock the zero stop pawls 112 to their ineffective positions in order that the differential mechanism may be controlled by the long teeth of the totalizer pinions, as above described.

As above stated, when the total lever is moved either above or below its adding position, the shaft 556 is rocked clockwise (Figs. 6 and 12) and counter-clockwise (Fig. 9). This shaft has secured thereto a plurality of arms 936 which carry a rod 937. Clockwise movement of shaft 556 by the total lever 135 and cam groove 914 (Figs. 2 and 6) and arms 936 moves the rod 937 downwardly into contact with an arm 938 which is fast on the short shaft 113 which carries the zero stop pawl 112. It is evident that this movement will rock the arm 938 and zero stop pawl 112 counter-clockwise about the shaft 113 and thereby move the said zero stop pawl to its ineffective position.

The shaft 556 also carries an arm 958 (Fig. 12) for the balance bank, the end of which is flattened and contacts with a pin 959 (Fig. 11) carried by a projection of the zero stop pawl for this bank. When the shaft 556 is rocked clockwise (Fig. 12) as above described the arm 958 will rock the pin 959 and therefore the zero stop pawl 112 counter-clockwise to ineffective position.

Pivoted to the total lever plate 274 is a link 940 (Fig. 24) connected to an arm 941 loose on shaft 256. Rigid with the arm 941 is a spiral segment 942 meshing with a spiral pinion 943 fast on a shaft 944 mounted in frames 366 and 367. Also fast on this shaft is a segment 945 (Fig. 44) meshing with a rack 946 slidably mounted on the studs 383. The rack has teeth on its upper edge which mesh with a segment 947 pivoted on a stud 948 projecting from frame 367. Integral with segment 947 is a segment 949 meshing with teeth formed on a plate 950 slidably mounted on studs 407 and 408 previously mentioned. The upper edge of this plate has a plurality of notches cut therein adapted to cooperate with the lower ends of arms 130 (Fig. 15) associated with the "Withdrawal" and "Deposit" banks of keys. It can be seen that the notches in this plate 950 also cooperate with notches 951 cut in the printer frame. When the "Total lever" is moved to its "Balance" position the plate 950 is so positioned by the above described connections that the notches in plate 950 corresponding to the "Withdrawal" and "Deposit" banks, are not in line with these corresponding notches 951 in the frame. Therefore the ends of the arms 130 will strike the plate 950 if it is attempted to depress a key in either of these banks and such depression will be prevented. If, however, the total lever is positioned to correspond with the "Deposit" bank, for instance, then the plate 950 is moved to position the notch corresponding to the "Deposit" bank in alinement with the same notch in frame 367. It is apparent that this adjustment will permit any key in the "Deposit" bank to be depressed. The notches in the plate 950 and frame 367 for the "Withdrawal" bank are not, however, in alinement and therefore no key in this bank can be depressed.

On total printing operations the printer drive shaft 371 is given only one rotation, whereas the register proper receives two rotations. Fast on shaft 556 is an arm 952 (Figs. 21 and 25) to which is pivoted a link 953. At its lower end this link is pivoted by a pin 954 extending through a slot 955 in the side frame to an arm 956 loose on the lower shaft 180. This arm has a nose 957 cooperating with the driving pawl 374. It will be recalled that the shaft 556 is rocked clockwise (Fig. 21) upon the adjustment of the total lever to any of its positions. This movement, through arm 952 and link 953 will rock the nose 957 of the arm 956 in front of pawl 374. Upon rotation of the disk 373, the pawl 374 will be rocked out of engagement from the boss 376 (Fig. 23) and the printer drive shaft 371 will not be rotated. Near the end of the first rotation the shaft 556 is given an additional movement which moves the nose 957 away from the pawl 374 and permits said pawl to return to its normal position and drive the printer during the second rotation of the registering mechanism.

It has already been described how the rack 946 (Fig. 44) is moved differentially under control of the total lever. This rack has teeth 965 formed on its upper edge which cooperate with the teeth of a segment gear 966 loose on a stud 967 supported by frame 367. Fast to said segment gear are two disks 968 and 969. Resting on the peripheries of these plates 968 and 969 are V-shaped noses of arms 970 pivoted on a rod 971 extending between frames 366 and 367. These arms lie beneath fingers 972 of the levers 473 for the "Withdrawal" and "Deposit" racks 382. It can be seen that, with the parts in the positions shown in Fig. 44, the two transaction racks will not be eliminated as above described in connection with the amount racks, as notches 474 in their respective levers 473 are held out of engagement from the shoulders 475 on the racks. The arms 970, and therefore levers 473; are not moved when the total lever is moved to its first position either above or below adding position, as both of the disks have high points cooperating with the V-shaped noses of arms 970. In the next position either above or below adding position of the total lever, the disks will be rotated far enough to bring a low portion of the rear disk 969 into co-operative relation with the arm 970 for the "Deposit" bank. This permits the arm to drop and thereby lowers the lever 473 for this bank in order to engage the notch 474 with shoulder 475 on the "Deposit" rack.

When the cams 480 and 481 are given their counter-clockwise rotation during the operation of the machine, the lever 473 for the "Deposit" rack will be moved to the left and will therefore rotate the "Deposit" type wheels from their zero positions to the positions in which they print the symbol for "Total debit" as the totalizer in the zero position will be selected if no key has been depressed, and this totalizer registers the total debits. If a key in the "Dep." bank is depressed, the corresponding rack will be moved towards the right to set the type wheels to the correct position. This rack is free to move as the levers 473 are held up by the engagement of a flat edge 974 thereon with the rod 470, until after the racks are set. Then when the levers 473 are lowered, as above described, the left hand ends of the racks that have been moved contact the tails 483 of said levers thereby preventing engagement of the notches 474 with shoulders 475.

If the total lever is moved to its third position above or below normal, the lever 970 for the "Dep." rack will be raised, as there is a high portion on its corresponding disk in this position. On the plate 968 for the "Withdrawal" lever 970 there is a low position, and therefore this lever is permitted to be lowered so that its notch 474 will engage shoulder 475 on the "Withdrawal" rack and thereby operate this rack in exactly the same manner as the "Deposit" rack just described.

*Operation*

It is believed that the manner in which the present machine is operated can be clearly understood from the previous description, and therefore it is not thought necessary to include in this specification anything except a brief and general description thereof.

As, perhaps, the most common transaction in which the machine is used is that of registering a deposit, such a transaction will now be described, as an instance of how the machine is operated.

When a patron of the bank wishes to make a deposit he presents the money and his passbook to the receiving teller. The teller removes the patron's account card from his file and from the said card sets up on the keyboard the last previous balance shown, and the account number. He depresses the "Old balance" key and then the release or motor bar 136.

The depression of the "Old balance" key selects the old balance totalizer and the adding pinions of the adding and subtracting totalizer for operation, and when the machine has completed its operation the amount of the last previous balance has been entered on these two totalizers.

Before the release bar is depressed on this operation the teller inserts the passbook under the guides 651 and pushes it back to printing position. The account card is then placed in the guides 653 and pushed back on top of the book.

Before the card is inserted, the operator notes the number of the first blank line and depresses the line selector key 654 appropriate thereto. He then inserts the card and moves the carriage manually towards the right until it is stopped by the depressed key with the proper line at the printing position.

It will be remembered that after the first impression is made on the card it will be ejected from the machine so that the second impression may be made on the passbook.

After the old balance has been registered and printed, the teller reinserts the account card in the machine and then sets up the amount of the deposit. He then depresses either the "A deposit" or "B deposit" key, depending on which letter has been assigned to him, and then the release bar. This operation will add the amount of the deposit into the "Total credits" totalizer, the "A deposit" totalizer, if the "A deposit" key is depressed and the adding and subtracting totalizer and will print this amount on the account card, which will then be ejected, then the passbook and the detail strip.

It is necessary to again reinsert the account card. The teller then moves the total lever to its first position below normal position and depresses the release bar. This position of the total lever selects the adding and subtracting totalizer for operation and upon the operation of the machine the amount standing thereon, which is the total of the old balance and the deposit, forming the new balance, is set up on the type wheels and printed on the account card, passbook and detail strip.

The date type wheels are set up by hand, but an impression is not taken therefrom until the new balance is printed, as the date platen is selected by the same mechanism as the new balance platen. The date is printed only on the card and book.

When a withdrawal is made, the operation is the same except that instead of one of the deposit keys being depressed a withdrawal key is used. This arrangement selects the proper withdrawal totalizer, the total debits totalizer and the subtracting pinions of the adding and subtracting totalizer. The selection of the subtracting pinions causes the amount withdrawn to be subtracted from the old balance, which has previously been placed on the adding pinions of this totalizer so that when the new balance is taken it will show the old balance minus the amount withdrawn.

If it is desired to read or reset any of the totalizers appropriate to the keys in the withdrawal bank, all that is necessary is to move the total lever to its extreme upper or lower position and depress the key corresponding to the totalizer it is desired to read or reset. Only this totalizer will then be engaged with the actuators and it will control said actuators to set up the amount on said totalizer on the type wheels from which an impression will be taken on the detail strip.

In order to take the total on the "Total debits" or "Total credits" totalizers, the total lever is moved to its second position below adding position for the "Total debits," and the third position below adding for the "Total credits" and the release bar is depressed. It is not necessary to depress any keys on these operations, as the above mentioned totalizers are in the zero position.

While the form of mechanism herein shown and described is admirably adapted to fulfill the objects primarily stated, it is to be understood that it is not intended to confine the invention to the one form or embodiment herein disclosed for it is susceptible of embodiment in various forms all coming within the scope of the claims which follow.

What is claimed is:

1. In a cash register, the combination of printing means, a manually movable table carrying record material, movable means for predetermining at what point on said record material the printing is to take place, and means for arresting the movement of said table at the predetermined point.

2. In a cash register, the combination of printing means, a manually movable table carrying record material, movable means for predetermining at what point on said record material the printing is to take place, means for arresting the movement of said table at the predetermined point, and means for holding said table in said set position during a plurality of operations of said register.

3. In a cash register, the combination of printing means, a manually movable table carrying record material, movable means for predetermining at what point on said record material the printing is to take place, means for arresting the movement of said table at the predetermined point, means for holding said table in said set position during a plurality of operations of said register, and means for releasing said table at the end of said plurality of operations.

4. In a cash register, the combination of printing means, a manually movable record material carrying table, means for predetermining at what point on said record material the printing is to take place, means for arresting the movement of said table at the predetermined point, means for holding said table in said set position during a plurality of operations of said register, means for releasing said table at the end of said plurality of operations, and means for automatically returning said table to its normal position.

5. In a cash register, the combination of printing means, a manually movable table adapted to carry a ruled card and book, a selecting mechanism for predetermining on which line of said card and book the impression is to be made, and a stop for arresting the movement of said table at the predetermined line.

6. In a cash register, the combination of printing means, a manually movable table adapted to carry a ruled card and book, a plurality of depressible keys for selecting which line of said card and book will receive the impression, and a stop for arresting the movement of said table at the selected line.

7. In a cash register, the combination of printing means, a manually movable table adapted to carry a ruled card and book, a selecting mechanism for predetermining on which line of said card and book the impression is to be made, a stop for arresting the movement of said table at the predetermined line, and means for holding said table in its selected position during a plurality of operations of said register.

8. In a cash register, the combination of printing means, a manually movable table adapted to carry a ruled card and book, a plurality of depressible keys for selecting on which line of said card and book the impression will be made, a stop for arresting the movement of said table at the selected line, and means for holding said table in its selected position during a plurality of operations of said register.

9. In a cash register, the combination of printing means, a manually movable table adapted to carry a ruled card and book, a plurality of depressible keys for selecting on which line of said card and book the impression will be made, and a pair of pivoted plates adapted to cooperate with the lower end of the depressed key and arrest the movement of said carriage in either direction at the selected line.

10. In a cash register, the combination of printing means, a manually movable table adapted to carry a ruled card and book, a plurality of depressible keys for selecting on which line of said card and book the impression will be made, a pair of pivoted plates adapted to cooperate with the lower end of the depressed key and arrest the movement of said carriage in either direction at the selected line, and means for holding the depressed key in its depressed position during several operations of the register.

11. In a cash register, the combination of printing means, a manually movable table adapted to carry a ruled card and book, a selecting mechanism for predetermining on which line of said card and book the impression is to be made, a stop for arresting the movement of said table at the predetermined line, means for holding said table in its selected position during a plurality of operations of said register, and means for releasing said table at the end of said plurality of operations.

12. In a cash register, the combination of printing means, a manually movable table adapted to carry a ruled card and book, a plurality of depressible keys for selecting on which line of said card and book the impression will be made, a pair of pivoted plates adapted to cooperate with the lower end of the depressed key and arrest the movement of said carriage in either direction at the selected line, means for holding the depressed key in the depressed position during a plurality of operations of the register, and means for releasing said depressed key and thereby the table at the end of said plurality of operations.

13. In a cash register, the combination of printing means, a manually movable table adapted to carry a ruled card and book, a plurality of depressible keys for selecting on which line of said card and book the impression will be made, a pair of pivoted plates adapted to cooperate with the lower end of the depressed key and arrest the movement of said carriage in either direction at the selected line, means for holding the depressed key in its depressed position during a plurality of operations of the register, means for releasing said depressed key and thereby the table at the end of said plurality of operations, and means for automatically returning said table to its normal position.

14. In a cash register, the combination of printing means, a manually movable table adapted to carry a ruled card and book, a plurality of depressible keys for selecting on which line of said card and book the impression will be made, a pair of pivoted plates adapted to cooperate with the lower end of the depressed key and arrest the movement of said carriage in either direction at the selected line, means for holding the depressed key in the depressed position during a plurality of operations of the register, means for releasing said depressed key and thereby the table at the end of said plurality of operations, and a spring for automatically returning said table to its normal position.

15. In a cash register, the combination of printing means, a manually movable table adapted to carry a card and book one on top of the other, guides carried by said table to facilitate the insertion of said card and book, a plurality of pairs of normally separated knurled rollers carried by said table and between which said card and book are placed, and means, including a member having a stationary mounting, and engaging a rod carried by arms movable with the table for bringing each of said pairs of rollers together when the table is in any of its positions of adjustment, to hold said card and book rigid while the impression is made thereon.

16. A cash register printing mechanism having a slidable table, a stop for said table comprising two plates pivoted on their opposite edges.

17. A cash register printing mechanism having a slidable table, a stop for said table comprising two rectangular plates pivoted on their opposite edges, and means for flexibly holding said plates in position to stop said table.

18. A cash register printing mechanism having a slidable table, a stop for said table comprising two rectangular plates pivoted on their opposite edges, and means for holding said plates so that one of them will arrest the movement of said carriage in one direction and the other of said plates in the opposite direction.

19. A cash register printing mechanism having a slidable table, a stop for said table comprising two pivoted plates adapted to stop said table in either direction, and means for absorbing the shocks incident to said stoppage.

20. A cash register printing mechanism having a slidable table, a stop for said table comprising two pivoted plates adapted to stop said table in either direction, and a compression spring for absorbing the shocks incident to said stoppage.

21. In a cash register printing mechanism, a slidable table adapted to receive record material, a plurality of rollers adjacent said table, a shaft upon which said rollers are mounted, other rollers normally out of contact with said first mentioned rollers, arms for carrying said second mentioned rollers, means, including a member having projections engaging a rod supported by a frame connected to the arms, for moving said arms to bring said rollers into contact with each other, said means being effective to move the arms when the slidable table is setting in any of its various positions and means for giving said shaft a rotation while said rollers are in contact to eject said record material.

22. In a machine of the class described, the combination of a plurality of lines of printing elements each line comprising a plurality of groups, and a single means for setting all of said groups on said lines simultaneously and to the same extent.

23. In a machine of the class described, the combination of a plurality of parallel lines of printing elements each line comprising a plurality of groups, a single means for setting all of said groups simultaneously and to the same extent, and means for selecting which of said groups on each line shall print.

24. In a machine of the class described, the combination of a plurality of parallel lines of printing elements each line comprising a plurality of groups, a single means for setting all of said groups simultaneously and to the same extent, means for selecting which of said groups on each line will print, and means for taking an impression from the selected groups.

25. In a machine of the class described, the combination of a plurality of groups of printing elements arranged on the same axis, a single means for setting all of said groups simultaneously and to the same extent, means for selecting which of said groups will print, and normally ineffective means for taking impressions from all of said groups.

26. In a machine of the class described, the combination of a plurality of groups of printing elements arranged on the same axis, a single means for setting all of said groups simultaneously and to the same extent, means for selecting which of said groups will print, normally ineffective means for taking an impression from all of said groups, and means for rendering the impression means appropriate to the selected groups effective.

27. In a machine of the class described, the combination of a plurality of groups of printing elements arranged on the same axis, for printing on record material, a single means for setting all of said groups simultaneously and to the same extent, means for selecting which of said groups will print, normally ineffective means for taking an impression from all of said groups, means for rendering the impression means appropriate to the selected groups effective and means for rendering all of said impression means ineffective if there is no record material inserted in the machine.

28. In a machine of the class described, the combination of three or more groups of type wheels, a rack appropriate to each digit represented by a type wheel, and means for adjusting said racks to set up all of said groups of type wheels simultaneously and to the same extent.

29. In a machine of the class described, the combination of three or more groups of type wheels, a rack appropriate to each digit represented by a type wheel, and a plurality of differential mechanisms for adjusting said racks to set up all of said groups of type wheels simultaneously and to the same extent.

30. In a machine of the class described, the combination of three or more groups of type wheels, a single set of racks for setting all said groups simultaneously and to the same extent, differential mechanism for actuating said racks, and other differential mechanism for selecting which of said groups shall print.

31. In a machine of the class described, the combination of three or more groups of type wheels for making impressions in different columns, a single set of racks for setting all of said groups simultaneously and to the same extent, differential mechanism for actuating said racks, and other differential mechanism for selecting in which column the impression shall be made.

32. In a machine of the class described, the combination of three or more groups of type wheels for making impressions in a plurality of columns, a single set of racks for actuating all of said groups simultaneously and to the same extent, differential mechanism for actuating said racks, other differential mechanism for selecting in which column the impression will be made, and means for taking an impression from the selected groups.

33. In a machine of the class described, the combination of three or more groups of type wheels for making impressions in a plurality of columns, a single set of racks for actuating all of said groups simultaneously and to the same extent, differential mechanism for actuating said racks, a plurality of platens one for each of said groups, and other differential mechanism for selecting which of said platens shall take said impressions.

34. In a machine of the class described, the combination of three or more groups of type wheels for making impressions in a plurality of columns, a single set of racks for actuating all of said groups simultaneously and to the same extent, differential mechanism for actuating said racks, a plurality of platens one for each of said groups, other differential mechanism for selecting which of said platens shall take said impressions, and means for operating said selected platens.

35. In a machine of the class described, the combination of three or more groups of type wheels, a single set of racks for setting all of said groups simultaneously and to the same extent, differential mechanism for selecting which of said groups will print, and a plurality of normally ineffective platens for taking impressions from all of said groups.

36. In a machine of the class described, the combination of three or more groups of type wheels, a single set of racks for setting all of said groups simultaneously and to the same extent, differential mechanism for selecting which of said groups will print, a plurality of normally ineffective platens, and means for rendering the impression means appropriate to the selected groups effective.

37. In a machine of the class described, the combination of three or more groups of type wheels, a single set of racks for setting all of said groups simultaneously and to the same extent, differential mechanism for actuating said racks, a plurality of normally ineffective platens, and a differentially set plate the adjustment of which renders certain of said platens effective.

38. In a machine of the class described, the combination of three or more groups of type wheels, means for setting all of said groups simultaneously and to the same extent, a plurality of normally ineffective platens, means for rendering certain of said platens effective, and means for operating the effective platens.

39. In a machine of the class described, the combination of three or more groups of type wheels, means for setting all of said groups simultaneously and to the same extent, a plurality of normally ineffective platens, means for rendering certain of said platens effective, and means for giving said effective platens a plurality of operations.

40. In a machine of the class described, the combination of three or more groups of type wheels, means for setting all of said groups simultaneously and to the same extent, a plurality of normally ineffective platens, means for rendering certain of said platens effective, means for giving said effective platens a plurality of operations, and means whereby the number of operations imparted to said platens may be varied.

41. In a machine of the class described, the combination of three or more groups of type wheels, means for setting all of said groups simultaneously and to the same extent, a plurality of normally ineffective platens, means for rendering certain of said platens effective, means for operating said effective platens, and manually controlled means for determining the number of operations said platens will be given.

42. In a cash register printing mechanism, the combination of platens, pivoted arms for carrying said platens, projections on said arms, rollers mounted on said projections, a plate having differentially positioned openings therein and adapted to support said platens, and means for moving said plate to bring one of said openings into relation with its corresponding roller in order to permit said platen to operate.

43. In a cash register printing mechanism, the combination of platens, pivoted arms for carrying said platens, projections on said arms, rollers mounted on said projections, a plate having differentially positioned openings therein and adapted to support said platens, and means for moving said plate.

44. In a cash register printing mechanism, the combination of platens, pivoted arms for carrying said platens, projections on said arms, rollers mounted on said projections, a plate having differentially positioned openings therein and adapted to support said platens, means for moving said plate, and a member having a plurality of arms for moving said plate.

45. In a cash register printing mechanism, the combination of a platen, a pivoted arm for supporting said platen, means for rocking said arm to actuate said platen to take an impression, a plate for normally preventing the rocking of said platen, and means for moving said plate to a position in which the platen may be actuated.

46. In a machine of the class described, the combination of a plurality of platens normally out of printing position, a plunger for supporting each of said platens, a frame for carrying all of said plungers, means for rocking said frame to cause said platens to take an impression, a shaft carried by said frame, a plurality of cams differentially spaced about said shaft, a plurality of arms each engaging one of said plungers and cooperating with one of said cams, and means for rotating said shaft so that any one of said cams will rock its corresponding arm and lower its plunger and platen to printing position.

47. In a machine of the class described, the combination of a plurality of platens normally out of printing position, a plunger for supporting each of said platens, a frame for carrying all of said plungers, means for rocking said frame to cause said platens to take an impression, a shaft carried by said frame, a plurality of cams differentially spaced about said shaft, a plurality of arms each engaging one of said plungers and cooperating with one of said cams, and a selecting cam for rotating said shaft so that any one of said first mentioned cams will rock its corresponding arm and lower its plunger and platen to printing position.

48. In a machine of the class described, the combination of a plurality of platens normally out of printing position, a plunger for supporting each of said platens, a frame for carrying all of said plungers, means for rocking said frame to cause said platens to take an impression, a shaft carried by said frame, a plurality of cams differentially spaced about said shaft, a plurality of arms each engaging one of said plungers and cooperating with one of said cams, means for rotating said shaft so that any arm of said cams will rock its corresponding arm and lower its plunger and platen to printing position, and manipulative means for controlling the movement of said second mentioned cam.

49. In a cash register printing mechanism, the combination of a plurality of platens, certain of said platens being normally effective and certain of said platens being normally ineffective, and means for rendering said normally effective platens ineffective and said normally ineffective platens effective.

50. In a machine of the class described, the combination of a plurality of platens, certain of which are normally effective and certain others normally ineffective, and a plate for rendering said first mentioned platens ineffective and certain of said second mentioned platens effective.

51. In a machine of the class described, the combination of a plurality of platens certain of which are normally effective and certain others normally ineffective, a plate for rendering said first mentioned platens ineffective and certain of said second mentioned platens effective, and differential mechanism for controlling the movement of said plate.

52. In a machine of the class described, the combination of a plurality of platens certain of which are normally ineffective, a plate for selecting which of said platens is to be operated, a plurality of keys for controlling said plate on certain operations, and a manually movable lever for controlling said plate on certain other operations.

53. In a machine of the class described, the combination of a plurality of platens certain of which are normally ineffective, a plate for selecting which of said platens is to be operated, a single differential mechanism for moving said plate, a plurality of keys for controlling said differential mechanism on certain operations, and a manually movable lever for controlling said differential mechanism on certain other operations.

54. In a cash register, the combination of groups of type carriers for printing items on record material, feeding means including a latch device for said record material, means to normally maintain said feeding means ineffective, and means for automatically tripping the latch to render said feeding means effective when certain items are printed.

55. In a cash register, the combination of groups of type carriers for printing on a paper strip, feeding means for said strip, said feeding means including a spring-actuated device, means including a latch to normally restrain the spring-actuated feeding means, a shiftable arm for rendering said latch ineffective on certain operations of said register, and a manually operable means for controlling said arm.

56. In a cash register printing mechanism, the combination of a manually movable carriage, keys for stopping said carriage in any one of a plurality of positions, a detent for holding said carriage in its selected position, a manually movable lever, and means under control of said lever for moving said detent and thereby releasing said carriage.

57. In a cash register printing mechanism, the combination of a manually movable carriage, keys for stopping said carriage in any one of a plurality of positions, a detent for holding said carriage in its selected position, a manually movable lever, a shaft adapted to be rocked by said lever, and connections between said shaft and said detent whereby said detent will be moved to its releasing position under the control of said lever.

58. In a cash register printing mechanism, the combination of a manually movable carriage, keys for stopping said carriage in any one of a plurality of positions, a detent for holding said carriage in its selected position, a manually movable lever, a shaft adapted to be rocked by said lever, an arm carrying a projecting pin fast on said shaft, and connections between said arm and said detent whereby said detent will be moved to its releasing position and will permit said carriage to return to its normal position under the control of said lever.

59. In a machine of the class described, the combination of printing elements, a plurality of impression means adapted to co-operate therewith, and a shield located between said printing elements and said impressing means and having a plurality of differentially placed openings therein through which the impression means are adapted to operate.

60. In a machine of the class described, the combination of printing elements, a plurality of impression means adapted to co-operate therewith, means for selecting an impression means for operation, a shield located between said printing elements and said impression means and having a plurality of differently placed openings therein through which the impression means are adapted to operate, and means for moving said shield differentially in accordance with the selection of said impression means.

61. In a machine of the class described, the combination of a plurality of groups of printing wheels, a plurality of platens adapted to co-operate therewith, means for selecting a platen for operation, and a horizontally movable shield between said wheels and said platens and having a plurality of openings therein through which the selected impression means is adapted to print.

62. In a machine of the class described, the combination of a pair of ejecting rollers arranged one above the other, a pivoted arm for supporting said upper roller, spring means for rocking said arm to move said upper roller into contact with said lower roller, type wheels, an aliner therefor, and a link connecting said arm and said aliner for normally preventing said upper roller from being lowered into co-operative relation with said lower roller.

63. In a machine of the class described, the combination of type carriers for printing on record material; feeding means for said record material; a latch for rendering the feeding means normally ineffective; operating means for the latch but normally out of the plane thereof; and means for moving the operating means into the plane of said latch on certain operations of the machine, so that when operated said operating means will move the latch to render the feeding means effective.

64. In a cash register printing mechanism, the combination of a main operating device; type carriers for printing on record material; feeding means for said record material; a latch for rendering the feeding means normally ineffective; means intermediate the latch and the main operating device and normally out of the plane of the latch and the device; and means for moving said intermediate means into the plane of the latch and operating device on certain operations of the machine.

65. A cash register printing mechanism having a sliding table, a stop for said table including pivoted plates adapted to stop said table when moving in either direction, movable means for supporting said plates, a rigid member adjacent the movable means, and a device connected to the movable means and supported by the rigid member for absorbing the shocks incident to the stopping of the table when moving in either direction.

66. In a cash register, the combination of a total lever adjustable to total taking positions, a manually movable card carriage, means for holding said carriage in its adjusted position, and means shiftable into a position by said total lever when the total lever is moved into its total taking position to actuate said holding means to release said carriage.

67. In a cash register, the combination with printing means; of a manually movable table adapted to carry separate work pieces superposed one upon the other; guides carried by the table to facilitate the location of the work pieces on the table; a plurality of pairs of normally separated pressure ejecting rolls carried by the table, and between which rolls the work pieces are inserted; a swinging universal member mounted in the carriage to operate the pressure rolls to cause them to release or to grip the work pieces; and means including a rocking drive member relatively to which the carriage travels, and having a connection with the universal member to rock the latter in any position which the carriage may assume.

In testimony whereof I affix my signature.

BERNIS M. SHIPLEY.

CERTIFICATE OF CORRECTION.

Patent No. 1,761,542.                      Granted June 3, 1930, to

BERNIS M. SHIPLEY.

It is hereby certified that error appears in the printed specification of the above numbered patent requiring correction as follows: Page 16, line 75, for "hood" read "hook"; page 31, line 72, claim 27, after "effective" insert a comma; page 33, line 62, claim 54, strike out the words "groups of"; lines 63 and 64, strike out the words "including a latch device" and insert the same after "means" in line 64; line 71, claim 55, strike out the words "groups of"; and that the said Letters Patent should be read with these corrections therein that the same may conform to the record of the case in the Patent Office.

Signed and sealed this 22nd day of July, A. D. 1930.

(Seal)                                          Wm. A. Kinnan,
                                                Acting Commissioner of Patents.